(12) United States Patent
Miyata et al.

(10) Patent No.: US 11,117,986 B2
(45) Date of Patent: Sep. 14, 2021

(54) CURABLE COMPOSITION, FILM, OPTICAL FILTER, SOLID IMAGE PICKUP ELEMENT, IMAGE DISPLAY DEVICE, AND INFRARED SENSOR

(71) Applicant: FUJIFILM Corporation, Tokyo (JP)

(72) Inventors: Tetsushi Miyata, Haibara-gun (JP); Hiromu Koizumi, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/442,012

(22) Filed: Jun. 14, 2019

(65) Prior Publication Data

US 2019/0309106 A1  Oct. 10, 2019

Related U.S. Application Data

(63) Continuation of application No. PCT/JP2017/046053, filed on Dec. 22, 2017.

(30) Foreign Application Priority Data

Feb. 1, 2017 (JP) .............................. JP2017-016784
Dec. 7, 2017 (JP) .............................. JP2017-235033

(51) Int. Cl.
| | | |
|---|---|---|
| *C08F 20/28* | (2006.01) | |
| *C08F 20/30* | (2006.01) | |
| *C08J 5/18* | (2006.01) | |
| *C08K 5/00* | (2006.01) | |
| *C08K 5/07* | (2006.01) | |
| *C08K 5/3417* | (2006.01) | |
| *C08K 5/353* | (2006.01) | |
| *C08K 5/41* | (2006.01) | |
| *G02B 5/22* | (2006.01) | |
| *C08F 2/50* | (2006.01) | |

(52) U.S. Cl.
CPC ............. *C08F 20/28* (2013.01); *C08F 2/50* (2013.01); *C08F 20/30* (2013.01); *C08J 5/18* (2013.01); *C08K 5/0041* (2013.01); *C08K 5/07* (2013.01); *C08K 5/3417* (2013.01); *C08K 5/353* (2013.01); *C08K 5/41* (2013.01); *G02B 5/22* (2013.01); *G02B 5/223* (2013.01)

(58) Field of Classification Search
CPC ........... C08F 20/28; C08F 20/30; C08K 5/07; C08K 5/353; C08K 5/3417; C08K 5/0041; C08K 5/41; G02B 5/223; C08J 5/18
USPC .......................................................... 524/95
See application file for complete search history.

(56) References Cited

U.S. PATENT DOCUMENTS

| | | | |
|---|---|---|---|
| 6,555,955 B1 | 4/2003 | Honda | |
| 8,207,108 B2* | 6/2012 | Jermann | A61Q 5/008 |
| | | | 512/2 |
| 8,492,071 B2* | 7/2013 | Taguchi | G02B 5/201 |
| | | | 430/281.1 |
| 2010/0025641 A1* | 2/2010 | Jimbo | G02B 5/26 |
| | | | 252/587 |
| 2016/0016919 A1* | 1/2016 | Norizuki | G03F 7/0007 |
| | | | 430/17 |
| 2016/0091643 A1 | 3/2016 | Arayama et al. | |
| 2017/0174869 A1* | 6/2017 | Arayama | G02B 5/223 |

FOREIGN PATENT DOCUMENTS

| | | |
|---|---|---|
| JP | 11-140130 A | 5/1999 |
| JP | 2000-105541 A | 4/2000 |
| JP | 2014-41301 A | 3/2014 |
| JP | 2014-105251 A | 6/2014 |
| JP | 2014-106309 A | 6/2014 |
| JP | 2014106309 A * | 6/2014 |
| JP | 2015-17244 A | 1/2015 |
| JP | 2016-146619 A | 8/2016 |
| TW | 201609991 A | 3/2016 |
| WO | WO 2015/025779 A1 | 2/2015 |
| WO | WO 20216/035695 A1 | 3/2016 |

OTHER PUBLICATIONS

Translation of JP2014-106309 (Patent application 2012-258098), Jun. 9, 2014. (Year: 2014).*
International Preliminary Report on Patentability and Written Opinion of the International Searching Authority (forms PCT/IB/373, PCT/ISA/237 and PCT/IB/326), dated Aug. 15, 2019, for corresponding International Application No. PCT/JP2017/046053, with a Written Opinion translation.
International Search Report (form PCT/ISA/210), dated Mar. 13, 2018 for corresponding International Application No. PCT/JP2017/046053, with an English translation.
Japanese Office Action, dated Aug. 25, 2020, for corresponding Japanese Application No. 2018-565985, with an English translation.
Taiwanese Office Action dated Mar. 30, 2021 for corresponding TW Application No. 106146191 with English Translation.

* cited by examiner

*Primary Examiner* — Hui H Chin
(74) *Attorney, Agent, or Firm* — Birch, Stewart, Kolasch & Birch, LLP

(57) ABSTRACT

A curable composition includes: a near infrared absorbing colorant; and a polymerizable monomer that has a group having an unsaturated double bond, in which the near infrared absorbing colorant is a compound that includes a π-conjugated plane having a monocyclic or fused aromatic ring, a content of the near infrared absorbing colorant is 10 mass % or higher with respect to a total solid content of the curable composition, and a content of a polymerizable monomer that has at least one group selected from an acid group or a hydroxyl group and a group having an unsaturated double bond is 50 mass % or lower with respect to a total mass of all the polymerizable monomers.

23 Claims, 1 Drawing Sheet

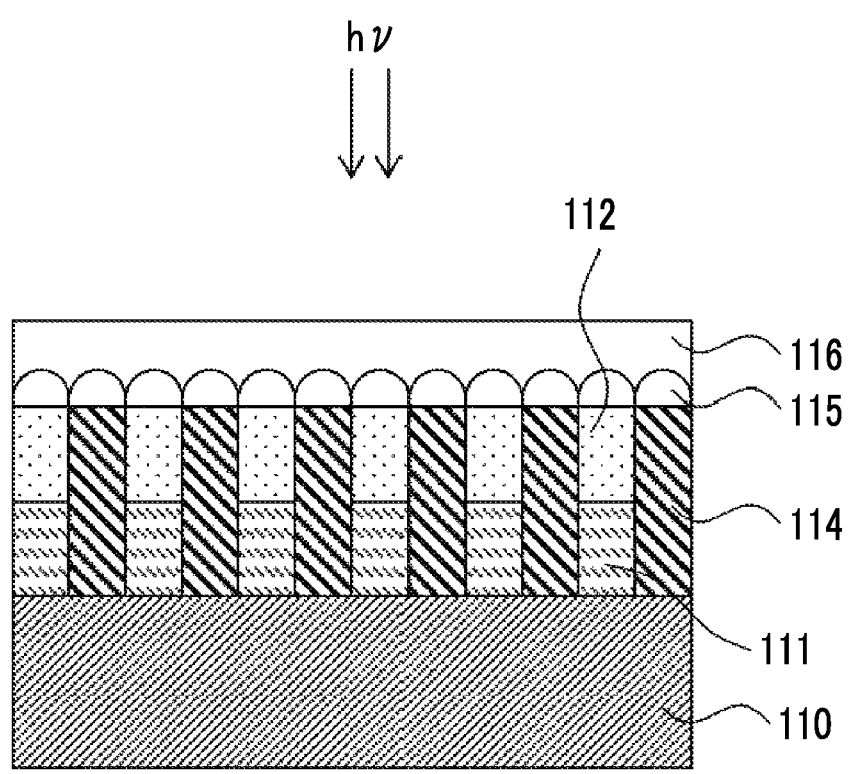

US 11,117,986 B2

CURABLE COMPOSITION, FILM, OPTICAL FILTER, SOLID IMAGE PICKUP ELEMENT, IMAGE DISPLAY DEVICE, AND INFRARED SENSOR

CROSS-REFERENCE TO RELATED APPLICATIONS

This application is a Continuation of PCT International Application No. PCT/JP2017/046053, filed on Dec. 22, 2017, which claims priority under 35 U.S.C. § 119(a) to Japanese Patent Application No. 2017-016784, filed on Feb. 1, 2017 and Japanese Patent Application No. 2017-235033, filed on Dec. 7, 2017. Each of the above application(s) is hereby expressly incorporated by reference, in its entirety, into the present application.

BACKGROUND OF THE INVENTION

1. Field of the Invention

The present invention relates to a curable composition, a film, an optical filter, a solid image pickup element, an image display device, and an infrared sensor.

2. Description of the Related Art

Recently, a digital camera, a mobile phone equipped with a camera, or the like has been widely used, and a demand for a solid image pickup element such as a charge coupled device (CCD) image sensor has increased significantly. As a key device of a display or an optical element, a color filter is used.

A color filter is manufactured by applying a coloring composition including a colorant and a polymerizable monomer to a substrate or the like. For example, JP2014-041301A describes a color filter is manufactured using a coloring composition. This coloring composition includes: an acrylic polymer having a polymerizable group; a polymer not having a polymerizable group, a monomer having three or more ethylenically unsaturated double bonds, a polymerization initiator, and a colorant, in which the content of the acrylic polymer having a polymerizable group is 1 to 14 mass % with respect to all the polymer components.

In addition, in a light receiving section of this solid image pickup element, a silicon photodiode having sensitivity to infrared light is used. Therefore, visibility may be corrected using a near infrared cut filter.

For example, JP2016-146619A describes a solid image pickup device comprising: a first optical layer that allows transmission of at least a part of visible light and near infrared light; a near infrared pass filter that absorbs at least a part of visible light and allows transmission of at least a part of near infrared light; and a pixel array including a first light-receiving element that detects visible light transmitted through the first optical layer and a second light-receiving element that detects near infrared light transmitted through the first optical layer and the near infrared pass filter.

In addition, JP2015-017244A describes that a near infrared cut filter is manufactured using a curable composition including: a near infrared absorbing colorant (A); a curable compound (B) having one or more selected from a fluorine atom, a silicon atom, a linear alkyl group having 8 or more carbon atoms, or a branched alkyl group having 3 or more carbon atoms; and a curable compound (C) that is different from the curable compound (B). Examples of the curable compound (C) include a compound having an epoxy group, an oxetanyl group, an acrylate group, or the like.

SUMMARY OF THE INVENTION

However, according to an investigation by the present inventors, it was found that, in a case where a film is formed using a curable composition including a near infrared absorbing colorant and a polymerizable monomer that has a group having an unsaturated double bond, foreign matter is likely to be formed during the film formation.

Accordingly, an object of the present invention is to provide a curable composition with which a film having reduced foreign matter can be formed. In addition, another object of the present invention is to provide a film having reduced foreign matter, an optical filter, a solid image pickup element, an image display device, and an infrared sensor.

The present inventors conducted an investigation under the above-described circumstances and found that the above-described objects can be achieved by adjusting the content of a polymerizable monomer that has at least one group selected from an acid group or a hydroxyl group and a group having an unsaturated double bond to be in a predetermined range with respect to the total mass of all the polymerizable monomers, thereby completing the present invention. The present invention provides the following.

<1> A curable composition comprising:
a near infrared absorbing colorant; and
a polymerizable monomer that has a group having an unsaturated double bond,
in which the near infrared absorbing colorant is a compound that includes a π-conjugated plane having a monocyclic or fused aromatic ring,
a content of the near infrared absorbing colorant is 10 mass % or higher with respect to a total solid content of the curable composition, and
a content of a polymerizable monomer that has at least one group selected from an acid group or a hydroxyl group and a group having an unsaturated double bond is 50 mass % or lower with respect to a total mass of all the polymerizable monomers.

<2> The curable composition according to <1>,
in which the content of the polymerizable monomer that has at least one group selected from an acid group or a hydroxyl group and a group having an unsaturated double bond is 30 mass % or lower with respect to the total mass of all the polymerizable monomers.

<3> The curable composition according to <1> or <2>,
in which the content of the polymerizable monomer that has at least one group selected from an acid group or a hydroxyl group and a group having an unsaturated double bond is 1 to 30 mass % with respect to the total mass of all the polymerizable monomers.

<4> The curable composition according to any one of <1> to <3>,
in which the polymerizable monomer is a compound that has two or more groups having an unsaturated double bond.

<5> The curable composition according to any one of <1> to <4>,
in which the near infrared absorbing colorant is a compound having a hydrophilic group.

<6> The curable composition according to any one of <1> to <5>, further comprising:
a resin.

<7> The curable composition according to any one of <1> to <6>, further comprising:
a chromatic colorant.

<8> The curable composition according to any one of <1> to <6>, further comprising:
a coloring material that allows transmission of infrared light and shields visible light.

<9> A film which is formed using the curable composition according to any one of <1> to <8>.

<10> An optical filter comprising:
the film according to <9>.

<11> The optical filter according to <10>,
in which the optical filter is a near infrared cut filter or an infrared transmitting filter.

<12> A solid image pickup element comprising:
the film according to <9>.

<13> An image display device comprising:
the film according to <9>.

<14> An infrared sensor comprising:
the film according to <9>.

According to the present invention, it is possible to provide a curable composition with which a film having reduced foreign matter can be formed. In addition, it is possible to provide a film having reduced foreign matter, an optical filter, a solid image pickup element, an image display device, and an infrared sensor.

BRIEF DESCRIPTION OF THE DRAWINGS

FIG. 1 is a schematic diagram showing an embodiment of an infrared sensor.

DESCRIPTION OF THE PREFERRED EMBODIMENTS

Hereinafter, the details of the present invention will be described.

In this specification, numerical ranges represented by "to" include numerical values before and after "to" as lower limit values and upper limit values.

In this specification, unless specified as a substituted group or as an unsubstituted group, a group (atomic group) denotes not only a group (atomic group) having no substituent but also a group (atomic group) having a substituent. For example, "alkyl group" denotes not only an alkyl group having no substituent (unsubstituted alkyl group) but also an alkyl group having a substituent (substituted alkyl group).

In this specification, unless specified otherwise, "exposure" denotes not only exposure using light but also drawing using a corpuscular beam such as an electron beam or an ion beam. Examples of the light used for exposure include an actinic ray or radiation, for example, a bright light spectrum of a mercury lamp, a far ultraviolet ray represented by excimer laser, an extreme ultraviolet ray (EUV ray), an X-ray, or an electron beam.

In this specification, "(meth)acrylate" denotes either or both of acrylate and methacrylate, "(meth)acryl" denotes either or both of acryl and methacryl, and "(meth)acryloyl" denotes either or both of acryloyl and methacryloyl.

In this specification, a weight-average molecular weight and a number-average molecular weight are defined as values in terms of polystyrene obtained by gel permeation chromatography (GPC).

In this specification, in a chemical formula, Me represents a methyl group, Et represents an ethyl group, Bu represents a butyl group, and Ph represents a phenyl group.

In this specification, near infrared light denotes light (electromagnetic wave) having an absorption maximum in a wavelength range of 700 to 2500 nm.

In this specification, a total solid content denotes the total mass of all the components of the composition excluding a solvent.

In this specification, the term "step" denotes not only an individual step but also a step which is not clearly distinguishable from another step as long as an effect expected from the step can be achieved.

<Curable Composition>

A curable composition according to an embodiment of the present invention comprises: a near infrared absorbing colorant; and a polymerizable monomer that has a group having an unsaturated double bond, in which the near infrared absorbing colorant is a compound that includes a π-conjugated plane having a monocyclic or fused aromatic ring, a content of the near infrared absorbing colorant is 10 mass % or higher with respect to a total solid content of the curable composition, and a content of a polymerizable monomer that has at least one group selected from an acid group or a hydroxyl group and a group having an unsaturated double bond is 50 mass % or lower with respect to a total mass of all the polymerizable monomers.

By using the curable composition according to the embodiment of the present invention, a film having reduced foreign matter can be formed. The reason why this effect is obtained is presumed to be as follows. In a case where a film is formed using a curable composition including a near infrared absorbing colorant and a polymerizable monomer that has a group having an unsaturated double bond, the reason for the formation of foreign matter during film formation is presumed to be that a metal, a halogen atom, or the like that is present in the system during film formation moves in the system during the film formation and interacts with the near infrared absorbing colorant such that the near infrared absorbing colorant or the like precipitates due to a change in crystallinity and foreign matter is formed. In the curable composition according to the embodiment of the present invention, the content of the polymerizable monomer that has at least one group selected from an acid group or a hydroxyl group and a group having an unsaturated double bond is 50 mass % or lower with respect to a total mass of all the polymerizable monomers. Therefore, a metal, a halogen atom, or the like present in the system during film formation can be suppressed from moving in the system. As a result, the precipitation of the near infrared absorbing colorant or the like can be suppressed, and a film having reduced foreign matter can be formed.

In addition, in a case where a compound that has a π-conjugated plane including a monocyclic or fused aromatic ring is used as a near infrared absorbing colorant, this near infrared absorbing colorant is likely to cause an aggregate to be formed in the film due to an interaction between π-conjugated planes. In particular, it is presumed that the formation of an aggregate is likely to be promoted in a high humidity environment. Therefore, it is presumed that, in a case where the film including the near infrared absorbing colorant is exposed to a high humidity environment, for example, particles of the near infrared absorbing colorant locally aggregate in the film such that spectral characteristics are likely to vary. However, with the curable composition according to the embodiment of the present invention, a film having excellent moisture resistance can be formed, and even in a case where this film is exposed to a high humidity environment, spectral variation can be suppressed. In the curable composition according to the embodiment of the present invention, the content of the polymerizable monomer that has at least one group selected from an acid group or a hydroxyl group and a group having an unsaturated double bond is low with respect to a total mass of all the polymerizable monomers. Therefore, it is presumed that permeation of moisture from the outside into the film can be effectively suppressed.

In addition, the curable composition according to the embodiment of the present invention further includes a coloring material that allows transmission of infrared light and shields visible light in addition to the near infrared absorbing colorant. As a result, an infrared transmitting filter that has excellent spectral characteristics and selectively allows transmission of specific infrared light can also be manufactured. In the infrared transmitting filter, the near infrared absorbing colorant has a function of limiting light to be transmitted (near infrared light) to a longer wavelength side. Hereinafter, each of the components of the curable composition according to the embodiment of the present invention will be described.

«Near Infrared Absorbing Colorant»

The curable composition according to the embodiment of the present invention includes a near infrared absorbing colorant as a compound that includes a π-conjugated plane having a monocyclic or fused aromatic ring. In the present invention, it is preferable that the near infrared absorbing colorant is a compound having an absorption in a near infrared range (preferably in a wavelength range of 700 to 1300 nm and more preferably in a wavelength range of 700 to 1000 nm).

In the present invention, the near infrared absorbing colorant includes the π-conjugated plane having a monocyclic or fused aromatic ring. Therefore, due to an interaction between aromatic rings on the π-conjugated plane of the near infrared absorbing colorant, a J-aggregate of the near infrared absorbing colorant is likely to be formed in the film, and a film having excellent spectral characteristics in a near infrared range can be formed.

In the present invention the near infrared absorbing colorant may be a pigment (also referred to as "near infrared absorbing pigment") or a dye (also referred to as "near infrared absorbing dye").

The number of atoms constituting the π-conjugated plane included in the near infrared absorbing colorant other than hydrogen is preferably 14 or more, more preferably 20 or more, still more preferably 25 or more, and still more preferably 30 or more. For example, the upper limit is preferably 80 or less and more preferably 50 or less.

The number of monocyclic or fused aromatic rings in the π-conjugated plane included in the near infrared absorbing colorant is preferably 2 or more, more preferably 3 or more, still more preferably 4 or more, and still more preferably 5 or more. The upper limit is preferably 100 or less, more preferably 50 or less, and still more preferably 30 or less. Examples of the aromatic ring include a benzene ring, a naphthalene ring, a pentalene ring, an indene ring, an azulene ring, a heptalene ring, an indacene ring, a perylene ring, a pentacene ring, a quaterrylene ring, an acenaphthene ring, a phenanthrene ring, an anthracene ring, a naphthacene ring, a chrysene ring, a triphenylene ring, a fluorene ring, a pyridine ring, a quinoline ring, an isoquinoline ring, an imidazole ring, a benzimidazole ring, a pyrazole ring, a thiazole ring, a benzothiazole ring, a triazole ring, a benzotriazole ring, an oxazole ring, a benzoxazole ring, an imidazoline ring, a pyrazine ring, a quinoxaline ring, a pyrimidine ring, a quinazoline ring, a pyridazine ring, a triazine ring, a pyrrole ring, an indole ring, an isoindole ring, a carbazole ring, and a fused ring including the above-described ring.

It is preferable that the near infrared absorbing colorant is a compound having a hydrophilic group. In a case where the compound having a hydrophilic group is used as the near infrared absorbing colorant, foreign matter or the like is likely to be formed during film formation or the moisture resistance of the film is likely to deteriorate in the related art. However, with the curable composition according to the embodiment of the present invention, even in a case where the compound having a hydrophilic group is used as the near infrared absorbing colorant, a film having reduced foreign matter and excellent moisture resistance can be formed. Accordingly, the curable composition according to the embodiment of the present invention is effective particularly in a case where the compound having a hydrophilic group is used as the near infrared absorbing colorant.

As the hydrophilic group, for example, a group having affinity to water can be used. Specific examples of the hydrophilic group include an amino group, a hydroxy group, a carboxyl group, a sulfo group, a cyano group, a methoxy group, a nitro group, an amido group, and a sulfonylamide group.

It is preferable that the near infrared absorbing colorant is a compound having an absorption maximum in a wavelength range of 700 to 1000 nm. In this specification, "having an absorption maximum in a wavelength range of 700 to 1000 nm" denotes having a maximum absorbance in a wavelength range of 700 to 1000 nm in an absorption spectrum of the near infrared absorbing colorant in a solution. Examples of a measurement solvent used for the measurement of the absorption spectra of the near infrared absorbing colorant in the solution include chloroform, methanol, dimethyl sulfoxide, ethyl acetate, and tetrahydrofuran. In the case of a compound which is soluble in chloroform, chloroform is used as the measurement solvent. In the case of a compound which is not soluble in chloroform, methanol is used. In addition, in the case of a compound which is not soluble in chloroform and methanol, dimethyl sulfoxide is used.

It is preferable that the near infrared absorbing colorant is a compound that has an absorption maximum in a wavelength range of 700 to 1000 nm and in which a ratio Amax/A550 of an absorbance Amax at the absorption maximum to an absorbance A550 at a wavelength of 550 nm is 50 to 500. Amax/A550 in the near infrared absorbing colorant is preferably 70 to 450 and more preferably 100 to 400. According to this aspect, a film having excellent visible transparency and near infrared shielding properties can be easily manufactured. The absorbance A550 at a wavelength of 550 nm and the absorbance Amax at the absorption maximum are values obtained from the absorption spectrum of the near infrared absorbing colorant in the solution.

In the present invention, as the near infrared absorbing colorant, at least two compounds having different absorption maximums are preferably used. According to this aspect, the waveform of the absorption spectrum of the film is wider than that in a case where one near infrared absorbing colorant is used, and the film can shield near infrared light in a wide wavelength range. In a case where at least two compounds having different absorption maximums are used, it is preferable that the compounds include at least a first near infrared absorbing colorant having an absorption maximum in a wavelength range of 700 to 1000 nm, and a second near infrared absorbing colorant having an absorption maximum in a wavelength range of 700 to 1000 nm which is shorter than the absorption maximum of the first near infrared absorbing colorant, and a difference between the absorption maximum of the first near infrared absorbing colorant and the absorption maximum of the second near infrared absorbing colorant is 1 to 150 nm.

In the present invention, as the near infrared absorbing colorant, at least one selected from a pyrrolopyrrole compound, a cyanine compound, a squarylium compound, a phthalocyanine compound, a naphthalocyanine compound, a quaterrylene compound, a merocyanine compound, a croconium compound, an oxonol compound, a diimmonium compound, a dithiol compound, a triarylmethane compound, a pyrromethene compound, an azomethine compound, an anthraquinone compound, or a dibenzofuranone compound is preferable, at least one selected from a pyrrolopyrrole compound, a cyanine compound, a squarylium compound, a phthalocyanine compound, a naphthalocyanine compound, or a quaterrylene compound is more preferable, at least one selected from a pyrrolopyrrole compound, a cyanine compound, or a squarylium compound is still more preferable, and a pyrrolopyrrole compound is still more preferable. Examples of the diimmonium compound include a compound described in JP2008-528706A, the content of which is incorporated herein by reference. Examples of the phthalocyanine compound include a compound described in paragraph "0093" of JP2012-077153A, oxytitaniumphthalocyanine described in JP2006-343631A, and a compound described in paragraphs "0013" to "0029" of JP2013-195480A, the contents of which are incorporated herein by reference. Examples of the naphthalocyanine compound include a compound described in paragraph "0093" of JP2012-077153A, the content of which is incorporated herein by reference. In addition, as the cyanine compound, the phthalocyanine compound, the naphthalocyanine compound, the diimmonium compound, or the squarylium compound, for example, a compound described in paragraphs "0010" to "0081" of JP2010-111750A may be used, the content of which is incorporated herein by reference. In addition, the details of the cyanine compound can be found in, for example, "Functional Colorants by Makoto Okawara, Masaru Matsuoka, Teijiro Kitao, and Tsuneoka Hirashima, published by Kodansha Scientific Ltd.", the content of which is incorporated herein by reference. In addition, a compound described in paragraphs JP2016-146619A can also be used as the near infrared absorbing colorant, the content of which is incorporated herein by reference.

As the pyrrolopyrrole compound, a compound represented by Formula (PP) is preferable.

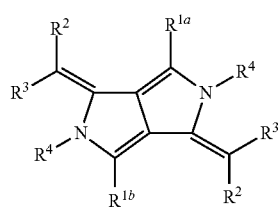

(PP)

In the formula, $R^{1a}$ and $R^{1b}$ each independently represent an alkyl group, an aryl group, or a heteroaryl group, $R^2$ and $R^3$ each independently represent a hydrogen atom or a substituent, $R^2$ and $R^3$ may be bonded to each other to form a ring, $R^4$'s each independently represent a hydrogen atom, an alkyl group, an aryl group, a heteroaryl group, $-BR^{4A}R^{4B}$, or a metal atom, $R^4$ may form a covalent bond or a coordinate bond with at least one selected from $R^{1a}$, $R^{1b}$, or $R^3$, and $R^{4A}$ and $R^{4B}$ each independently represent a substituent. The details of Formula (PP) can be found in paragraphs "0017" to "0047" of JP2009-263614A, paragraphs "0011" to "0036" of JP2011-068731A, and paragraphs "0010" to "0024" of WO2015/166873A, the contents of which are incorporated herein by reference.

$R^{1a}$ and $R^{1b}$ each independently represent preferably an aryl group or a heteroaryl group, and more preferably an aryl group. In addition, the alkyl group, the aryl group, and the heteroaryl group represented by $R^{1a}$ to $R^{1b}$ may have a substituent or may be unsubstituted. Examples of the substituent include an alkoxy group, a halogen atom, $-OCOR^{11}$, $-SOR^{12}$, $-SO_2R^{13}$, an amino group, a hydroxy group, a carboxyl group, a sulfo group, a cyano group, a nitro group, an amido group, and a sulfonylamide group. $R^{11}$ to $R^{13}$ each independently represent a hydrocarbon group or a heterocyclic group. In addition, examples of the substituent include substituents described in paragraphs "0020" to "0022" of 2009-263614A. In addition, the substituent may be a hydrophilic group. Specific examples of the group represented by $R^{1a}$ and $R^{1b}$ include an aryl group which has an alkoxy group having a branched alkyl group as a substituent, an aryl group which has a hydroxy group as a substituent, an aryl group which has a group represented by $-OCOR^{11}$ as a substituent, and an aryl group having a hydrophilic group. The number of carbon atoms in the branched alkyl group is preferably 3 to 30 and more preferably 3 to 20.

It is preferable that at least one of $R^2$ or $R^3$ represents an electron-withdrawing group, and it is more preferable that $R^2$ represents an electron-withdrawing group (preferably a cyano group) and $R^3$ represents a heteroaryl group. It is preferable that the heteroaryl group is a 5-membered or 6-membered ring. In addition, the heteroaryl group is preferably a monocycle or a fused ring, more preferably a monocycle or a fused ring composed of 2 to 8 rings, and still more preferably a monocycle or a fused ring composed of 2 to 4 rings. The number of heteroatoms constituting the heteroaryl group is preferably 1 to 3 and more preferably 1 or 2. Examples of the heteroatom include a nitrogen atom, an oxygen atom, and a sulfur atom. It is preferable that the heteroaryl group has one or more nitrogen atoms. Two $R^2$'s in Formula (PP) may be the same as or different from each other. In addition, two $R^3$'s in Formula (PP) may be the same as or different from each other.

$R^4$ represents preferably a hydrogen atom, an alkyl group, an aryl group, a heteroaryl group, or a group represented by $-BR^{4A}R^{4B}$, more preferably a hydrogen atom, an alkyl group, an aryl group, or a group represented by $-BR^{4A}R^{4B}$, and still more preferably a group represented by $-BR^{4A}R^{4B}$. As the substituent represented by $R^{4A}$ and $R^{4B}$, a halogen atom, an alkyl group, an alkoxy group, an aryl group, or a heteroaryl group is preferable, an alkyl group, an aryl group, or a heteroaryl group is more preferable, and an aryl group is still more preferable. Each of the groups may further have a substituent. Two $R^4$'s in Formula (PP) may be the same as or different from each other.

Specific examples of the compound represented by Formula (PP) include the following compounds. In the following structural formulae, Me represents a methyl group, and Ph represents a phenyl group. In addition, Examples of the pyrrolopyrrole compound include compounds described in paragraphs "0016" to "0058" of JP2009-263614A, compounds described in paragraphs "0037" to "0052" of JP2011-068731A, compounds described in paragraphs "0010" to "0033" of WO2015/166873A, the contents of which are incorporated herein by reference.

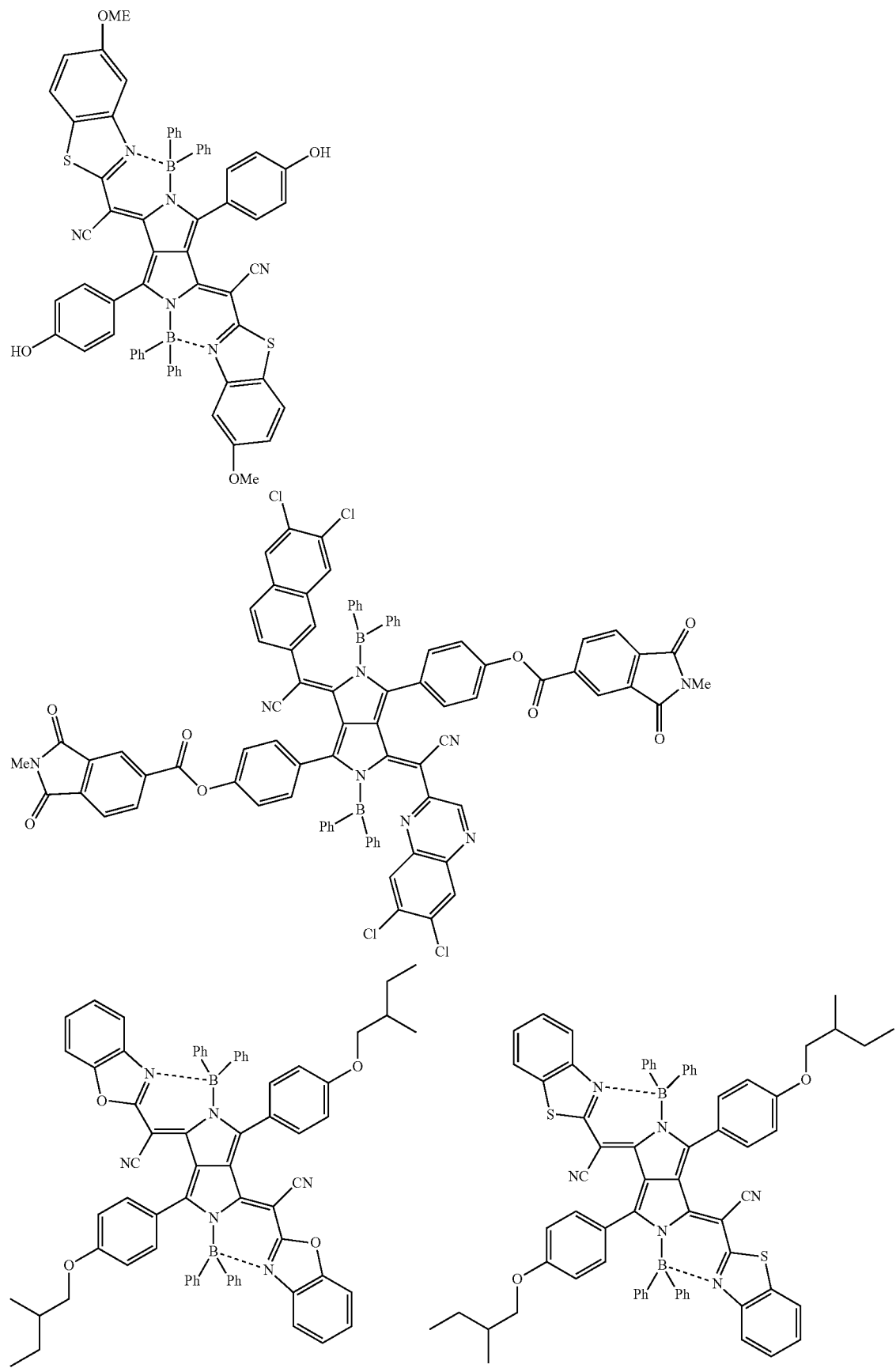

-continued
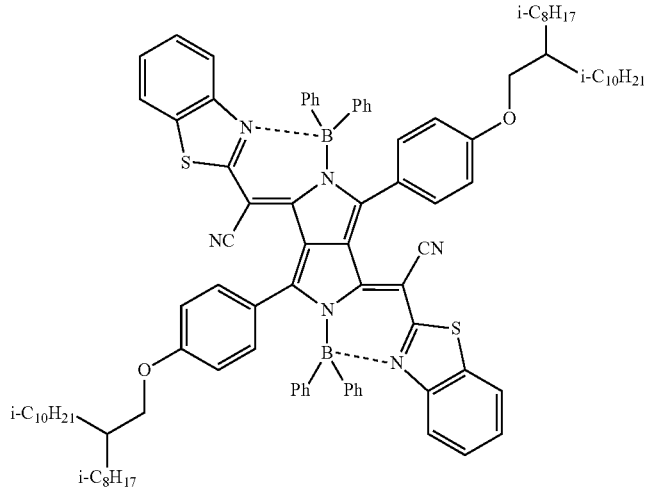
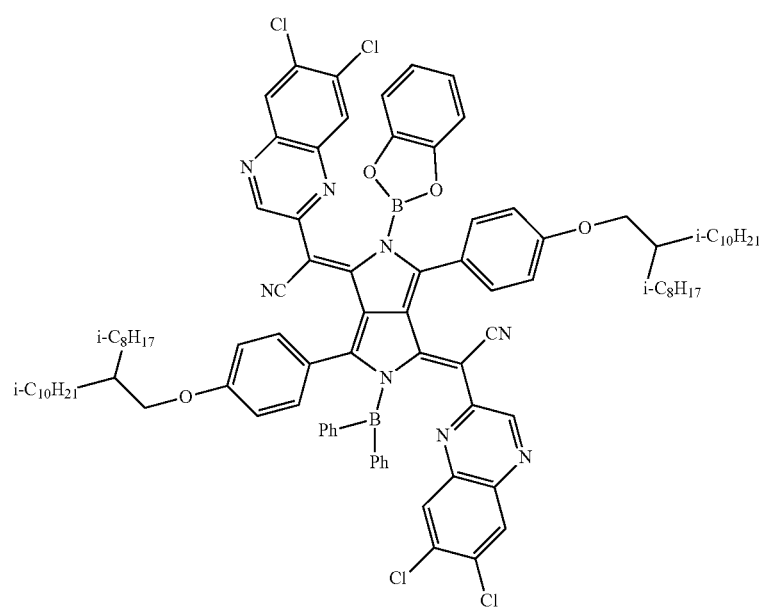

-continued

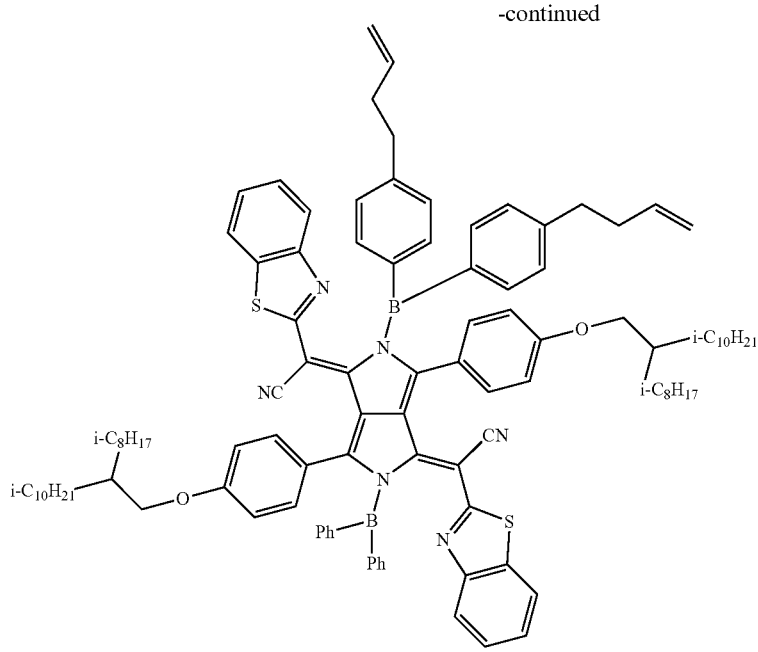

As the squarylium compound, a compound represented by the following Formula (SQ) is preferable.

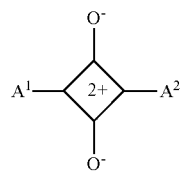
(SQ)

In Formula (SQ), $A^1$ and $A^2$ each independently represent an aryl group, a heteroaryl group, or a group represented by Formula (A-1).

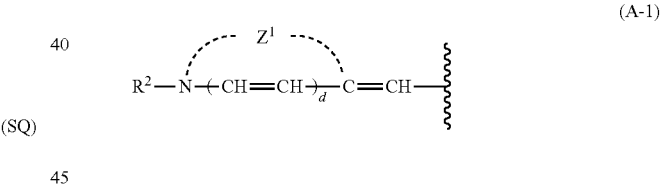
(A-1)

In Formula (A-1), $Z^1$ represents a non-metal atomic group for forming a nitrogen-containing heterocycle, $R^2$ represents an alkyl group, an alkenyl group, or an aralkyl group, d represents 0 or 1, and a wave line represents a direct bond. The details of Formula (SQ) can be found in paragraphs "0020" to "0049" of JP2011-208101A, the content of which is incorporated herein by reference.

As shown below, cations in Formula (SQ) are present without being localized.

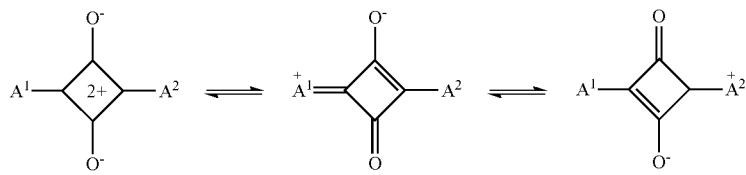

Specific examples of the squarylium compound include the following compounds. In the following structural formula, EH represents an ethylhexyl group. Examples of the squarylium compound include a compound described in paragraphs "0044" to "0049" of JP2011-208101A, the content of which is incorporated herein by reference.

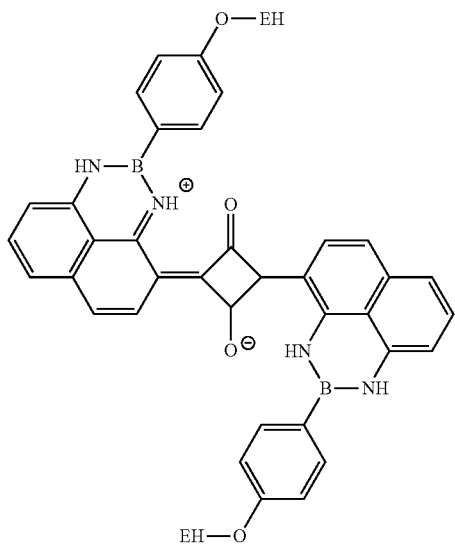

As the cyanine compound, a compound represented by Formula (C) is preferable. Formula (C)

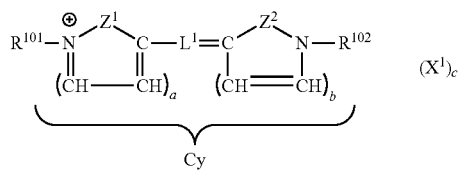

In the formula, $Z^1$ and $Z^2$ each independently represent a non-metal atomic group for forming a 5- or 6-membered nitrogen-containing heterocycle which may be fused.

$R^{101}$ and $R^{102}$ each independently represent an alkyl group, an alkenyl group, an alkynyl group, an aralkyl group, or an aryl group.

$L^1$ represents a methine chain including an odd number of methine groups.

a and b each independently represent 0 or 1.

In a case where a represents 0, a carbon atom and a nitrogen atom are bonded through a double bond. In a case where b represents 0, a carbon atom and a nitrogen atom are bonded through a single bond.

In a case where a site represented by Cy in the formula is a cation site, $X^1$ represents an anion, and c represents the number of $X^1$'s for balancing charge. In a case where a site represented by Cy in the formula is an anion site, $X^1$ represents a cation, and c represents the number of $X^1$'s for balancing charge. In a case where charge of a site represented by Cy in the formula is neutralized in a molecule, c represents 0.

Specific examples of the cyanine compound include the following compounds. In the following structural formulae, Me represents a methyl group. In addition, examples of the cyanine compound include a compound described in paragraphs "0044" and "0045" of JP2009-108267A, a compound described in paragraphs "0026" to "0030" of JP2002-194040, a compound described in JP2015-172004A, a compound described in JP2015-172102A, and a compound described in JP2008-088426A, the contents of which are incorporated herein by reference.

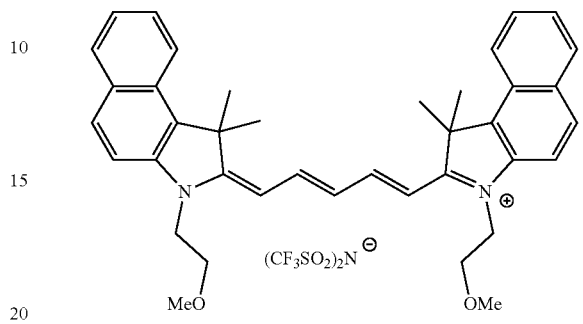

In the present invention, as the near infrared absorbing colorant, a commercially available product can also be used. Examples of the commercially available product include SDO-C33 (manufactured by Arimoto Chemical Co., Ltd.); EXCOLOR IR-14, EXCOLOR IR-10A, EXCOLOR TX-EX-801B, and EXCOLOR TX-EX-805K (manufactured by Nippon Shokubai Co., Ltd.); Shigenox NIA-8041, Shigenox NIA-8042, Shigenox NIA-814, Shigenox NIA-820, and Shigenox NIA-839 (manufactured by Hakkol Chemical Co., Ltd.); Epolite V-63, Epolight 3801, and Epolight3036 (manufactured by Epolin Inc.); PRO-JET 825LDI (manufactured by Fujifilm Corporation); NK-3027 and NK-5060 (manufactured by Hayashibara Co., Ltd.); and YKR-3070 (manufactured by Mitsui Chemicals, Inc.).

In the curable composition according to the embodiment of the present invention, the content of the near infrared absorbing colorant is 10 mass % or higher, preferably 12 mass % or higher, and more preferably 14 mass % or higher with respect to the total solid content of the curable composition according to the embodiment of the present invention. In a case where the content of the near infrared absorbing colorant is 10 mass % or higher, a film having excellent near infrared shielding properties can be easily formed. The upper limit of the content of the near infrared absorbing colorant is preferably 80 mass % or lower, more preferably 75 mass % or lower, and still more preferably 70 mass % or lower. In the present invention, as the near infrared absorbing colorant, one kind may be used alone, or two or more kinds may be used. In a case where two or more near infrared absorbing colorants are used in combination, it is preferable that the total content of the two or more near infrared absorbing colorants is in the above-described range.

«Other Near Infrared Absorbers»

The curable composition according to the embodiment of the present invention may further include near infrared absorbers (also referred to as "other near infrared absorbers") other than the near infrared absorbing colorant. Examples of the other near infrared absorbers include an inorganic pigment (inorganic particles). The shape of the inorganic pigment is not particularly limited and may have a sheet shape, a wire shape, or a tube shape irrespective of whether or not the shape is spherical or non-spherical. As the inorganic pigment, metal oxide particles or metal particles are preferable. Examples of the metal oxide particles include indium tin oxide (ITO) particles, antimony tin oxide (ATO) particles, zinc oxide (ZnO) particles, Al-doped zinc oxide (Al-doped ZnO) particles, fluorine-doped tin dioxide (F-doped SnO$_2$) particles, and niobium-doped titanium dioxide (Nb-doped TiO$_2$) particles. Examples of the metal particles include silver (Ag) particles, gold (Au) particles, copper (Cu) particles, and nickel (Ni) particles. In addition, as the inorganic pigment, a tungsten oxide compound can also be used. As the tungsten oxide compound, cesium tungsten oxide is preferable. The details of the tungsten oxide compound can be found in paragraph "0080" of JP2016-006476A, the content of which is incorporated herein by reference.

In a case where the curable composition according to the embodiment of the present invention includes the other near infrared absorbers, the content of the other near infrared absorbers is preferably 0.01 to 50 mass % with respect to the total solid content of the curable composition according to the embodiment of the present invention. The lower limit is preferably 0.1 mass % or higher and more preferably 0.5 mass % or higher. The upper limit is preferably 30 mass % or lower, and more preferably 15 mass % or lower.

In addition, the content of the other near infrared absorbing absorbers is preferably 1 to 99 mass % with respect to the total mass of the near infrared absorbing colorant and the other near infrared absorbers. The upper limit is preferably 80 mass % or lower, more preferably 50 mass % or lower, and still more preferably 30 mass % or lower.

In addition, it is also preferable that the curable composition according to the embodiment of the present invention does not substantially include the other near infrared absorbers. Substantially not including the other near infrared absorbers represents that the content of the other near infrared absorbers is preferably 0.5 mass % or lower, more preferably 0.1 mass % or lower, and still more preferably 0 mass % with respect to the total mass of the near infrared absorbing colorant and the other near infrared absorbers.

«Polymerizable Monomer»

The curable composition according to the embodiment of the present invention includes a polymerizable monomer that has a group having an unsaturated double bond. As the polymerizable monomer, a compound that has two or more groups having an unsaturated double bond is preferable, and a compound that has three or more groups having an unsaturated double bond is more preferable. The upper limit of the number of groups having an unsaturated double bond in the polymerizable monomer is, for example, preferably 15 or less and more preferably 10 or less. Examples of the group having an unsaturated double bond include a vinyl group, a styrene group, a (meth)allyl group, and a (meth)acryloyl group.

The molecular weight of the polymerizable monomer is preferably 5000 or lower, more preferably 3000 or lower, still more preferably 2000 or lower, and still more preferably 1500 or lower. The lower limit is, for example, preferably 100 or higher and more preferably 250 or higher. As the polymerizable monomer, a (meth)acrylate compound having 3 to 15 functional groups is preferable, a (meth)acrylate compound having 3 to 10 functional groups is more preferable, and a (meth)acrylate compound having 3 to 6 functional groups is still more preferable.

In the curable composition according to the embodiment of the present invention, the content of the polymerizable monomer (hereinafter, also referred to as "polymerizable monomer M1") that has at least one group selected from an acid group or a hydroxyl group and a group having an unsaturated double bond is 50 mass % or lower, preferably 30 mass % or lower, more preferably 25 mass % or lower, still more preferably 20 mass % or lower, and still more preferably 15 mass % or lower with respect to a total mass of all the polymerizable monomers. The lower limit is preferably 1 mass % or higher, more preferably 5 mass % or higher, and still more preferably 10 mass % or higher. The content of the polymerizable monomer M1 is preferably 1 to 30 mass % with respect to the total mass of all the polymerizable monomers. In a case where the content of the polymerizable monomer M1 is 50 mass % or lower with respect to the total mass of all the polymerizable monomers, a film having reduced foreign matter can be formed. In the present invention, it is also preferable that the polymerizable monomers do not substantially include the polymerizable monomer M1. The polymerizable monomers substantially not including the polymerizable monomer M1 represents that the content of the polymerizable monomer M1 is preferably 0.5 mass % or lower, more preferably 0.1 mass % or lower, and still more preferably 0 mass % with respect to the total mass of all the polymerizable monomers.

Examples of the acid group included in the polymerizable monomer M1 include a carboxyl group, a sulfo group, and a phosphate group. The pKa of the polymerizable monomer M1 is preferably 6 or lower or 9 or higher and more preferably 5 or lower or 11 or higher.

It is preferable that the polymerizable monomer M1 is a compound represented by the following Formula (M-1).

$(A^1)_{n1}$-$L^1$-$(Ac^1)_{n2}$      Formula (M-1)

(In Formula (M-1), $A^1$ represents a hydroxyl group or an acid group, $L^1$ represents a (n1+n2)valent group, $Ac^1$ represents a group having an unsaturated double bond, n1 represents an integer of 1 or more, and n2 represents an integer of 1 or more)

Examples of the acid group represented by $A^1$ include a carboxyl group, a sulfo group, and a phosphate group. Among these, a carboxyl group is preferable.

Examples of the (n1+n2)valent group represented by $L^1$ include a hydrocarbon group, a heterocyclic group, —O—, —S—, —NR—, —CO—, —COO—, —OCO—, —SO$_2$—, a group including a combination of the above-described groups. R represents a hydrogen atom, an alkyl group, or an aryl group and preferably a hydrogen atom. The hydrocarbon group may be an aliphatic hydrocarbon group or an aromatic hydrocarbon group. In addition, the aliphatic hydrocarbon group may be cyclic or acyclic. In addition, the aliphatic hydrocarbon group may be a saturated aliphatic hydrocarbon group or an unsaturated aliphatic hydrocarbon group. The hydrocarbon group may have a substituent or may be unsubstituted. In addition, the cyclic aliphatic hydrocarbon group and the aromatic hydrocarbon group may be a monocycle or a fused ring. The heterocyclic group may be a monocycle or a fused ring. It is preferable that the heterocyclic group is a 5-membered or 6-membered ring. The heterocyclic group may be an aliphatic heterocyclic group or an aromatic heterocyclic group. In addition, examples of the heteroatom constituting the heterocyclic group include a nitrogen atom, an oxygen atom, and a sulfur atom. It is preferable that $L^1$ represents a group including at least a hydrocarbon group. The number of carbon atoms constituting $L^1$ is preferably 3 to 100 and more preferably 6 to 50.

Examples of the group having an unsaturated double bond represented by $Ac^1$ include a vinyl group, a styrene group, a (meth)allyl group, and a (meth)acryloyl group. Among these, a (meth)acryloyl group is preferable.

n1 represents preferably 1 or 2 and more preferably 1. n2 represents preferably 2 or more and more preferably 3 or more. The upper limit of n2 is preferably 15 or less and more preferably 10 or less.

Examples of the polymerizable monomer M1 include an ester compound of an aliphatic polyhydroxy compound and an unsaturated carboxylic acid.

As the polymerizable monomers, the curable composition according to the embodiment of the present invention includes a polymerizable monomer that does not have a hydroxyl group and an acid group (hereinafter, also referred to as "polymerizable monomer M2") in addition to the polymerizable monomer M1.

It is preferable that the polymerizable monomer M2 is a compound represented by the following Formula (M-2).

$$L^2\text{-}(Ac^2)_{n3} \qquad \text{Formula (M-2)}$$

(In Formula (M-2), $L^2$ represents a n3-valent group, $Ac^2$ represents a group having an unsaturated double bond, and n3 represents an integer of 1 or more)

Examples of the n3-valent group represented by $L^2$ include a hydrocarbon group, a heterocyclic group, —O—, —S—, —NR—, —CO—, —COO—, —OCO—, —SO$_2$—, a group including a combination of the above-described groups. R represents a hydrogen atom, an alkyl group, or an aryl group and preferably a hydrogen atom. The details of the hydrocarbon group and the heterocyclic group are the same as the range described above regarding $L^1$. It is preferable that $L^2$ represents a group including at least a hydrocarbon group. The number of carbon atoms constituting $L^2$ is preferably 3 to 100 and more preferably 6 to 50.

Examples of the group having an unsaturated double bond represented by $Ac^2$ include a vinyl group, a styrene group, a (meth)allyl group, and a (meth)acryloyl group. Among these, a (meth)acryloyl group is preferable.

n3 represents preferably 2 or more and more preferably 3 or more. The upper limit of n2 is preferably 15 or less and more preferably 10 or less.

Examples of the polymerizable monomer M2 include dipentaerythritol hexaacrylate, pentaerythritol tetraacrylate, trimethylolpropane triacrylate, and ditrimethylolpropane tetraacrylate.

It is also preferable that the polymerizable monomer M1 and the polymerizable monomer M2 are compounds having an alkyleneoxy group. As the compound having an alkyleneoxy group, a compound having an ethyleneoxy group and/or a propyleneoxy group is preferable, a compound having an ethyleneoxy group is more preferable, and a trifunctional to hexafunctional (meth)acrylate compound having 4 to 20 ethyleneoxy groups is still more preferable.

As the polymerizable monomer M1 and the polymerizable monomer M2, compounds represented by the following Formulae (MO-1) to (MO-5) can also be preferably used. In a case where T in the formulae represents an oxyalkylene group, a terminal thereof on a carbon atom side is bonded to R.

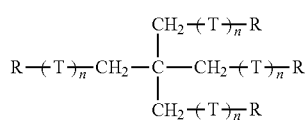
(MO-1)

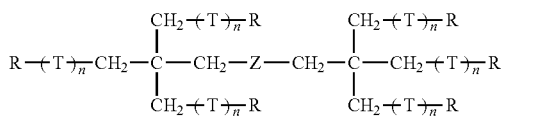
(MO-2)

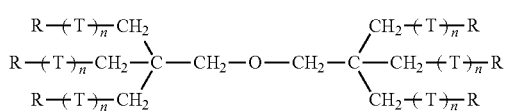
(MO-3)

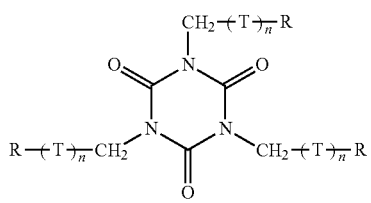
(MO-4)

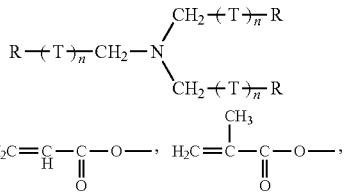
(MO-5)

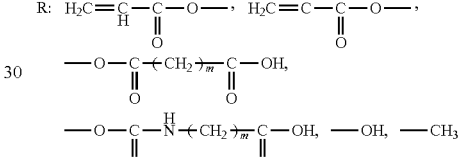

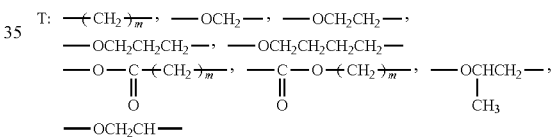

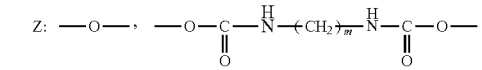

In the formulae, n represents 0 to 14, and m represents 1 to 8. A plurality of R's and a plurality of T's which are present in one molecule may be the same as or different from each other.

At least one of a plurality of R's which are present in each of the compounds represented by Formula (MO-1) to (MO-5) represents a group represented by —OC(=O)CH=CH$_2$ or —OC(=O)C(CH$_3$)=CH$_2$.

Specific examples of the polymerizable compounds represented by Formulae (MO-1) to (MO-5) include compounds described in paragraphs "0248" to "0251" of JP2007-269779A.

In addition, it is also preferable that the polymerizable monomer M1 and the polymerizable monomer M2 are compounds having a caprolactone structure. The compound having a caprolactone structure is not particularly limited as long as it has a caprolactone structure in the molecule thereof, and examples thereof include ε-caprolactone-modified polyfunctional (meth)acrylate obtained by esterification of a polyhydric alcohol, (meth)acrylic acid, and ε-caprolactone, the polyhydric alcohol being, for example, trimethylolethane, ditrimethylolethane, trimethylolpropane, ditrimethylolpropane, pentaerythritol, dipentaerythritol, tripentaerythritol, glycerin, diglycerol, or trimethylolmelamine. As the compound having a caprolactone structure, a compound represented by the following Formula (Z-1) is preferable.

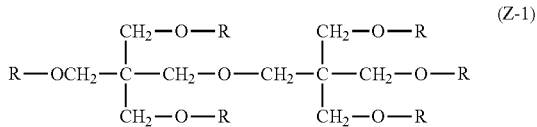

In Formula (Z-1), all of six R's represent a group represented by Formula (Z-2), or one to five R's among the six R's represent a group represented by Formula (Z-2) and the remaining R's represent a group represented by Formula (Z-3), an acid group, or a hydroxyl group.

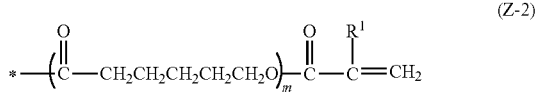

In Formula (Z-2), $R^1$ represents a hydrogen atom or a methyl group, m represents an integer of 1 or 2, and "*" represents a direct bond.

In Formula (Z-3), $R^1$ represents a hydrogen atom or a methyl group, and "*" represents a direct bond.

As the polymerizable monomer M1 and the polymerizable monomer M2, a compound represented by Formula (Z-4) or (Z-5) can also be used.

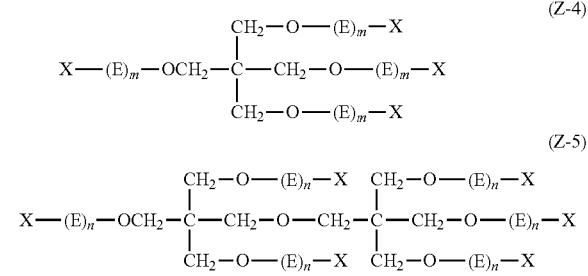

In Formulae (Z-4) and (Z-5), E's each independently represent $-((CH_2)_yCH_2O)-$ or $-((CH_2)_yCH(CH_3)O)-$, y's each independently represent an integer of 0 to 10, and X's each independently represent a (meth)acryloyl group, a hydrogen atom, or a carboxyl group. In Formula (Z-4), the total number of (meth)acryloyl groups is 3 or 4, m's each independently represent an integer of 0 to 10, and the sum of m's is an integer of 0 to 40. In Formula (Z-5), the total number of (meth)acryloyl groups is 5 or 6, n's each independently represent an integer of 0 to 10, and the sum of n's is an integer of 0 to 60.

In Formula (Z-4), m represents preferably an integer of 0 to 6 and more preferably an integer of 0 to 4. In addition, the sum of m's is preferably an integer of 2 to 40, more preferably an integer of 2 to 16, and still more preferably an integer of 4 to 8.

In Formula (Z-5), n represents preferably an integer of 0 to 6 and more preferably an integer of 0 to 4.

In addition, the sum of n's is preferably an integer of 3 to 60, more preferably an integer of 3 to 24, and still more preferably an integer of 6 to 12.

In addition, it is preferable that, in $-((CH_2)_yCH_2O)-$ or $-((CH_2)_yCH(CH_3)O)-$ of Formula (Z-4) or (Z-5), a terminal thereof on an oxygen atom side is bonded to X.

In the curable composition according to the embodiment of the present invention, the total content of the polymerizable monomers (the total content of the polymerizable monomer M1 and the polymerizable monomer M2) is preferably 5 to 60 mass % with respect to the total solid content of the curable composition. The lower limit is, for example, preferably 5 mass % or higher, more preferably 10 mass % or higher, and still more preferably 15 mass % or higher. The upper limit is, for example, preferably 60 mass % or lower, more preferably 55 mass % or lower, and still more preferably 50 mass % or lower.

«Epoxy Compound»

The curable composition according to the embodiment of the present invention may include a compound having an epoxy group (hereinafter, also referred to as "epoxy compound"). Examples of the epoxy compound include a monofunctional or polyfunctional glycidyl ether compound, a polyfunctional aliphatic glycidyl ether compound, and a compound having an alicyclic epoxy group.

It is preferable that the epoxy compound is a compound having 1 to 100 epoxy groups in one molecule. The upper limit of the number of epoxy groups is, for example, 10 or less or 5 or less. The lower limit is preferably 2 or more.

The epoxy compound may be a low molecular weight compound (for example, molecular weight: lower than 1000) or a high molecular weight compound (macromolecule; for example, molecular weight: 1000 or higher, and in the case of a polymer, weight-average molecular weight: 1000 or higher). The weight-average molecular weight of the epoxy compound is preferably 2000 to 100000. The upper limit of the weight-average molecular weight is preferably 10000 or lower, more preferably 5000 or lower, and still more preferably 3000 or lower.

Examples of a commercially available product of the epoxy compound include EHPE 3150 (manufactured by Daicel Corporation), EPICLON N-695 (manufactured by DIC Corporation), ADEKA GLYCILOL ED-505 (manufactured by Adeka Corporation, an epoxy group-containing monomer), and MARPROOF G-0150M, G-0105SA, G-0130SP, G-0250SP, G-1005S, G-1005SA, G-1010S, G-2050M, G-01100, or G-01758 (manufactured by NOF Corporation, an epoxy group-containing polymer). In addition, as the epoxy compound, compounds described in paragraphs "0034" to "0036" of JP2013-011869A, paragraphs "0147" to "0156" of JP2014-043556A, and paragraphs "0085" to "0092" of JP2014-089408A can also be used. The contents of which are incorporated herein by reference.

In a case where the curable composition according to the embodiment of the present invention includes the epoxy compound, the content of the epoxy compound is preferably 0.1 mass % or higher and more preferably 0.5 mass % or higher with respect to the total solid content of the curable composition. The upper limit is preferably 60 mass % or lower, more preferably 50 mass % or lower, and still more preferably 40 mass % or lower.

«Resin»

It is preferable that the curable composition according to the embodiment of the present invention includes a resin. The resin is added, for example, in order to disperse particles of the pigments and the like in the composition or to be added as a binder. The resin which is mainly used to disperse particles of the pigments and the like will also be called a dispersant. However, the above-described uses of the resin are merely exemplary, and the resin can be used for purposes other than the uses.

The weight-average molecular weight (Mw) of the resin is preferably 2000 to 2000000. The upper limit is preferably 1000000 or lower and more preferably 500000 or lower. The lower limit is preferably 3000 or higher and more preferably 5000 or higher.

Examples of the resin include a (meth)acrylic resin, an epoxy resin, an enethiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, and a styrene resin. Among these resins, one kind may be used alone, or a mixture of two or more kinds may be used.

The resin used in the present invention may have an acid group. Examples of the acid group include a carboxyl group, a phosphate group, a sulfo group, and a phenolic hydroxy group. Among these, a carboxyl group is preferable. Among these acid groups, one kind may be used alone, or two or more kinds may be used in combination. The resin having an acid group can also be used as an alkali-soluble resin.

As the resin having an acid group, a polymer having a carboxyl group at a side chain is preferable. Specific examples of the resin include an alkali-soluble phenol resin such as a methacrylic acid copolymer, an acrylic acid copolymer, an itaconic acid copolymer, a crotonic acid copolymer, a maleic acid copolymer, a partially esterified maleic acid copolymer, or a novolac resin, an acidic cellulose derivative having a carboxyl group at a side chain thereof, and a resin obtained by adding an acid anhydride to a polymer having a hydroxy group. In particular, a copolymer of (meth)acrylic acid and another monomer which is copolymerizable with the (meth)acrylic acid is preferable as the alkali-soluble resin. Examples of the monomer which is copolymerizable with the (meth)acrylic acid include an alkyl (meth)acrylate, an aryl (meth)acrylate, and a vinyl compound. Examples of the alkyl (meth)acrylate and the aryl (meth)acrylate include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth)acrylate, tolyl (meth)acrylate, naphthyl (meth)acrylate, and cyclohexyl (meth)acrylate. Examples of the vinyl compound include styrene, α-methylstyrene, vinyl toluene, glycidyl methacrylate, acrylonitrile, vinyl acetate, N-vinylpyrrolidone, tetrahydrofurfuryl methacrylate, a polystyrene macromonomer, and a polymethyl methacrylate macromonomer. Examples of other monomers include a N-position-substituted maleimide monomer described in JP1998-300922A (JP-H10-300922A) such as N-phenylmaleimide or N-cyclohexylmaleimide. Among these monomers which are copolymerizable with the (meth)acrylic acid, one kind may be used alone, or two or more kinds may be used in combination.

The resin having an acid group may further have a polymerizable group. Examples of the polymerizable group include a (meth)allyl group and a (meth)acryloyl group.

Examples of a commercially available product of the resin include DIANAL NR series (manufactured by Mitsubishi Rayon Co., Ltd.), PHOTOMER 6173 (a carboxyl group-containing polyurethane acrylate oligomer; manufactured by Diamond Shamrock Co., Ltd.), VISCOAT R-264 and KS Resist 106 (both of which are manufactured by Osaka Organic Chemical Industry Ltd.), CYCLOMER P series (for example, ACA230AA) and PLAKCEL CF200 series (both of which manufactured by Daicel Corporation), EBECRYL 3800 (manufactured by Daicel-UCB Co., Ltd.), and ACRYCURE RD-F8 (manufactured by Nippon Shokubai Co., Ltd.).

As the resin having an acid group, a copolymer including benzyl (meth)acrylate and (meth)acrylic acid; a copolymer including benzyl (meth)acrylate, (meth)acrylic acid, and 2-hydroxyethyl (meth)acrylate; or a multi-component copolymer including benzyl (meth)acrylate, (meth)acrylic acid, and another monomer can be preferably used. In addition, copolymers described in JP1995-140654A (JP-H7-140654A) obtained by copolymerization of 2-hydroxyethyl (meth)acrylate can be preferably used, and examples thereof include: a copolymer including 2-hydroxypropyl (meth)acrylate, a polystyrene macromonomer, benzyl methacrylate, and methacrylic acid; a copolymer including 2-hydroxy-3-phenoxypropyl acrylate, a polymethyl methacrylate macromonomer, benzyl methacrylate, and methacrylic acid; a copolymer including 2-hydroxyethyl methacrylate, a polystyrene macromonomer, methyl methacrylate, and methacrylic acid; or a copolymer including 2-hydroxyethyl methacrylate, a polystyrene macromonomer, benzyl methacrylate, and methacrylic acid.

As the resin having an acid group, a polymer that includes a repeating unit derived from monomer components including a compound represented by the following Formula (ED1) and/or a compound represented by the following Formula (ED2) (hereinafter, these compounds will also be referred to as "ether dimer") is also preferable.

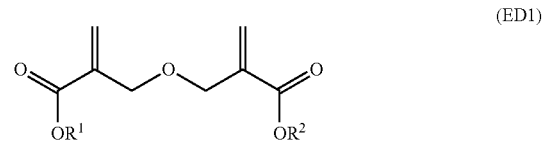

(ED1)

In Formula (ED1), $R^1$ and $R^2$ each independently represent a hydrogen atom or a hydrocarbon group having 1 to 25 carbon atoms which may have a substituent.

(ED2)

In Formula (ED2), R represents a hydrogen atom or an organic group having 1 to 30 carbon atoms. Specific examples of Formula (ED2) can be found in the description of JP2010-168539A.

Specific examples of the ether dimer can be found in paragraph "0317" of JP2013-029760A, the content of which is incorporated herein by reference. Among these ether dimers, one kind may be used alone, or two or more kinds may be used in combination.

The resin having an acid group may include a repeating unit which is derived from a compound represented by the following Formula (X).

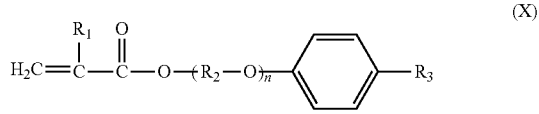

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms which may have a benzene ring. n represents an integer of 1 to 15.

The details of the resin having an acid group can be found in paragraphs "0558" to "0571" of JP2012-208494A (corresponding to paragraphs "0685" to "0700" of US2012/0235099A) and paragraphs "0076" to "0099" of JP2012-198408A, the contents of which are incorporated herein by reference. In addition, as the resin having an acid group, a commercially available product may also be used. Examples of the commercially available product include ACRYBASE FF-426 (manufactured by Fujikura Kasei Co., Ltd.).

The acid value of the resin having an acid group is preferably 30 to 200 mgKOH/g. The lower limit is preferably 50 mgKOH/g or higher and more preferably 70 mgKOH/g or higher. The upper limit is preferably 150 mgKOH/g or lower and more preferably 120 mgKOH/g or lower.

Examples of the resin having an acid group include resins having the following structures. In the following structural formulae, Me represents a methyl group.

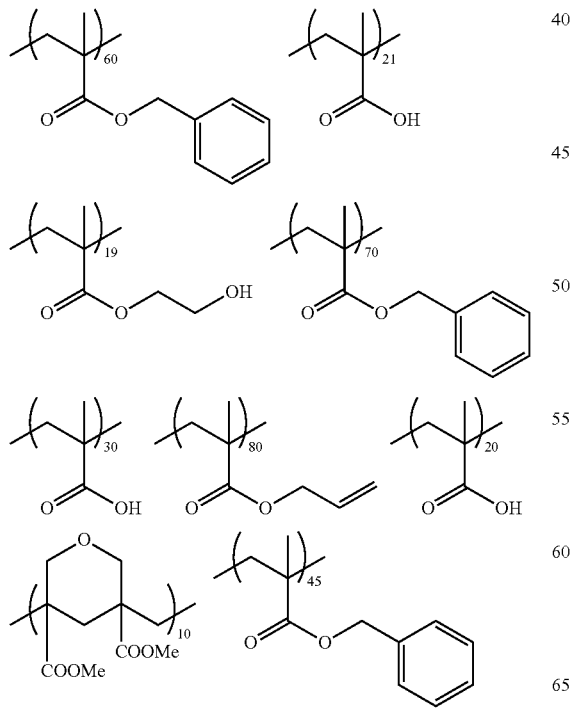

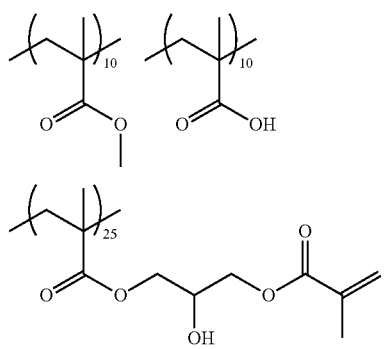

In the curable composition according to the embodiment of the present invention, as the resin, a resin having a repeating unit represented by any one of Formulae (A3-1) to (A3-7) is also preferably used.

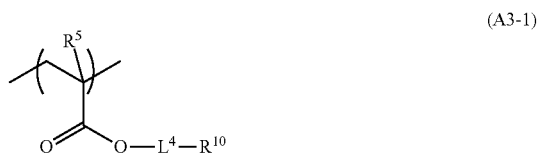

(A3-1)

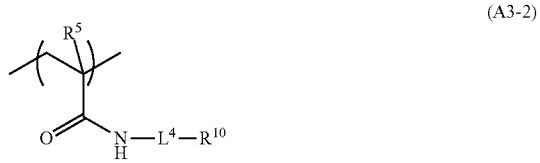

(A3-2)

(A3-3)

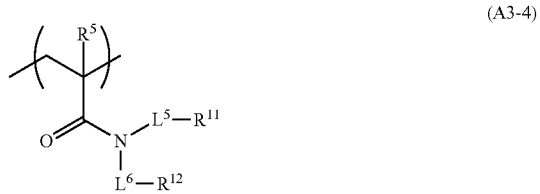

(A3-4)

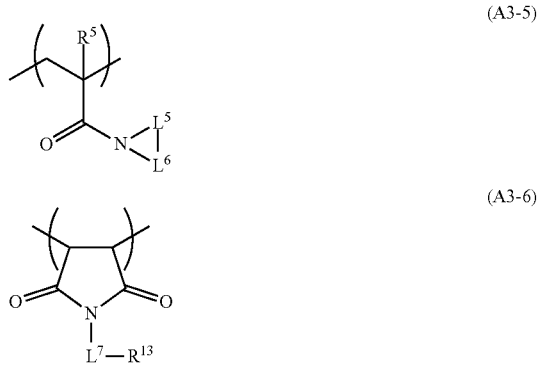

(A3-5)

(A3-6)

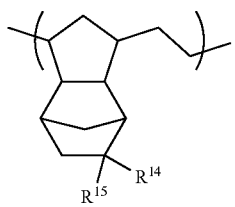

(A3-7)

In the formulae, $R^5$ represents a hydrogen atom or an alkyl group, $L^4$ to $L^7$ each independently represent a single bond or a divalent linking group, and $R^{10}$ to $R^{13}$ each independently represent an alkyl group or an aryl group. $R^{14}$ and $R^{15}$ each independently represent a hydrogen atom or a substituent.

$R^5$ represents a hydrogen atom or an alkyl group. The number of carbon atoms in the alkyl group is preferably 1 to 5, more preferably 1 to 3, and still more preferably 1. It is preferable that $R^5$ represents a hydrogen atom or a methyl group.

$L^4$ to $L^7$ each independently represent a single bond or a divalent linking group. Examples of the divalent linking group include an alkylene group, an arylene group, —O—, —S—, —CO—, —COO—, —OCO—, —SO$_2$—, —NR$^{10}$— ($R^{10}$ represents a hydrogen atom or an alkyl group and preferably a hydrogen atom), and a group including a combination thereof. The number of carbon atoms in the alkylene group is preferably 1 to 30, more preferably 1 to 15, and still more preferably 1 to 10. The alkylene group may have a substituent but is preferably unsubstituted. The alkylene group may be linear, branched, or cyclic. In addition, the cyclic alkylene group may be monocyclic or polycyclic. The number of carbon atoms in the arylene group is preferably 6 to 18, more preferably 6 to 14, and still more preferably 6 to 10.

The alkyl group represented by $R^{10}$ to $R^{13}$ may be linear, branched, or cyclic and is preferably cyclic. The alkyl group may have a substituent or may be unsubstituted. The number of carbon atoms in the alkyl group is preferably 1 to 30, more preferably 1 to 20, and still more preferably 1 to 10. The number of carbon atoms in the aryl group represented by $R^{10}$ to $R^{13}$ is preferably 6 to 18, more preferably 6 to 12, and still more preferably 6. It is preferable that $R^{10}$ represents a cyclic alkyl group or an aryl group. It is preferable that $R^{11}$ and $R^{12}$ represent a linear or branched alkyl group. It is preferable that $R^{13}$ represents a linear alkyl group, a branched alkyl group, or an aryl group.

Examples of the substituent represented by $R^{14}$ and $R^{15}$ include a halogen atom, a cyano group, a nitro group, an alkyl group, an alkenyl group, an alkynyl group, an aryl group, a heteroaryl group, an aralkyl group, an alkoxy group, an aryloxy group, a heteroaryloxy group, an alkylthio group, an arylthio group, a heteroarylthio group, —NR$^{a1}$R$^{a2}$, —COR$^{a3}$, —COOR$^{a4}$, —OCOR$^{a5}$, —NHCOR$^{a6}$, —CONR$^{a7}$R$^{a8}$, —NHCONR$^{a9}$R$^{a10}$, NHCOOR$^{a11}$, —SO$_2$R$^{a12}$, —SO$_2$OR$^{a13}$, —NHSO$_2$R$^{a14}$, and —SO$_2$NR$^{a15}$R$^{a16}$. $R^{a1}$ to $R^{a16}$ each independently represent a hydrogen atom, an alkyl group, an alkenyl group, an alkynyl group, an aryl group, or a heteroaryl group. In particular, it is preferable that at least one of $R^{14}$ or $R^{15}$ represents a cyano group or —COOR$^{a4}$. It is preferable that $R^{a4}$ represents a hydrogen atom, an alkyl group, or an aryl group.

Examples of a commercially available product of the resin having a repeating unit represented by Formula (A3-7) include ARTON F4520 (manufactured by JSR Corporation). In addition, the details of the resin having a repeating unit represented by Formula (A3-7) can be found in paragraphs "0053" to "0075" and "0127" to "0130" of JP2011-100084A, the content of which is incorporated herein by reference.

The curable composition according to the embodiment of the present invention may include a resin as a dispersant. In particular, in a case where a pigment is used, it is preferable that the composition includes a dispersant. Examples of the dispersant include an acidic dispersant (acidic resin) and a basic dispersant (basic resin). Here, the acidic dispersant (acidic resin) refers to a resin in which the amount of an acid group is more than the amount of a basic group. In a case where the sum of the amount of an acid group and the amount of a basic group in the acidic dispersant (acidic resin) is represented by 100 mol %, the amount of the acid group in the acidic resin is preferably 70 mol % or higher and more preferably substantially 100 mol %. The acid group in the acidic dispersant (acidic resin) is preferably a carboxyl group. An acid value of the acidic dispersant (acidic resin) is preferably 40 to 105 mgKOH/g, more preferably 50 to 105 mgKOH/g, and still more preferably 60 to 105 mgKOH/g. In addition, the basic dispersant (basic resin) refers to a resin in which the amount of a basic group is more than the amount of an acid group. In a case where the sum of the amount of an acid group and the amount of a basic group in the basic dispersant (basic resin) is represented by 100 mol %, the amount of the basic group in the basic resin is preferably higher than 50 mol %. The basic group in the basic dispersant is preferably an amino group.

It is preferable that the resin A used as the dispersant further includes a repeating unit having an acid group. By the resin, which is used as the dispersant, including the repeating unit having an acid group, in a case where a pattern is formed using a photolithography method, the amount of residues formed in an underlayer of a pixel can be reduced.

It is preferable that the resin used as the dispersant is a graft copolymer. Since the graft copolymer has affinity to the solvent due to the graft chain, the pigment dispersibility and the dispersion stability over time are excellent. The details of the graft copolymer can be found in the description of paragraphs "0025" to "0094" of JP2012-255128A, the content of which is incorporated herein by reference. In addition, specific examples of the graft copolymer include the following resins. The following resin may also be a resin having an acid group (alkali-soluble resin). In addition, other examples of the graft copolymer include resins described in paragraphs "0072" to "0094" of JP2012-255128A, the content of which is incorporated herein by reference.

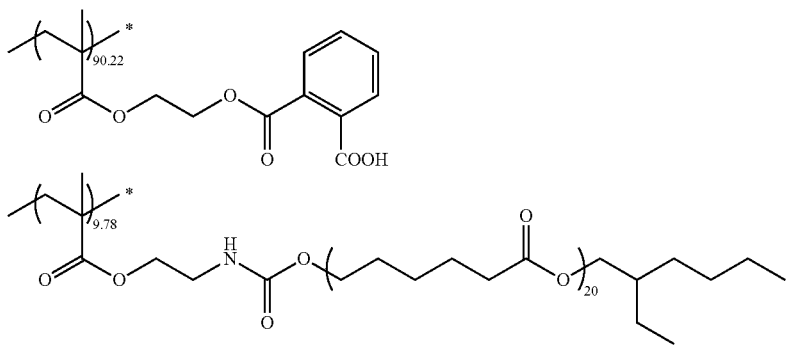

In addition, in the present invention, as the resin (dispersant), an oligoimine dispersant having a nitrogen atom at at least either a main chain or a side chain is also preferably used. As the oligoimine dispersant, a resin, which includes a structural unit having a partial structure X with a functional group (pKa: 14 or lower) and a side chain including a side chain Y having 40 to 10000 atoms and has a basic nitrogen atom at at least either a main chain or a side chain, is preferable. The basic nitrogen atom is not particularly limited as long as it is a nitrogen atom exhibiting basicity. The oligoimine dispersant can be found in the description of paragraphs "0102" to "0166" of JP2012-255128A, the content of which is incorporated herein by reference. Specific examples of the oligoimine dispersant are as follows. The following resin may also be a resin having an acid group (alkali-soluble resin). In addition, as the oligoimine dispersant, a resin described in paragraphs "0168" to "0174" of JP2012-255128A can be used.

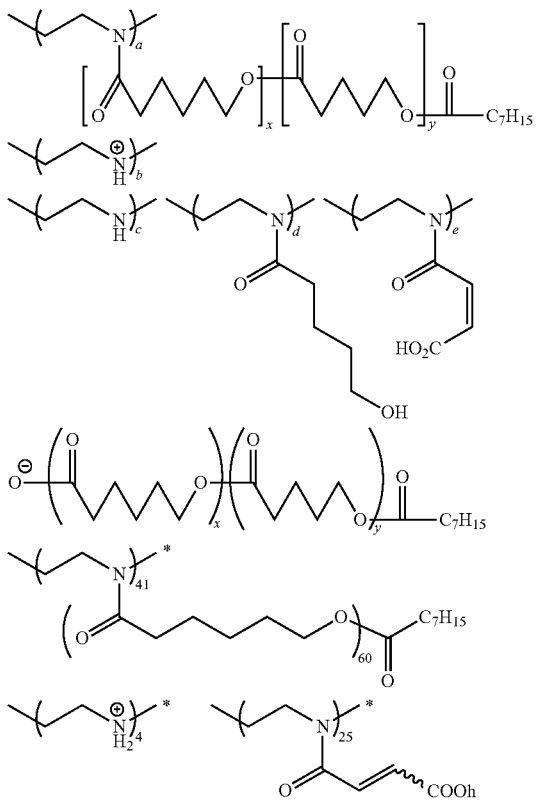

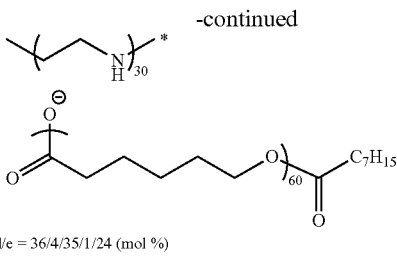

a/b/c/d/e = 36/4/35/1/24 (mol %)
x = 48 y = 12

The dispersant is available as a commercially available product, and specific examples thereof include Disperbyk-111 (manufactured by BYK Chemie) and SOLSPERSE 76500 (manufactured by Lubrication Technology Inc.). In addition, a pigment dispersant described in paragraphs "0041" to "0130" of JP2014-130338A can also be used, the content of which is incorporated herein by reference. In addition, the resin having an acid group or the like can also be used as a dispersant.

In the curable composition according to the embodiment of the present invention, the content of the resin is preferably 1 to 80 mass % with respect to the total solid content of the curable composition according to the embodiment of the present invention. The lower limit is preferably 5 mass % or higher and more preferably 7 mass % or higher. The upper limit is preferably 50 mass % or lower and more preferably 30 mass % or lower.

In addition, in a case where the curable composition includes a resin having an acid group as the resin, the content of the resin having an acid group is preferably 0.1 to 40 mass % with respect to the total solid content of the curable composition. The upper limit is preferably 20 mass % or lower, and more preferably 10 mass % or lower. The lower limit is preferably 0.5 mass % or higher and more preferably 1 mass % or higher. In addition, the content of the resin having an acid group is preferably 50 to 500 parts by mass, more preferably 60 to 350 parts by mass, and still more preferably 70 to 250 parts by mass with respect to 100 parts by mass of the total content of the polymerizable monomers (the total content of the polymerizable monomer M1 and the polymerizable monomer M2). In a case where the content of the resin having an acid group is in the above-described range, excellent developability can be easily obtained.

In addition, in a case where the curable composition includes a dispersant as the resin, the content of the dispersant is preferably 0.1 to 40 mass % with respect to the total solid content of the curable composition. The upper limit is preferably 20 mass % or lower, and more preferably 10 mass % or lower. The lower limit is preferably 0.5 mass % or higher and more preferably 1 mass % or higher. The content of the dispersant is preferably 1 to 100 parts by mass with respect to 100 parts by mass of the pigment. The upper limit is preferably 80 parts by mass or less and more preferably 60 parts by mass or less. The lower limit is preferably 2.5 parts by mass or more and more preferably 5 parts by mass or more.

«Photopolymerization Initiator»

The curable composition according to the embodiment of the present invention may include a photopolymerization initiator. The photopolymerization initiator is not particularly limited and can be appropriately selected from well-known photopolymerization initiators. For example, a compound having photosensitivity to light in a range from an ultraviolet range to a visible range is preferable. It is preferable that the photopolymerization initiator is a photo-radical polymerization initiator.

Examples of the photopolymerization initiator include a halogenated hydrocarbon derivative (for example, a compound having a triazine skeleton or a compound having an oxadiazole skeleton), an acylphosphine compound, a hexaarylbiimidazole, an oxime compound, an organic peroxide, a thio compound, a ketone compound, an aromatic onium salt, an α-hydroxyketone compound, and an α-aminoketone compound. In addition, from the viewpoint of exposure sensitivity, as the photopolymerization initiator, a trihalomethyltriazine compound, a benzyldimethylketal compound, an α-hydroxyketone compound, an α-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyl oxadiazole compound, or a 3-aryl-substituted coumarin compound is preferable, a compound selected from the group consisting of an oxime compound, an α-hydroxy ketone compound, an α-aminoketone compound, and an acylphosphine compound is more preferable, and an oxime compound is still more preferable. The details of the photopolymerization initiator can be found in paragraphs "0065" to "0111" of JP2014-130173A, the content of which is incorporated herein by reference.

Examples of a commercially available product of the α-hydroxyketone compound include IRGACURE-184, DAROCUR-1173, IRGACURE-500, IRGACURE-2959, and IRGACURE-127 (all of which are manufactured by BASF SE). Examples of a commercially available product of the α-aminoketone compound include IRGACURE-907, IRGACURE-369, IRGACURE-379, and IRGACURE-379EG (all of which are manufactured by BASF SE). Examples of a commercially available product of the acylphosphine compound include IRGACURE-819, and DAROCUR-TPO (all of which are manufactured by BASF SE).

As the oxime compound, a compound described in JP2001-233842A, a compound described in JP2000-080068A, a compound described in JP2006-342166A, or a compound described in JP2016-021012A can be used. Examples of the oxime compound which can be preferably used in the present invention include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-(4-toluene sulfonyloxy)iminobutane-2-one, and 2-ethoxycarbonyloxyimino-1-phenylpropane-1-one. In addition, examples of the oxime compound include a compound described in J.C.S. Perkin II (1979), pp. 1653-1660, J.C.S. Perkin II (1979), pp. 156-162 and Journal of Photopolymer Science and Technology (1995), pp. 202-232, JP2000-066385A, JP2000-080068A, JP2004-534797A, or JP2006-342166A. As a commercially available product of the oxime compound, IRGACURE-OXE01, IRGACURE-OXE02, IRGACURE-OXE03, or IRGACURE-OXE04 (all of which are manufactured by BASF SE) can also be preferably used. In addition, TR-PBG-304 (manufactured by Changzhou Tronly New Electronic Materials Co., Ltd.), ADEKA ARKLS NCI-831 (manufactured by Adeka Corporation), ADEKA ARKLS NCI-930 (manufactured by Adeka Corporation), ADEKA OPTOMER N-1919 (manufactured by Adeka Corporation, a photopolymerization initiator 2 described in JP2012-014052A) can also be used.

In the present invention, an oxime compound having a fluorene ring can also be used as the photopolymerization initiator. Specific examples of the oxime compound having a fluorene ring include a compound described in JP2014-137466A. The content is incorporated herein by reference.

In the present invention, an oxime compound having a fluorine atom can also be used as the photopolymerization initiator. Specific examples of the oxime compound having a fluorine atom include a compound described in JP2010-262028A, Compound 24 and 36 to 40 described in JP2014-500852A, and Compound (C-3) described in JP2013-164471A. The content is incorporated herein by reference.

In the present invention, as the photopolymerization initiator, an oxime compound having a nitro group can be used. It is preferable that the oxime compound having a nitro group is a dimer. Specific examples of the oxime compound having a nitro group include a compound described in paragraphs "0031" to "0047" of JP2013-114249A and paragraphs "0008" to "0012" and "0070" to "0079" of JP2014-137466A, a compound described in paragraphs "0007" to "0025" of JP4223071B, and ADEKA ARKLS NCI-831 (manufactured by Adeka Corporation).

Specific examples of the oxime compound which are preferably used in the present invention are shown below, but the present invention is not limited thereto.

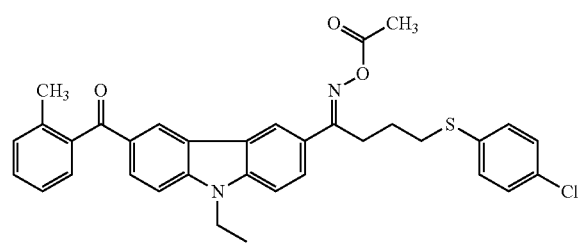

(C-1)

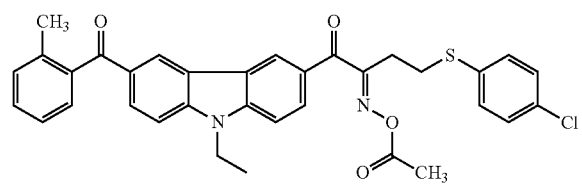

(C-2)

(C-3)
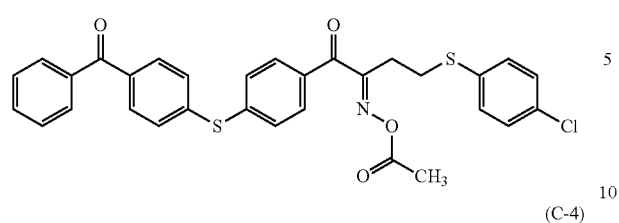
(C-4)
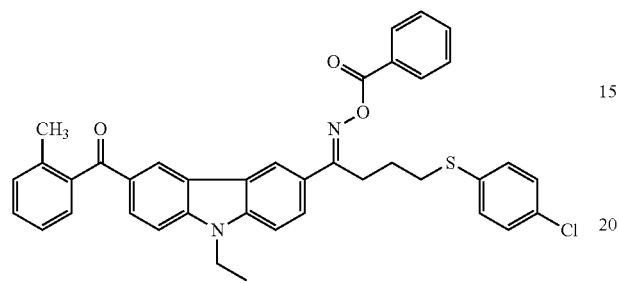
(C-5)
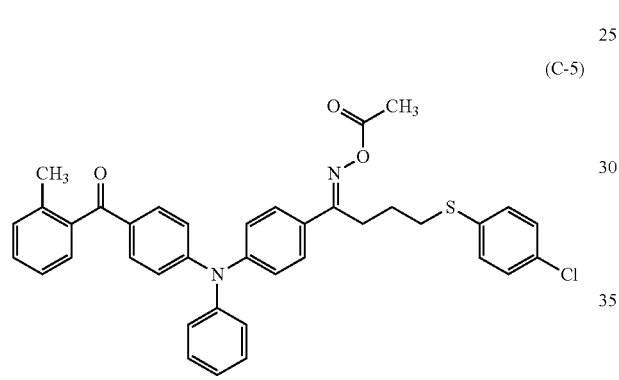
(C-6)
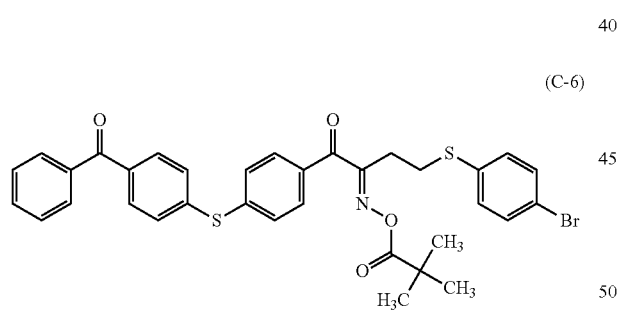
(C-7)
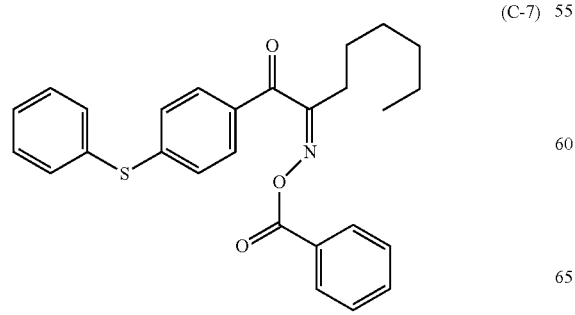
(C-8)
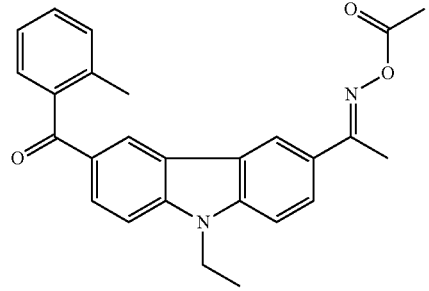
(C-9)
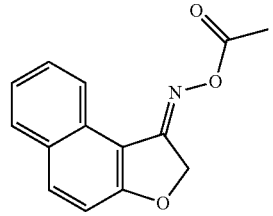
(C-10)
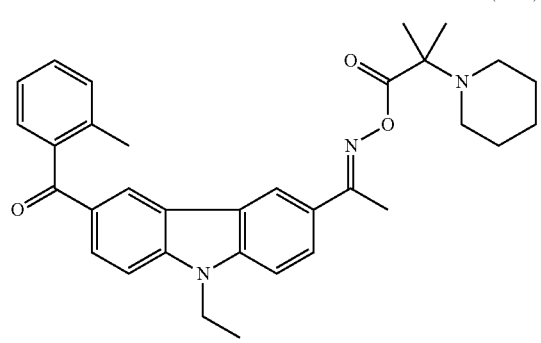
(C-11)
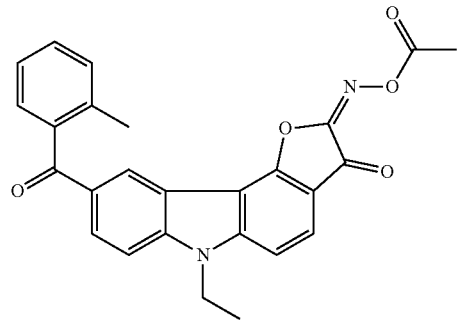
(C-12)
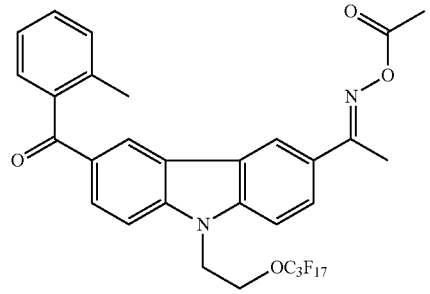

(C-13)

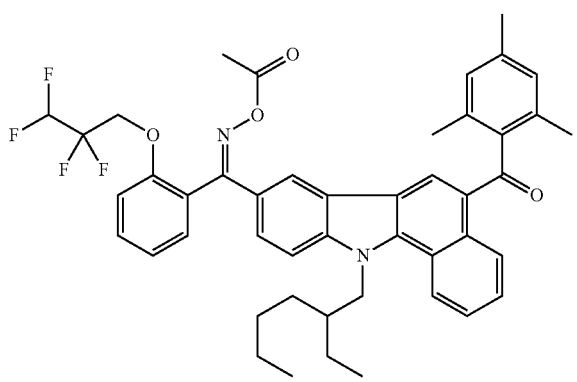

(C-14)

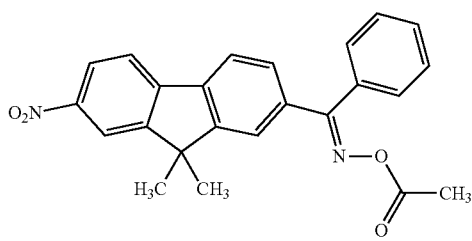

The oxime compound is preferably a compound having an absorption maximum in a wavelength range of 350 nm to 500 nm and more preferably a compound having an absorption maximum in a wavelength range of 360 nm to 480 nm. In addition, the oxime compound is preferably a compound having a high absorbance at 365 nm and 405 nm.

The molar absorption coefficient of the oxime compound at 365 nm or 405 nm is preferably 1000 to 300000, more preferably 2000 to 300000, and still more preferably 5000 to 200000 from the viewpoint of sensitivity.

The molar absorption coefficient of the compound can be measured using a well-known method. For example, it is preferable that the molar absorption coefficient can be measured using a spectrophotometer (Cary-5 spectrophotometer, manufactured by Varian Medical Systems, Inc.) and ethyl acetate as a solvent at a concentration of 0.01 g/L.

It is preferable that the photopolymerization initiator includes an oxime compound and an α-aminoketone compound. By using the oxime compound and the α-aminoketone compound in combination, the developability is improved, and a pattern having excellent rectangularity is likely to be formed. In a case where the oxime compound and the α-aminoketone compound are used in combination, the content of the α-aminoketone compound is preferably 50 to 600 parts by mass and more preferably 150 to 400 parts by mass with respect to 100 parts by mass of the oxime compound.

The content of the photopolymerization initiator is preferably 0.1 to 50 mass %, more preferably 0.5 to 30 mass %, and still more preferably 1 to 20 mass % with respect to the total solid content of the curable composition. In a case where the content of the photopolymerization initiator is in the above-described range, developability is excellent. The curable composition according to the embodiment of the present invention may include one photopolymerization initiator or two or more photopolymerization initiators. In a case where the composition includes two or more photopolymerization initiators, it is preferable that the total content of the photopolymerization initiators is in the above-described range.

«Chromatic Colorant»

The curable composition according to the embodiment of the present invention may include a chromatic colorant. In the present invention, "chromatic colorant" denotes a colorant other than a white colorant and a black colorant. It is preferable that the chromatic colorant is a colorant having an absorption in a wavelength range of 400 nm or longer and shorter than 650 nm.

In the present invention, the chromatic colorant may be a pigment or a dye. As the pigment, an organic pigment is preferable. Examples of the organic pigment are as follows:

Color Index (C.I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214 (all of which are yellow pigments);

C.I. Pigment Orange 2, 5, 13, 16, 17:1, 31, 34, 36, 38, 43, 46, 48, 49, 51, 52, 55, 59, 60, 61, 62, 64, 71, and 73 (all of which are orange pigments);

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279 (all of which are red pigments);

C.I. Pigment Green 7, 10, 36, 37, 58, and 59 (all of which are green pigments); C.I. Pigment Violet 1, 19, 23, 27, 32, 37, and 42 (all of which are violet pigments); and C.I. Pigment Blue 1, 2, 15, 15:1, 15:2, 15:3, 15:4, 15:6, 16, 22, 60, 64, 66, 79, and 80 (all of which are blue pigments).

Among these organic pigments, one kind may be used alone, or two or more kinds may be used in combination.

As the dye, well-known dyes can be used without any particular limitation. In terms of a chemical structure, a dye such as a pyrazole azo dye, an anilino azo dye, a triarylmethane dye, an anthraquinone dye, an anthrapyridone dye, a benzylidene dye, an oxonol dye, a pyrazolotriazole azo dye, a pyridone azo dye, a cyanine dye, a phenothiazine dye, a pyrrolopyrazole azomethine dye, a xanthene dye, a phthalocyanine dye, a benzopyran dye, an indigo dye, or a pyrromethene dye can be used. In addition, a polymer of the above-described dyes may be used. In addition, dyes described in JP2015-028144A and JP2015-034966A can also be used.

In a case where the curable composition according to the embodiment of the present invention includes a chromatic colorant, it is preferable that the content of the chromatic colorant is 0.1 to 70 mass % with respect to the total solid content of the curable composition according to the embodiment of the present invention. The lower limit is preferably 0.5 mass % or higher and more preferably 1.0 mass % or higher. The upper limit is preferably 60 mass % or lower, and more preferably 50 mass % or lower.

The content of the chromatic colorant is preferably 10 to 1000 parts by mass and more preferably 50 to 800 parts by mass with respect to 100 parts by mass of the near infrared absorbing colorant.

In addition, the total content of the chromatic colorant and the near infrared absorbing colorant is preferably 1 to 80 mass % with respect to the total solid content of the curable composition according to the embodiment of the present invention. The lower limit is preferably 5 mass % or higher and more preferably 10 mass % or higher. The upper limit is preferably 70 mass % or lower, and more preferably 60 mass % or lower.

In a case where the curable composition according to the embodiment of the present invention includes two or more chromatic colorants, it is preferable that the total content of the two or more chromatic colorants is in the above-described range.

«Coloring Material that allows Transmission of Infrared Light and Shields Visible Light»

The curable composition according to the embodiment of the present invention may also include the coloring material that allows transmission of infrared light and shields visible light (hereinafter, also referred to as "coloring material that shields visible light").

In the present invention, it is preferable that the coloring material that shields visible light is a coloring material that absorbs light in a wavelength range of violet to red. In addition, in the present invention, it is preferable that the coloring material that shields visible light is a coloring material that shields light in a wavelength range of 450 to 650 nm. In addition, it is preferable that the coloring material that shields visible light is a coloring material that allows transmission of light in a wavelength range of 900 to 1300 nm.

In the present invention, it is preferable that the coloring material that shields visible light satisfies at least one of the following requirement (A) or (B).

(A): The coloring material that shields visible light includes two or more chromatic colorants, and a combination of the two or more chromatic colorants forms black.

(B): The coloring material that shields visible light includes an organic black colorant.

Examples of the chromatic colorant are as described above. Examples of the organic black colorant include a bisbenzofuranone compound, an azomethine compound, a perylene compound, and an azo compound. Among these, a bisbenzofuranone compound or a perylene compound is preferable. Examples of the bisbenzofuranone compound include a compound described in JP2010-534726A, JP2012-515233A, and JP2012-515234A. For example, "Irgaphor Black" (manufactured by BASF SE) is available. Examples of the perylene compound include C.I. Pigment Black 31 and 32. Examples of the azomethine compound include a compound described in JP1989-170601A (JP-H1-170601A) and JP1990-034664A (JP-H2-034664A). For example, "CHROMOFINE BLACK A1103" (manufactured by Dainichiseika Color & Chemicals Mfg. Co., Ltd.) is available.

In a case where a combination of two or more chromatic colorants forms black, examples of the combination of chromatic colorants are as follows.

(1) An aspect in which the coloring material that shields visible light includes a yellow colorant, a blue colorant, a violet colorant, and a red colorant (2) An aspect in which the coloring material that shields visible light includes a yellow colorant, a blue colorant, and a red colorant (3) An aspect in which the coloring material that shields visible light includes a yellow colorant, a violet colorant, and a red colorant (4) An aspect in which the coloring material that shields visible light includes a yellow colorant and a violet colorant (5) An aspect in which the coloring material that shields visible light includes a green colorant, a blue colorant, a violet colorant, and a red colorant (6) An aspect in which the coloring material that shields visible light includes a violet colorant and an orange colorant (7) An aspect in which the coloring material that shields visible light includes a green colorant, a violet colorant, and a red colorant (8) An aspect in which the coloring material that shields visible light includes a green colorant and a red colorant In a case where the curable composition according to the embodiment of the present invention includes the coloring material that shields visible light, the content of the coloring material that shields visible light is preferably 60 mass % or lower, more preferably 50 mass % or lower, still more preferably 30 mass % or lower, still more preferably 20 mass % or lower, and still more preferably 15 mass % or lower with respect to the total solid content of the curable composition. The lower limit is, for example, 0.01 mass % or higher or 0.5 mass % or higher.

«Pigment Derivative»

The curable composition according to the embodiment of the present invention may further include a pigment derivative. Examples of the pigment derivative include a compound having a structure in which a portion of a pigment is substituted with an acid group, a basic group, a group having a salt structure, or a phthalimidomethyl group. As the pigment derivative, a compound represented by Formula (B1) is preferable.

$$P\text{-}(\text{-}L\text{-}(X)_n)_m \qquad (B1)$$

In Formula (B1), P represents a colorant structure, L represents a single bond or a linking group, X represents an acid group, a basic group, a group having a salt structure, or a phthalimidomethyl group, m represents an integer of 1 or more, n represents an integer of 1 or more, in a case where m represents 2 or more, a plurality of L's and a plurality of X's may be different from each other, and in a case where n represents 2 or more, a plurality of X's may be different from each other.

In Formula (B1), P represents a colorant structure, preferably at least one selected from a pyrrolopyrrole colorant structure, a diketo pyrrolopyrrole colorant structure, a quinacridone colorant structure, an anthraquinone colorant structure, a dianthraquinone colorant structure, a benzoisoindole colorant structure, a thiazine indigo colorant structure, an azo colorant structure, a quinophthalone colorant structure, a phthalocyanine colorant structure, a naphthalocyanine colorant structure, a dioxazine colorant structure, a perylene colorant structure, a perinone colorant structure, a benzimidazolone colorant structure, a benzothiazole colorant structure, a benzimidazole colorant structure, or a benzoxazole colorant structure, more preferably at least one selected from a pyrrolopyrrole colorant structure, a diketo pyrrolopyrrole colorant structure, a quinacridone colorant structure, or a benzimidazolone colorant structure, and still more preferably a pyrrolopyrrole colorant structure.

In Formula (B1), L represents a single bond or a linking group. The linking group is preferably a group composed of 1 to 100 carbon atoms, 0 to 10 nitrogen atoms, 0 to 50 oxygen atoms, 1 to 200 hydrogen atoms, and 0 to 20 sulfur atoms, and may be unsubstituted or may further have a substituent.

In Formula (B1), X represents an acid group, a basic group, a group having a salt structure, or a phthalimidomethyl group. Among these, an acid group or a basic group is preferable. Examples of the acid group include a carboxyl group and a sulfo group. Examples of the basic group include an amino group.

Examples of the pigment derivative include compounds having the following structures. In addition, for example, compounds described in JP1981-118462A (JP-S56-118462A), JP1988-264674A (JP-S63-264674A), JP1989-217077A (JP-H1-217077A), JP1991-009961A (JP-H3-009961A), JP1991-026767A (JP-H3-026767A), JP1991-153780A (JP-H3-153780A), JP1991-045662A (JP-H3-045662A), JP1992-285669A (JP-H4-285669A), JP1994-145546A (JP-H6-145546A), JP1994-212088A (JP-H6-212088A), JP1994-240158A (JP-H6-240158A), JP1998-030063A (JP-H10-030063A), JP1998-195326A (JP-H10-195326A), paragraphs "0086" to "0098" of WO2011/024896A, and paragraphs "0063" to "0094" of WO2012/102399A can be used, the contents of which are incorporated herein by reference.

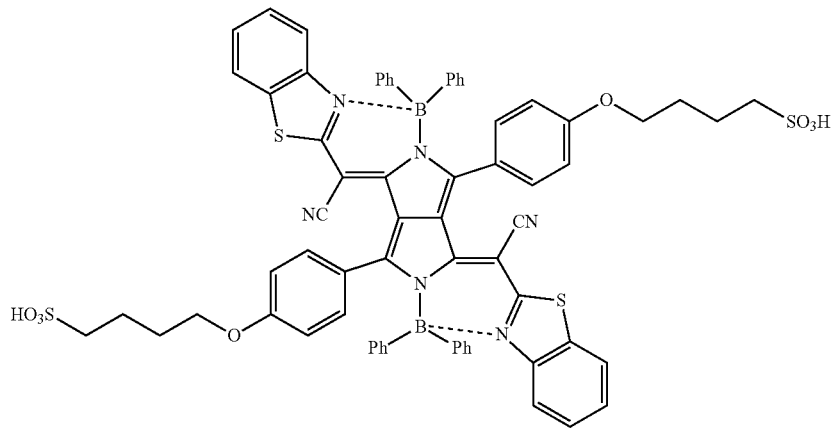

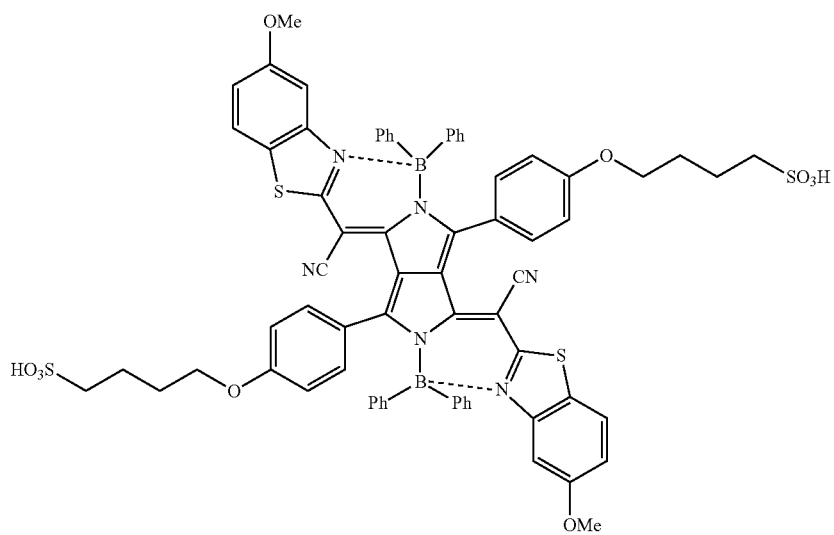

-continued

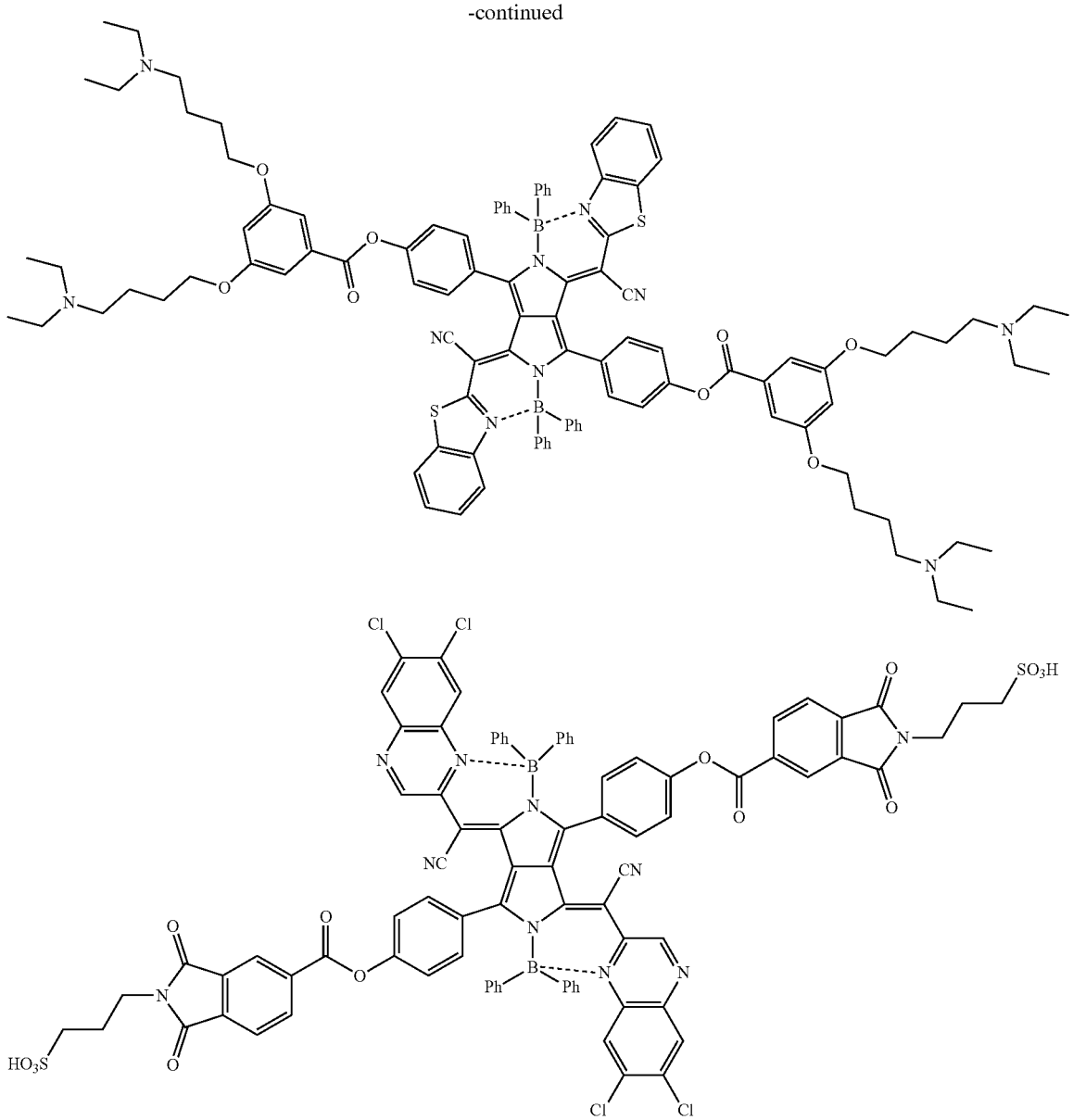

In a case where the curable composition according to the embodiment of the present invention includes the pigment derivative, the content of the pigment derivative is preferably 1 to 50 parts by mass with respect to 100 parts by mass of the pigment. The lower limit value is preferably 3 parts by mass or more and more preferably 5 parts by mass or more. The upper limit value is preferably 40 parts by mass or less and more preferably 30 parts by mass or less. In a case where the content of the pigment derivative is in the above-described range, the pigment dispersibility can be improved, and aggregation of the pigment can be effectively suppressed. As the pigment derivative, one kind may be used alone, or two or more kinds may be used in combination. In a case where two or more pigment derivatives are used in combination, it is preferable that the total content of the two or more pigment derivatives is in the above-described range.

«Solvent»

The curable composition according to the embodiment of the present invention may include a solvent. Examples of the solvent include an organic solvent. Basically, the solvent is not particularly limited as long as it satisfies the solubility of the respective components and the application properties of the composition. Examples of the organic solvent include esters, ethers, ketones, and aromatic hydrocarbons. The details of the organic solvent can be found in paragraph "0223" of WO2015/166779A, the content of which is incorporated herein by reference. In addition, an ester solvent in which a cyclic alkyl group is substituted or a ketone solvent in which a cyclic alkyl group is substituted can also be preferably used. Specific examples of the organic solvent include dichloromethane, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, cyclohexyl acetate, cyclopentanone, ethyl carbitol acetate, butyl carbitol acetate, propylene glycol monomethyl ether, and propylene glycol monomethyl ether acetate. In the present invention, as the organic solvent, one kind may be used alone, or two or more kinds may be used in combination. In this case, it may be preferable that the content of the aromatic hydrocarbon (for example, benzene, toluene, xylene, or ethylbenzene) as the solvent is low (for example, 50 mass parts per million (ppm) or lower, 10 mass ppm or lower, or 1 mass ppm or lower with respect to the total mass of the organic solvent) in consideration of environmental aspects and the like.

In the present invention, a solvent having a low metal content is preferably used. For example, the metal content in the solvent is preferably 10 mass parts per billion (ppb) or lower. Optionally, a solvent having a metal content at a mass parts per trillion (ppt) level may be used. For example, such a high-purity solvent is available from Toyo Gosei Co., Ltd. (The Chemical Daily, Nov. 13, 2015).

Examples of a method of removing impurities such as metal from the solvent include distillation (for example, molecular distillation or thin-film distillation) and filtering using a filter. The pore size of a filter used for the filtering is preferably 10 μm or less, more preferably 5 μm or less, and still more preferably 3 μm or less. As a material of the filter, polytetrafluoroethylene, polyethylene, or nylon is preferable.

The solvent may include an isomer (a compound having the same number of atoms and a different structure). In addition, the organic solvent may include only one isomer or a plurality of isomers.

In the present invention, as the organic solvent, an organic solvent containing 0.8 mmol/L or lower of a peroxide is preferable, and an organic solvent containing substantially no peroxide is more preferable.

The content of the solvent is preferably 10 to 90 mass %, more preferably 20 to 80 mass %, and still more preferably 25 to 75 mass % with respect to the total mass of the curable composition.

«Polymerization Inhibitor»

The curable composition according to the embodiment of the present invention may include a polymerization inhibitor. Examples of the polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and N-nitrosophenylhydroxyamine salt (for example, an ammonium salt or a cerium (III) salt). Among these, p-methoxyphenol is preferable. The content of the polymerization inhibitor is preferably 0.001 to 5 mass % with respect to the total solid content of the curable composition.

«Silane Coupling Agent»

The curable composition according to the embodiment of the present invention may include a silane coupling agent. In the present invention, the silane coupling agent refers to a silane compound having a functional group other than a hydrolyzable group. In addition, the hydrolyzable group refers to a substituent directly linked to a silicon atom and capable of forming a siloxane bond due to at least one of a hydrolysis reaction or a condensation reaction. Examples of the hydrolyzable group include a halogen atom, an alkoxy group, and an acyloxy group. Among these, an alkoxy group is preferable. That is, it is preferable that the silane coupling agent is a compound having an alkoxysilyl group. Examples of the functional group other than a hydrolyzable group include a vinyl group, a styrene group, a (meth)acryloyl group, a mercapto group, an epoxy group, an oxetanyl group, an amino group, an ureido group, a sulfide group, an isocyanate group, and a phenyl group. Among these, a (meth)acryloyl group or an epoxy group is preferable.

Examples of the silane coupling agent include a compound described in paragraphs "0018" to "0036" of JP2009-288703A and a compound described in paragraphs "0056" to "0066" of JP2009-242604A, the content of which is incorporated herein by reference.

The content of the silane coupling agent is preferably 0.01 to 15.0 mass % and more preferably 0.05 to 10.0 mass % with respect to the total solid content of the curable composition. As the silane coupling agent, one kind may be used alone, or two or more kinds may be used. In a case where two or more silane coupling agents are used in combination, it is preferable that the total content of the two or more silane coupling agents is in the above-described range.

«Surfactant»

The curable composition according to the embodiment of the present invention may include a surfactant. As the surfactants, various surfactants such as a fluorine surfactant, a nonionic surfactant, a cationic surfactant, an anionic surfactant, or a silicone surfactant can be used. The details of the surfactant can be found in paragraphs "0238" to "0245" of WO2015/166779A, the content of which is incorporated herein by reference.

In the present invention, it is preferable that the surfactant is a fluorine surfactant. By the curable composition according to the embodiment of the present invention containing a fluorine surfactant, liquid characteristics (in particular, fluidity) are further improved, and liquid saving properties can be further improved. In addition, a film having reduced thickness unevenness can be formed.

The fluorine content in the fluorine surfactant is preferably 3 to 40 mass %, more preferably 5 to 30 mass %, and still more preferably 7 to 25 mass %. The fluorine surfactant in which the fluorine content is in the above-described range is effective from the viewpoints of the uniformity in the thickness of the coating film and liquid saving properties, and the solubility thereof in the composition is also excellent.

Specific examples of the fluorine surfactant include a surfactant described in paragraphs "0060" to "0064" of JP2014-041318A (paragraphs "0060" to "0064" of corresponding WO2014/017669A) and a surfactant described in paragraphs "0117" to "0132" of JP2011-132503A, the content of which is incorporated herein by reference. Examples of a commercially available product of the fluorine surfactant include: MEGAFACE F171, F172, F173, F176, F177, F141, F142, F143, F144, R30, F437, F475, F479, F482, F554, and F780 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMNOVA Solutions Inc.).

In addition, as the fluorine surfactant, an acrylic compound in which, in a case where heat is applied to a molecular structure which has a functional group having a fluorine atom, the functional group having a fluorine atom is cut and a fluorine atom is volatilized can also be preferably used. Examples of the fluorine surfactant include MEGAFACE DS series (manufactured by DIC Corporation, The Chemical Daily, Feb. 22, 2016, Nikkei Business Daily, Feb. 23, 2016), for example, MEGAFACE DS-21.

As the fluorine surfactant, a block polymer can also be used. Examples of the block polymer include a compound described in JP2011-089090A. As the fluorine surfactant, a fluorine-containing polymer compound can be preferably used, the fluorine-containing polymer compound including: a repeating unit derived from a (meth)acrylate compound having a fluorine atom; and a repeating unit derived from a (meth)acrylate compound having 2 or more (preferably 5 or more) alkyleneoxy groups (preferably an ethyleneoxy group and a propyleneoxy group). For example, the following compound can also be used as the fluorine surfactant used in the present invention.

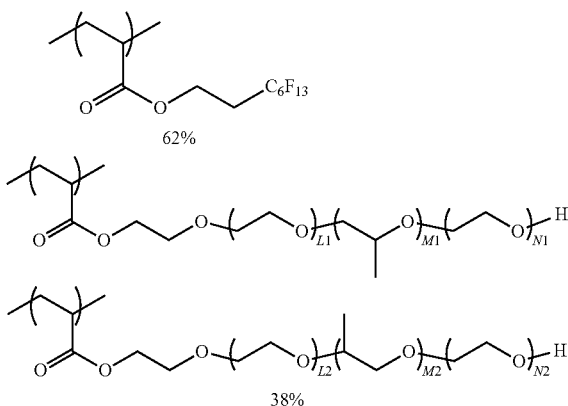

L1 + N1 = L2 + N2 = 14
M1 = M2 = 17

The weight-average molecular weight of the compound is preferably 3000 to 50000 and, for example, 14000. In the compound, "%" representing the proportion of a repeating unit is mol %.

In addition, as the fluorine surfactant, a fluorine-containing polymer having an ethylenically unsaturated group at a side chain can also be used. Specific examples include a compound described in paragraphs "0050" to "0090" and paragraphs "0289" to "0295" of JP2010-164965A, for example, MEGAFACE RS-101, RS-102, RS-718K, and RS-72-K manufactured by DIC Corporation. As the fluorine surfactant, a compound described in paragraphs "0015" to "0158" of JP2015-117327A can also be used.

Examples of the nonionic surfactant include glycerol, trimethylolpropane, trimethylolethane, an ethoxylate and a propoxylate thereof (for example, glycerol propoxylate or glycerol ethoxylate), polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid esters, PLURONIC L10, L31, L61, L62, 10R5, 17R2, and 25R2 (manufactured by BASF SE), TETRONIC 304, 701, 704, 901, 904, and 150R1 (manufactured by BASF SE), SOLSPERSE 20000 (manufactured by Lubrication Technology Inc.), NCW-101, NCW-1001, and NCW-1002 (all of which are manufactured by Wako Pure Chemical Industries, Ltd.), PIONIN D-6112, D-6112-W, and D-6315 (all of which are manufactured by Takemoto Oil&Fat Co., Ltd.), and OLFINE E1010 and SURFYNOL 104, 400, and 440 (all of which are manufactured by Nissin Chemical Co., Ltd.).

The content of the surfactant is preferably 0.001 mass % to 5.0 mass % and more preferably 0.005 to 3.0 mass % with respect to the total solid content of the curable composition according to the embodiment of the present invention. As the surfactant, one kind may be used alone, or two or more kinds may be used. In a case where two or more surfactants are used in combination, it is preferable that the total content of the two or more surfactants is in the above-described range.

«Ultraviolet Absorber»

The curable composition according to the embodiment of the present invention may include an ultraviolet absorber. As the ultraviolet absorber, for example, a conjugated diene compound, an aminobutadiene compound, a methyldibenzoyl compound, a coumarin compound, a salicylate compound, a benzophenone compound, a benzotriazole compound, an acrylonitrile compound, or a hydroxyphenyltriazine compound can be used. The details can be found in paragraphs "0052" to "0072" of JP2012-208374A and paragraphs "0317" to "0334" of JP2013-068814A, the contents of which are incorporated herein by reference. Examples of a commercially available product of the conjugated diene compound include UV-503 (manufactured by Daito Chemical Co., Ltd.). In addition, as the benzotriazole compound, MYUA series (manufactured by Miyoshi Oil&Fat Co., Ltd.; The Chemical Daily, Feb. 1, 2016) may be used. As the ultraviolet absorber, a compound represented by any one of Formulae (UV-1) to (UV-3) is preferable, a compound represented by any one of Formula (UV-1) or (UV-3) is more preferable, and a compound represented by Formula (UV-1) is still more preferable.

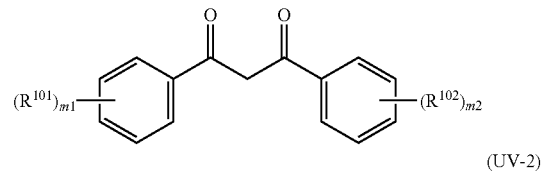

(UV-1)

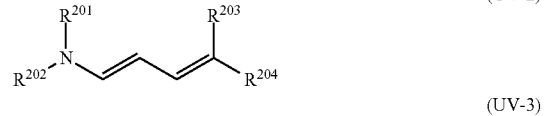

(UV-2)

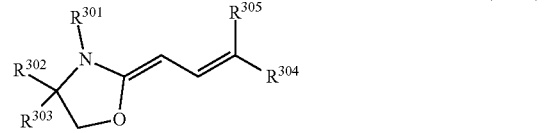

(UV-3)

In Formula (UV-1), $R^{101}$ and $R^{102}$ each independently represent a substituent, and m1 and m2 each independently represent 0 to 4.

In Formula (UV-2), $R^{201}$ and $R^{202}$ each independently represent a hydrogen atom or an alkyl group, and $R^{203}$ and $R^{204}$ each independently represent a substituent.

In Formula (UV-3), $R^{301}$ to $R^{303}$ each independently represent a hydrogen atom or an alkyl group, and $R^{304}$ and $R^{305}$ each independently represent a substituent.

Specific examples of the compounds represented by Formulae (UV-1) to (UV-3) include the following compounds.

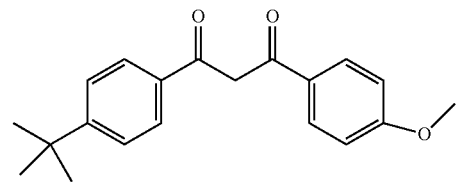

-continued

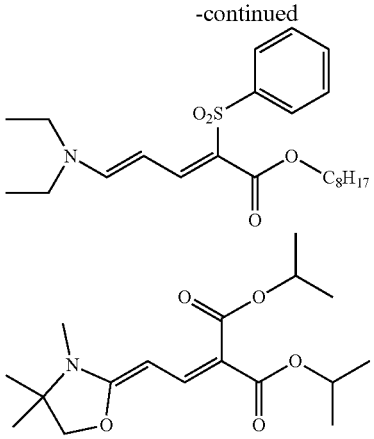

In the curable composition according to the embodiment of the present invention, the content of the ultraviolet absorber is preferably 0.01 to 10 mass % and more preferably 0.01 to 5 mass % with respect to the total solid content of the curable composition. In the present invention, as the ultraviolet absorber, one kind may be used alone, or two or more kinds may be used. In a case where two or more ultraviolet absorbers are used in combination, it is preferable that the total content of the two or more ultraviolet absorbers is in the above-described range.

«Antioxidant»

The curable composition according to the embodiment of the present invention may include an antioxidant. Examples of the antioxidant include a phenol compound, a phosphite compound, and a thioether compound. As the phenol compound, any phenol compound which is known as a phenol antioxidant can be used. As the phenol compound, for example, a hindered phenol compound is preferable. A compound having a substituent at a position (ortho position) adjacent to a phenolic hydroxyl group is preferable. As the substituent, a substituted or unsubstituted alkyl group having 1 to 22 carbon atoms is preferable. In addition, as the antioxidant, a compound having a phenol group and a phosphite group in the same molecule is also preferable. In addition, as the antioxidant, a phosphorus antioxidant can also be preferably used. Examples of the phosphorus antioxidant include tris[2-[[2,4,8,10-tetrakis(1,1-dimethylethyl)dibenzo[d,f][1,3,2]dioxaphosphepin-6-yl]oxy]ethyl]amine, tris[2-[(4,6,9,11-tetra-t-butyldibenzo[d,f][1,3,2]dioxaphosphepin-2-yl)oxy]ethyl]amine, and ethyl bis(2,4-di-t-butyl-6-methylphenyl)phosphite. Examples of the commercially available product of the antioxidant include ADEKA STAB AO-20, ADEKA STAB AO-30, ADEKA STAB AO-40, ADEKA STAB AO-50, ADEKA STAB AO-50F, ADEKA STAB AO-60, ADEKA STAB AO-60G, ADEKA STAB AO-80, and ADEKA STAB AO-330 (all of which are manufactured by Adeka Corporation).

In the curable composition according to the embodiment of the present invention, the content of the antioxidant is preferably 0.01 to 20 mass % and more preferably 0.3 to 15 mass % with respect to the total solid content of the curable composition. As the antioxidant, one kind may be used alone, or two or more kinds may be used in combination. In a case where two or more antioxidants are used in combination, it is preferable that the total content of the two or more antioxidants is in the above-described range.

«Other Components»

Optionally, the curable composition according to the embodiment of the present invention may further include a sensitizer, a curing accelerator, a filler, a thermal curing accelerator, a plasticizer, and other auxiliary agents (for example, conductive particles, an antifoaming agent, a flame retardant, a leveling agent, a peeling accelerator, an aromatic chemical, a surface tension adjuster, or a chain transfer agent). By the curable composition appropriately including the components, properties such as film properties can be adjusted. The details of the components can be found in, for example, paragraph "0183" of JP2012-003225A (corresponding to paragraph "0237" of US2013/0034812A) and paragraphs "0101" to "0104" and "0107" to "0109" of JP2008-250074A, the content of which is incorporated herein by reference.

For example, in a case where a film is formed by coating, the viscosity (23° C.) of the curable composition according to the embodiment of the present invention is preferably 1 to 100 mPa·s. The lower limit is more preferably 2 mPa·s or higher and still more preferably 3 mPa·s or higher. The upper limit is more preferably 50 mPa·s or lower, still more preferably 30 mPa·s or lower, and still more preferably 15 mPa·s or lower.

A storage container of the curable composition according to the embodiment of the present invention is not particularly limited, and a well-known storage container can be used. In addition, as the storage container, in order to suppress infiltration of impurities into the raw materials or the composition, a multilayer bottle in which a container inner wall having a six-layer structure is formed of six kinds of resins or a bottle in which a container inner wall having a seven-layer structure is formed of six kinds of resins is preferably used. Examples of the container include a container described in JP2015-123351A.

The use of the curable composition according to the embodiment of the present invention is not particularly limited. The composition according to the embodiment of the present invention can be preferably used to form a near infrared cut filter or the like. In addition, by the curable composition according to the embodiment of the present invention including the coloring material that shields visible light, an infrared transmitting filter that can allow transmission of only near infrared light at a specific wavelength or higher can also be formed.

<Method of Preparing Curable Composition>

The curable composition according to the embodiment of the present invention can be prepared by mixing the above-described components with each other. During the preparation of the curable composition, all the components may be dissolved or dispersed in a solvent at the same time to prepare the curable composition. Optionally, two or more solutions or dispersions to which the respective components are appropriately added may be prepared, and the solutions or dispersions may be mixed with each other during use (during application) to prepare the curable composition.

In addition, in a case where the curable composition according to the embodiment of the present invention includes particles of a pigment or the like, it is preferable that a process of dispersing the particles is provided. Examples of a mechanical force used for dispersing the particles in the process of dispersing the particles include compression, squeezing, impact, shearing, and cavitation. Specific examples of the process include a beads mill, a sand mill, a roll mill, a ball mill, a paint shaker, a Microfluidizer, a high-speed impeller, a sand grinder, a project mixer, high-pressure wet atomization, and ultrasonic dispersion.

During the pulverization of the particles using a sand mill (beads mill), it is preferable that the process is performed under conditions for increasing the pulverization efficiency, for example, by using beads having a small size and increasing the filling rate of the beads. In addition, it is preferable that rough particles are removed by filtering, centrifugal separation, and the like after pulverization. In addition, as the process and the disperser for dispersing the particles, a process and a disperser described in "Complete Works of Dispersion Technology, Johokiko Co., Ltd., Jul. 15, 2005", "Dispersion Technique focusing on Suspension (Solid/Liquid Dispersion) and Practical Industrial Application, Comprehensive Reference List, Publishing Department of Management Development Center, Oct. 10, 1978", and paragraph "0022" JP2015-157893A can be suitably used. In addition, in the process of dispersing the particles, particles may be refined in a salt milling step. A material, a device, process conditions, and the like used in the salt milling step can be found in, for example, JP2015-194521A and JP2012-046629A.

During the preparation of the curable composition, it is preferable that the curable composition is filtered through a filter, for example, in order to remove foreign matter or to reduce defects. As the filter, any filter which is used in the related art for filtering or the like can be used without any particular limitation. Examples of a material of the filter include: a fluororesin such as polytetrafluoroethylene (PTFE); a polyamide resin such as nylon (for example, nylon-6 or nylon-6,6); and a polyolefin resin (including a polyolefin resin having a high density and an ultrahigh molecular weight) such as polyethylene or polypropylene (PP). Among these materials, polypropylene (including high-density polypropylene) or nylon is preferable.

The pore size of the filter is suitably about 0.01 to 7.0 μm and is preferably about 0.01 to 3.0 μm and more preferably about 0.05 to 0.5 μm. In a case where the pore size of the filter is in the above-described range, fine foreign matter can be reliably removed. In addition, it is preferable that a fibrous filter material is used. Examples of the fibrous filter material include polypropylene fiber, nylon fiber, and glass fiber. Specific examples include a filter cartridge of SBP type series (for example, SBP008), TPR type series (for example, TPR002 or TPR005), and SHPX type series (for example, SHPX003) all of which are manufactured by Roki Techno Co., Ltd.

In a case where a filter is used, a combination of different filters (for example, a first filter and a second filter) may be used. At this time, the filtering using each of the filters may be performed once, or twice or more.

In addition, a combination of filters having different pore sizes in the above-described range may be used. Here, the pore size of the filter can refer to a nominal value of a manufacturer of the filter. A commercially available filter can be selected from various filters manufactured by Pall Corporation (for example, DFA4201NXEY), Toyo Roshi Kaisha, Ltd., Entegris Japan Co., Ltd. (former Mykrolis Corporation), or Kits Microfilter Corporation.

The second filter may be formed of the same material as that of the first filter.

In addition, the filtering using the first filter may be performed only on the dispersion, and the filtering using the second filter may be performed on a mixture of the dispersion and other components.

<Film>

Next, a film according to the embodiment of the present invention will be described. The film according to the embodiment of the present invention is obtained from the above-described curable composition according to the embodiment of the present invention. The film according to the embodiment of the present invention can be preferably used as a near infrared cut filter or an infrared transmitting filter. In addition, the film according to the embodiment of the present invention can also be used as a heat ray shielding filter. The film according to the embodiment of the present invention may be a film having a pattern or a film (flat film) not having a pattern. In addition, the film according to the embodiment of the present invention may be used in a state where it is laminated on a support, or the film according to the embodiment of the present invention may be peeled off from a support. In a case where the film according to the embodiment of the present invention is used as an infrared transmitting filter, examples of the infrared transmitting filter include a filter that shields visible light and allows transmission of light in a wavelength range of 900 nm or longer. In a case where the film according to the embodiment of the present invention is used as an infrared transmitting filter, it is preferable that infrared transmitting filter is a filter that is formed of a curable composition including the near infrared absorbing colorant and the coloring material that shields visible light (preferably a coloring material including two or more chromatic colorants or a coloring material including at least an organic black colorant), or is a filter in which a layer of the coloring material that shields visible light is separately present in addition to a layer including the near infrared absorbing colorant. In a case where the film according to the embodiment of the present invention is used as an infrared transmitting filter, the near infrared absorbing colorant has a function of limiting light to be transmitted (near infrared light) to a long wavelength side.

The thickness of the film according to the embodiment of the present invention can be adjusted according to the purpose. The thickness is preferably 20 μm or less, more preferably 10 μm or less, and still more preferably 5 μm or less. For example, the lower limit of the thickness is preferably 0.1 μm or more, more preferably 0.2 μm or more, and still more preferably 0.3 μm or more.

The film according to the embodiment of the present invention can be used in combination with a color filter that includes a chromatic colorant. For example, the film according to the embodiment of the present invention and the color filter can be laminated to be used as a laminate. In the laminate, the film according to the embodiment of the present invention and the color filter may be or may not be adjacent to each other in a thickness direction. In a case where the film according to the embodiment of the present invention is not adjacent to the color filter in the thickness direction, the film according to the embodiment of the present invention may be formed on another support other than a support on which the color filter is formed, or another member (for example, a microlens or a planarizing layer) constituting a solid image pickup element may be interposed between the film according to the embodiment of the present invention and the color filter. The color filter can be manufactured using a coloring composition including a chromatic colorant. Examples of the chromatic colorant include the chromatic colorants described to be included in the curable composition according to the embodiment of the present invention. The coloring composition may further include, for example, a polymerizable monomer, a resin, a photopolymerization initiator, a surfactant, a solvent, a polymerization inhibitor, and an ultraviolet absorber. In more detail, for example, the materials described to be included in the curable composition according to the embodiment of the present invention can be used.

In the present invention, "near infrared cut filter" refers to a filter that allows transmission of light (visible light) in the visible range and shields at least a part of light (near infrared light) in the near infrared range. The near infrared cut filter may be a filter that allows transmission of light in the entire wavelength range of the visible range, or may be a filter that allows transmission of light in a specific wavelength range of the visible range and shields light in another specific wavelength range of the visible range. In addition, in the present invention, a color filter refers to a filter that allows transmission of light in a specific wavelength range of the visible range and shields light in another specific wavelength range of the visible range. In addition, "infrared transmitting filter" refers to a filter that shields light in the visible range and allows transmission of at least a part of light (near infrared light) in the near infrared range.

In a case where the film according to the embodiment of the present invention is used as a near infrared cut filter, it is preferable that the film according to the embodiment of the present invention has an absorption maximum in a wavelength range of 700 to 1000 nm. The average transmittance in a wavelength range of 400 to 550 nm is preferably 70% or higher, more preferably 80% or higher, still more preferably 85% or higher, and still more preferably 90% or higher. In addition, a transmittance of in the entire wavelength range of 400 to 550 nm is preferably 70% or higher, more preferably 80% or higher, and still more preferably 90% or higher. In addition, a preferable range of the near infrared shielding properties of the near infrared cut filter varies depending on the use. A transmittance at at least one point in a wavelength range of 700 to 1000 nm is preferably 20% or lower, more preferably 15% or lower, and still more preferably 10% or lower.

In a case where the film according to the embodiment of the present invention is used as an infrared transmitting filter, it is preferable that a maximum value of a light transmittance of the film in a thickness direction in a wavelength range of 400 to 830 nm is 20% or lower and a minimum value of a light transmittance of the film in the thickness direction in a wavelength range of 1000 to 1300 nm is 80% or higher. The film having the above-described spectral characteristics can be preferably used as an infrared transmitting filter that shields light in a wavelength range of 400 to 750 nm and allows transmission of light in a wavelength range of 900 nm or longer.

The film according to the embodiment of the present invention can be used in various devices including a solid image pickup element such as a charge coupled device (CCD) or a complementary metal-oxide semiconductor (CMOS), an infrared sensor, or an image display device.

<Film Forming Method>

Next, a film forming method according to the present invention will be described. The film according to the embodiment of the present invention can be formed through a step of applying the curable composition according to the embodiment of the present invention.

In the film forming method according to the present invention, it is preferable that the curable composition is applied to a support. Examples of the support include a substrate formed of a material such as silicon, non-alkali glass, soda glass, PYREX (registered trade name) glass, or quartz glass. For example, an organic film or an inorganic film may be formed on the substrate. Examples of a material of the organic film include the resin described to be included in the curable composition. In addition, as the support, a substrate formed of the resin can also be used. In addition, a charge coupled device (CCD), a complementary metal-oxide semiconductor (CMOS), a transparent conductive film, or the like may be formed on the support. In addition, a black matrix that separates pixels from each other may be formed on the support. In addition, optionally, an undercoat layer may be provided on the support to improve adhesiveness with a layer above the support, to prevent diffusion of materials, or to make a surface of the substrate flat. In addition, in a case where a glass substrate is used as the support, it is preferable that an inorganic film is formed on the glass substrate or the glass substrate may be dealkalized to be used.

As a method of applying the curable composition, a well-known method can be used. Examples of the well-known method include: a drop casting method; a slit coating method; a spray coating method; a roll coating method; a spin coating method; a cast coating method; a slit and spin method; a pre-wetting method (for example, a method described in JP2009-145395A); various printing methods including jet printing such as an ink jet method (for example, an on-demand method, a piezoelectric method, or a thermal method) or a nozzle jet method, flexographic printing, screen printing, gravure printing, reverse offset printing, and metal mask printing; a transfer method using a mold or the like; and a nanoimprint lithography method. The application method using an ink jet method is not particularly limited, and examples thereof include a method (in particular, pp. 115 to 133) described in "Extension of Use of Ink Jet—Infinite Possibilities in Patent—" (February, 2005, S.B. Research Co., Ltd.) and methods described in JP2003-262716A, JP2003-185831A, JP2003-261827A, JP2012-126830A, and JP2006-169325A.

A composition layer formed by applying the curable composition may be dried (pre-baked). In a case where a pattern is formed through a low-temperature process, pre-baking is not necessarily performed. In a case where pre-baking is performed, the pre-baking temperature is preferably 150° C. or lower, more preferably 120° C. or lower, and still more preferably 110° C. or lower. The lower limit is, for example, 50° C. or higher or 80° C. or higher. By setting the pre-baking temperature to be 150° C. or lower, the characteristics can be effectively maintained, for example, even in a case where a photoelectric conversion film of an image sensor is formed of an organic material.

The pre-baking time is preferably 10 to 3000 seconds, more preferably 40 to 2500 seconds, and still more preferably 80 to 220 seconds. Drying can be performed using a hot plate, an oven, or the like.

The film forming method according to the present invention may further include a step of forming a pattern. As the pattern forming method, a pattern forming method using a photolithography method is preferable. It is preferable that the pattern forming method using a photolithography method includes: a step (exposure step) of exposing the composition layer, which is formed by applying the curable composition according to the embodiment of the present invention, in a pattern shape; and a step (development step) of forming a pattern by removing a non-exposed portion of the composition layer by development. Optionally, the pattern forming method may further include a step (post-baking step) of baking the developed pattern. Hereinafter, the respective steps will be described.

In the exposure step, the composition layer is exposed in a pattern shape. For example, the composition layer can be exposed in a pattern shape using an exposure device such as a stepper through a mask having a predetermined mask pattern. As a result, an exposed portion can be cured. As radiation (light) used during the exposure, ultraviolet rays such as g-rays or i-rays are preferable, and i-rays are more preferable. The irradiation dose (exposure dose) is preferably 0.03 to 2.5 J/cm$^2$, more preferably 0.05 to 1.0 J/cm$^2$, and most preferably 0.08 to 0.5 J/cm$^2$. The oxygen concentration during exposure can be appropriately selected. The exposure may be performed not only in air but also in a low-oxygen atmosphere having an oxygen concentration of 19 vol % or lower (for example, 15 vol %, 5 vol %, or substantially 0 vol %) or in a high-oxygen atmosphere having an oxygen concentration of higher than 21 vol % (for example, 22 vol %, 30 vol %, or 50 vol %). In addition, the exposure illuminance can be appropriately set and typically can be selected in a range of 1000 W/m$^2$ to 100000 W/m$^2$ (for example, 5000 W/m$^2$, 15000 W/m$^2$, or 35000 W/m$^2$). Conditions of the oxygen concentration and conditions of the exposure illuminance may be appropriately combined. For example, conditions are oxygen concentration: 10 vol % and illuminance: 10000 W/m$^2$, or oxygen concentration: 35 vol % and illuminance: 20000 W/m$^2$.

Next, a pattern is formed by removing a non-exposed portion of the exposed composition layer by development. The non-exposed portion of the composition layer can be removed by development using a developer. As a result, a non-exposed portion of the composition layer in the exposure step is eluted into the developer, and only the photo-cured portion remains on the support. As the developer, an alkali developer which does not cause damages to a solid image pickup element as a substrate, a circuit or the like is desired. For example, the temperature of the developer is preferably 20° C. to 30° C. The development time is preferably 20 to 180 seconds. In addition, in order to further improve residue removing properties, a step of shaking the developer off per 60 seconds and supplying a new developer may be repeated multiple times.

Examples of the alkaline agent used as the developer include: an organic alkaline compound such as ammonia water, ethylamine, diethylamine, dimethylethanolamine, diglycolamine, diethanolamine, hydroxyamine, ethylenediamine, tetramethylammonium hydroxide, tetraethylammonium hydroxide, tetrapropylammonium hydroxide, tetrabutylammonium hydroxide, benzyltrimethylammonium hydroxide, dimethyl bis(2-hydroxyethyl)ammonium hydroxide, choline, pyrrole, piperidine, or 1,8-diazabicyclo[5.4.0]-7-undecene; and an inorganic alkaline compound such as sodium hydroxide, potassium hydroxide, sodium carbonate, sodium bicarbonate, sodium silicate, or sodium metasilicate. As the developer, an alkaline aqueous solution in which the above alkaline agent is diluted with pure water is preferably used. A concentration of the alkaline agent in the alkaline aqueous solution is preferably 0.001 to 10 mass % and more preferably 0.01 to 1 mass %. In addition, the developer may include a surfactant to be used. Examples of the surfactant include the surfactants described above regarding the composition. Among these, a nonionic surfactant is preferable. From the viewpoint of easiness of transport, storage, and the like, the developer may be obtained by temporarily preparing a concentrated solution and diluting the concentrated solution to a necessary concentration during use. The dilution factor is not particularly limited and, for example, can be set to be in a range of 1.5 to 100 times. In a case where a developer including the alkaline aqueous solution is used, it is preferable that the layer is rinsed with pure water after development.

After the development, the film can also be dried and then heated (post-baking). Post-baking is a heat treatment which is performed after development to completely cure the film. In a case where post-baking is performed, for example, the post-baking temperature is preferably 100° C. to 240° C. From the viewpoint of curing the film, the post-baking temperature is more preferably 200° C. to 230° C. In addition, in a case where an organic electroluminescence (organic EL) element is used as a light-emitting light source, or in a case where a photoelectric conversion film of an image sensor is formed of an organic material, the post-baking temperature is preferably 150° C. or lower, more preferably 120° C. or lower, still more preferably 100° C. or lower, and still more preferably 90° C. or lower. The lower limit is, for example, 50° C. or higher. The film after the development is post-baked continuously or batchwise using heating means such as a hot plate, a convection oven (hot air circulation dryer), and a high-frequency heater under the above-described conditions. In addition, in a case where a pattern is formed through a low-temperature process, post-baking is not necessarily performed.

<Optical Filter>

Next, an optical filter according to the embodiment of the present invention will be described. The optical filter according to the embodiment of the present invention includes the film according to the embodiment of the present invention. The optical filter according to the embodiment of the present invention can be preferably used as at least one selected from a near infrared cut filter or an infrared transmitting filter. In addition, it is also preferable that the optical filter according to the embodiment of the present invention includes a pixel which is formed using the film according to the embodiment of the present invention and a pixel selected from a red pixel, a green pixel, a blue pixel, a magenta pixel, a yellow pixel, a cyan pixel, a black pixel, or an achromatic pixel.

In a case where the film according to the embodiment of the present invention is used as a near infrared cut filter, the near infrared cut filter may further include, for example, a layer containing copper, a dielectric multi-layer film, or an ultraviolet absorbing layer in addition to the film according to the embodiment of the present invention. By further including the layer containing copper and/or the dielectric multi-layer film in the near infrared cut filter, the near infrared cut filter having a viewing angle and excellent near infrared shielding properties can be easily obtained. In addition, by further including the ultraviolet absorbing layer in the near infrared cut filter, the near infrared cut filter having excellent ultraviolet shielding properties can be obtained. The details of the ultraviolet absorbing layer can be found in the description of an absorbing layer described in paragraphs "0040" to "0070" and paragraphs "0119" to "0145" of WO2015/099060A, the content of which is incorporated herein by reference. The details of the dielectric multi-layer film can be found in paragraphs "0255" to "0259" of JP2014-041318A, the content of which is incorporated herein by reference. As the layer containing copper, a glass substrate (copper-containing glass substrate) formed of glass containing copper, or a layer (copper complex-containing layer) containing a copper complex may also be used. Examples of the copper-containing glass substrate include a phosphate glass including copper and a fluorophosphate glass including copper. Examples of a commercially available product of the copper-containing glass include NF-50 (manufactured by AGC Techno Glass Co., Ltd.), BG-60 and BG-61 (both of which are manufactured by Schott AG), and CD5000 (manufactured by Hoya Corporation). Specific examples of the copper complex include compounds described in paragraphs "0009" to "0049" of WO2016/068037A, the content of which is incorporated herein by reference.

In a case where the film according to the embodiment of the present invention is used as a near infrared cut filter or an infrared transmitting filter, a near infrared cut filter and an infrared transmitting filter can be used in combination. By using a near infrared cut filter and an infrared transmitting filter in combination, this combination can be preferably used for an infrared sensor that detects infrared light at a specific wavelength. In a case where both an infrared cut filter and an infrared transmitting filter are used in combination, either or both of the near infrared cut filter and the infrared transmitting filter can be formed using the curable composition according to the embodiment of the present invention.

<Solid Image Pickup Element>

A solid image pickup element according to the embodiment of the present invention includes the film according to the embodiment of the present invention. The configuration of the solid image pickup element is not particularly limited as long as it includes the film according to the embodiment of the present invention and functions as a solid image pickup element. For example, the following configuration can be adopted.

The solid image pickup element includes a plurality of photodiodes and transfer electrodes on the support, the photodiodes constituting a light receiving area of the solid image pickup element, and the transfer electrode being formed of polysilicon or the like. In the solid image pickup element, a light shielding film formed of tungsten or the like which has openings through only light receiving sections of the photodiodes is provided on the photodiodes and the transfer electrodes, a device protective film formed of silicon nitride or the like is formed on the light shielding film so as to cover the entire surface of the light shielding film and the light receiving sections of the photodiodes, and the film according to the embodiment of the present invention is formed on the device protective film. Further, a configuration in which light collecting means (for example, a microlens; hereinafter, the same shall be applied) is provided above the device protective film and below the film according to the embodiment of the present invention (on a side thereof close the support), or a configuration in which light collecting means is provided on the film according to the embodiment of the present invention may be adopted. In addition, the color filter may have a structure in which a film which forms each pixel is embedded in a space which is partitioned in, for example, a lattice shape by a partition wall. In this case, it is preferable that the partition wall has a lower refractive index than each pixel. Examples of an imaging device having such a structure include a device described in JP2012-227478A and JP2014-179577A.

<Image Display Device>

An image display device according to the embodiment of the present invention includes the film according to the embodiment of the present invention. Examples of the image display device include a liquid crystal display device or an organic electroluminescence (organic EL) display device. The definition and details of the image display device can be found in, for example, "Electronic Display Device (by Akiya Sasaki, Kogyo Chosakai Publishing Co., Ltd., 1990)" or "Display Device (Sumiaki Ibuki, Sangyo Tosho Co., Ltd.). In addition, the details of a liquid crystal display device can be found in, for example, "Next-Generation Liquid Crystal Display Techniques (Edited by Tatsuo Uchida, Kogyo Chosakai Publishing Co., Ltd., 1994)". The liquid crystal display device to which the present invention is applicable is not particularly limited. For example, the present invention is applicable to various liquid crystal display devices described in "Next-Generation Liquid Crystal Display Techniques". The image display device may include a white organic EL element. It is preferable that the white organic EL element has a tandem structure. The tandem structure of the organic EL element is described in, for example, JP2003-045676A, or pp. 326-328 of "Forefront of Organic EL Technology Development—Know-How Collection of High Brightness, High Precision, and Long Life" (Technical Information Institute, 2008). It is preferable that a spectrum of white light emitted from the organic EL element has high maximum emission peaks in a blue range (430 nm to 485 nm), a green range (530 nm to 580 nm), and a yellow range (580 nm to 620 nm). It is more preferable that the spectrum has a maximum emission peak in a red range (650 nm to 700 nm) in addition to the above-described emission peaks.

<Infrared Sensor>

An infrared sensor according to the embodiment of the present invention includes the film according to the embodiment of the present invention. The configuration of the infrared sensor is not particularly limited as long as it functions as an infrared sensor. Hereinafter, an embodiment of the infrared sensor used in the present invention will be described using the drawings.

In FIG. 1, reference numeral 110 represents a solid image pickup element. In an imaging region provided on a solid image pickup element 110, near infrared cut filters 111 and infrared transmitting filters 114 are provided. In addition, color filters 112 are laminated on the near infrared cut filters 111. Microlenses 115 are disposed on an incidence ray hυ side of the color filters 112 and the infrared transmitting filters 114. A planarizing layer 116 is formed so as to cover the microlenses 115.

The near infrared cut filter 111 can be formed using the curable composition according to the embodiment of the present invention. Spectral characteristics of the near infrared cut filters 111 can be selected according to the emission wavelength of an infrared light emitting diode (infrared LED) to be used.

The color filters 112 is not particularly limited as long as pixels which allow transmission of light having a specific wavelength in a visible range and absorbs the light are formed therein, and well-known color filters of the related art for forming a pixel can be used. For example, pixels of red (R), green (G), and blue (B) are formed in the color filters. For example, the details of the color filters can be found in paragraphs "0214" to "0263" of JP2014-043556A, the content of which is incorporated herein by reference.

Characteristics of the infrared transmitting filters 114 can be selected according to the emission wavelength of the infrared LED to be used. For example, in a case where the emission wavelength of the infrared LED is 850 nm, a maximum value of a light transmittance of the infrared transmitting filter 114 in the thickness direction of the film in a wavelength range of 400 to 650 nm is preferably 30% or lower, more preferably 20% or lower, still more preferably 10% or lower and still more preferably 0.1% or lower. It is preferable that the transmittance satisfies the above-described conditions in the entire wavelength range of 400 to 650 nm.

A minimum value of a light transmittance of the infrared transmitting filter 114 in the thickness direction of the film in a wavelength range of 800 nm or longer (preferably 800 to 1300 nm) is preferably 70% or higher, more preferably 80% or higher, and still more preferably 90% or higher. It is preferable that the transmittance satisfies the above-described conditions in a part of a wavelength range of 800 nm or longer, and it is more preferable that the transmittance satisfies the above-described conditions at a wavelength corresponding to the emission wavelength of the infrared LED.

The thickness of the infrared transmitting filter 114 is preferably 100 µm or less, more preferably 15 µm or less, still more preferably 5 µm or less, and still more preferably 1 µm or less. The lower limit value is preferably 0.1 µm. In a case where the thickness is in the above-described range, the film can satisfy the above-described spectral characteristics.

A method of measuring the spectral characteristics, the thickness, and the like of the infrared transmitting filter 114 is as follows.

The thickness is obtained by measuring the thickness of the dried substrate including the film using a stylus surface profilometer (DEKTAK 150, manufactured by ULVAC Inc.).

The spectral characteristics of the film are values obtained by measuring the transmittance in a wavelength range of 300 to 1300 nm using an ultraviolet-visible-near infrared spectrophotometer (U-4100, manufactured by Hitachi High-Technologies Corporation).

In addition, for example, in a case where the emission wavelength of the infrared LED is 940 nm, it is preferable that a maximum value of a light transmittance of the infrared transmitting filter 114 in a thickness direction of the film in a wavelength range of 450 to 650 nm is 20% or lower, that a light transmittance of the infrared transmitting filter 114 in the thickness direction of the film at a wavelength of 835 nm is 20% or lower, and that a minimum value of a light transmittance of the infrared transmitting filter 114 in the thickness direction of the film in a wavelength range of 1000 to 1300 nm is 70% or higher.

In the infrared sensor shown in FIG. 1, a near infrared cut filter (other near infrared cut filter) other than the near infrared cut filter 111 may be further disposed on the planarizing layer 116. As the other near infrared cut filter, for example, a layer containing copper and/or a dielectric multilayer film may be provided. The details of the examples are as described above. In addition, as the other near infrared cut filter, a dual band pass filter may be used.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples. Unless specified otherwise, "part(s)" and "%" represent "part(s) by mass" and "mass %".

Test Example 1

<Preparation of Curable Composition>

Raw materials shown in the following tables were mixed with each other to prepare a curable composition. In the curable composition in which a dispersion was used as a raw material, the dispersion was prepared as follows.

A near infrared absorbing colorant, a coloring material, a pigment derivative, a dispersant, and a solvent described in "Dispersion 1" and "Dispersion 2" of the following tables were mixed with each other in part(s) by mass shown in "Dispersion 1" and "Dispersion 2" of the following tables, 230 parts by mass of zirconia beads having a diameter of 0.3 mm was further added thereto, the mixture was dispersed using a paint shaker for 5 hours, and the beads were separated by filtration. As a result, a dispersion 1 and a dispersion 2 were manufactured.

TABLE 1

| | Dispersion 1 | | | | | | | | | | | | |
|---|---|---|---|---|---|---|---|---|---|---|---|---|---|
| | Near Infrared Absorbing Colorant | | Pigment Derivative | | Dispersant | | Solvent | | Resin | | Photo-Polymerizable Monomer | | polymerization Initiator | |
| Name | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 1 | A1 | 2.5 | B1 | 0.5 | C1 | 1.8 | PGMEA | 39 | D1 | 5.5 | M1 M3 | 3.2 3.2 | F1 | 1 |
| Example 2 | A1 | 2.5 | B1 | 0.5 | C1 | 1.8 | PGMEA | 39 | D1 | 5.5 | M1 M3 | 4.0 2.4 | F1 | 1 |
| Example 3 | A1 | 2.5 | B1 | 0.5 | C1 | 1.8 | PGMEA | 39 | D1 | 5.5 | M1 M3 | 4.8 1.6 | F1 | 1 |
| Example 4 | A1 | 2.5 | B1 | 0.5 | C1 | 1.8 | PGMEA | 39 | D1 | 5.5 | M1 M3 | 5.6 0.8 | F1 | 1 |
| Example 5 | A1 | 2.5 | B1 | 0.5 | C1 | 1.8 | PGMEA | 39 | D1 | 5.5 | M1 | 6.4 | F1 | 1 |
| Example 6 | A1 | 2.5 | B1 | 0.5 | C1 | 1.8 | PGMEA | 39 | D1 | 5.5 | M1 M5 | 3.2 3.2 | F1 | 1 |
| Example 7 | A1 | 2.5 | B1 | 0.5 | C1 | 1.8 | PGMEA | 39 | D1 | 5.5 | M1 M5 | 4.0 2.4 | F1 | 1 |
| Example 8 | A1 | 2.5 | B1 | 0.5 | C1 | 1.8 | PGMEA | 39 | D1 | 5.5 | M1 M5 | 4.8 1.6 | F1 | 1 |
| Example 9 | A1 | 2.5 | B1 | 0.5 | C1 | 1.8 | PGMEA | 39 | D1 | 5.5 | M1 M5 | 5.6 0.8 | F1 | 1 |
| Example 10 | A1 | 2.5 | B1 | 0.5 | C1 | 1.8 | PGMEA | 39 | D1 | 5.5 | M2 M4 | 3.2 3.2 | F1 | 1 |
| Example 11 | A1 | 2.5 | B1 | 0.5 | C1 | 1.8 | PGMEA | 39 | D1 | 5.5 | M2 M4 | 4.0 2.4 | F1 | 1 |
| Example 12 | A1 | 2.5 | B1 | 0.5 | C1 | 1.8 | PGMEA | 39 | D1 | 5.5 | M2 M4 | 4.8 1.6 | F1 | 1 |
| Example 13 | A1 | 2.5 | B1 | 0.5 | C1 | 1.8 | PGMEA | 39 | D1 | 5.5 | M2 M4 | 5.6 0.8 | F1 | 1 |

TABLE 1-continued

| | | | | | | | | | | | | | |
|---|---|---|---|---|---|---|---|---|---|---|---|---|---|
| Example 14 | A1 | 2.5 | B1 | 0.5 | C1 | 1.8 | PGMEA | 39 | D1 | 5.5 | M1 | 3.2 | F1 | 1 |
| | | | | | | | | | | | M4 | 3.2 | |
| Example 15 | A1 | 2.5 | B1 | 0.5 | C1 | 1.8 | PGMEA | 39 | D1 | 5.5 | M1 | 4.0 | F1 | 1 |
| | | | | | | | | | | | M4 | 2.4 | |
| Example 16 | A1 | 2.5 | B1 | 0.5 | C1 | 1.8 | PGMEA | 39 | D1 | 5.5 | M1 | 4.8 | F1 | 1 |
| | | | | | | | | | | | M4 | 1.6 | |
| Example 17 | A1 | 2.5 | B1 | 0.5 | C1 | 1.8 | PGMEA | 39 | D1 | 5.5 | M1 | 5.6 | F1 | 1 |
| | | | | | | | | | | | M4 | 0.8 | |
| Example 18 | A1 | 2.5 | B1 | 0.5 | C1 | 1.8 | PGMEA | 39 | D1 | 5.5 | M1 | 3.2 | F1 | 1 |
| | | | | | | | | | | | M3 | 2.9 | |
| | | | | | | | | | | | M5 | 0.3 | |
| Example 19 | A1 | 2.5 | B1 | 0.5 | C1 | 1.8 | PGMEA | 39 | D1 | 5.5 | M1 | 4.0 | F1 | 1 |
| | | | | | | | | | | | M3 | 2.2 | |
| | | | | | | | | | | | M5 | 0.2 | |
| Example 20 | A1 | 2.5 | B1 | 0.5 | C1 | 1.8 | PGMEA | 39 | D1 | 5.5 | M1 | 4.8 | F1 | 1 |
| | | | | | | | | | | | M3 | 1.4 | |
| | | | | | | | | | | | M5 | 0.2 | |

| | Ultraviolet Absorber | | Surfactant | | Polymerization Inhibitor | | Antioxidant | | Epoxy Compound | | Solvent | |
|---|---|---|---|---|---|---|---|---|---|---|---|---|
| Name | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 1 | UV1 | 1.6 | W1 | 0.025 | H1 | 0.003 | I1 | 0.2 | | | PGMEA | 41.472 |
| Example 2 | UV1 | 1.6 | W1 | 0.025 | H1 | 0.003 | I1 | 0.2 | | | PGMEA | 41.472 |
| Example 3 | UV1 | 1.6 | W1 | 0.025 | H1 | 0.003 | I1 | 0.2 | | | PGMEA | 41.472 |
| Example 4 | UV1 | 1.6 | W1 | 0.025 | H1 | 0.003 | I1 | 0.2 | | | PGMEA | 41.472 |
| Example 5 | UV1 | 1.6 | W1 | 0.025 | H1 | 0.003 | I1 | 0.2 | | | PGMEA | 41.472 |
| Example 6 | UV1 | 1.6 | W1 | 0.025 | H1 | 0.003 | I1 | 0.2 | | | PGMEA | 41.472 |
| Example 7 | UV1 | 1.6 | W1 | 0.025 | H1 | 0.003 | I1 | 0.2 | | | PGMEA | 41.472 |
| Example 8 | UV1 | 1.6 | W1 | 0.025 | H1 | 0.003 | I1 | 0.2 | | | PGMEA | 41.472 |
| Example 9 | UV1 | 1.6 | W1 | 0.025 | H1 | 0.003 | I1 | 0.2 | | | PGMEA | 41.472 |
| Example 10 | UV1 | 1.6 | W1 | 0.025 | H1 | 0.003 | I1 | 0.2 | | | PGMEA | 41.472 |
| Example 11 | UV1 | 1.6 | W1 | 0.025 | H1 | 0.003 | I1 | 0.2 | | | PGMEA | 41.472 |
| Example 12 | UV1 | 1.6 | W1 | 0.025 | H1 | 0.003 | I1 | 0.2 | | | PGMEA | 41.472 |
| Example 13 | UV1 | 1.6 | W1 | 0.025 | H1 | 0.003 | I1 | 0.2 | | | PGMEA | 41.472 |
| Example 14 | UV1 | 1.6 | W1 | 0.025 | H1 | 0.003 | I1 | 0.2 | | | PGMEA | 41.472 |
| Example 15 | UV1 | 1.6 | W1 | 0.025 | H1 | 0.003 | I1 | 0.2 | | | PGMEA | 41.472 |
| Example 16 | UV1 | 1.6 | W1 | 0.025 | H1 | 0.003 | I1 | 0.2 | | | PGMEA | 41.472 |
| Example 17 | UV1 | 1.6 | W1 | 0.025 | H1 | 0.003 | I1 | 0.2 | | | PGMEA | 41.472 |
| Example 18 | UV1 | 1.6 | W1 | 0.025 | H1 | 0.003 | I1 | 0.2 | | | PGMEA | 41.472 |
| Example 19 | UV1 | 1.6 | W1 | 0.025 | H1 | 0.003 | I1 | 0.2 | | | PGMEA | 41.472 |
| Example 20 | UV1 | 1.6 | W1 | 0.025 | H1 | 0.003 | I1 | 0.2 | | | PGMEA | 41.472 |

TABLE 2

| | Dispersion 1 | | | | | | | | | | | | |
|---|---|---|---|---|---|---|---|---|---|---|---|---|---|
| | Near Infrared Absorbing Colorant | | Pigment Derivative | | Dispersant | | Solvent | | Resin | | Polymerizable Monomer | | Photo-polymerization Initiator | |
| Name | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 21 | A1 | 2.5 | B1 | 0.5 | C1 | 1.8 | PGMEA | 39 | D1 | 5.5 | M1 | 5.6 | F1 | 1 |
| | | | | | | | | | | | M3 | 0.7 | |
| | | | | | | | | | | | M5 | 0.1 | |
| Example 22 | A1 | 2.5 | B1 | 0.5 | C1 | 1.8 | PGMEA | 39 | D1 | 5.5 | M2 | 3.2 | F1 | 1 |
| | | | | | | | | | | | M4 | 2.9 | |
| | | | | | | | | | | | M6 | 0.3 | |
| Example 23 | A1 | 2.5 | B1 | 0.5 | C1 | 1.8 | PGMEA | 39 | D1 | 5.5 | M2 | 4.0 | F1 | 1 |
| | | | | | | | | | | | M4 | 2.2 | |
| | | | | | | | | | | | M6 | 0.2 | |
| Example 24 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.4 | |
| | | | | | | | | | | | M6 | 0.2 | |
| Example 25 | A1 | 2.5 | B1 | 0.5 | C1 | 1.8 | PGMEA | 39 | D1 | 5.5 | M2 | 5.6 | F1 | 1 |
| | | | | | | | | | | | M4 | 0.7 | |
| | | | | | | | | | | | M6 | 0.1 | |
| Example 26 | A1 | 2.5 | B1 | 0.5 | C1 | 1.8 | PGMEA | 39 | D1 | 5.5 | M2 | 6.4 | F1 | 1 |
| Example 27 | A1 | 2.5 | B1 | 0.5 | C1 | 1.8 | PGMEA | 39 | D2 | 5.5 | M2 | 4.8 | F1 | 1 |
| | | | | | | | | | | | M4 | 1.6 | |
| Example 28 | A1 | 2.5 | B1 | 0.5 | C1 | 1.8 | PGMEA | 39 | D3 | 5.5 | M2 | 4.8 | F1 | 1 |
| | | | | | | | | | | | M4 | 1.6 | |

TABLE 2-continued

| | | | | | | | | | | | | | | |
|---|---|---|---|---|---|---|---|---|---|---|---|---|---|---|
| Example 29 | A1 | 2.5 | B1 | 0.5 | C1 | 1.8 | PGMEA | 39 | D2 | 2.5 | M2 | 4.8 | F1 | 1 |
| | | | | | | | | | D3 | 3.0 | M4 | 1.6 | | |
| Example 30 | A1 | 2.5 | B1 | 0.5 | C1 | 1.8 | PGMEA | 39 | D1 | 5.5 | M2 | 4.8 | F2 | 1 |
| | | | | | | | | | | | M4 | 1.6 | | |
| Example 31 | A1 | 2.5 | B1 | 0.5 | C1 | 1.8 | PGMEA | 39 | D1 | 5.5 | M2 | 4.8 | F3 | 1 |
| | | | | | | | | | | | M4 | 1.6 | | |
| Example 32 | A1 | 2.5 | B1 | 0.5 | C1 | 1.8 | PGMEA | 39 | D1 | 5.5 | M2 | 4.8 | F2 | 0.5 |
| | | | | | | | | | | | M4 | 1.6 | F3 | 0.5 |
| Example 33 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 34 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 35 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 36 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 37 | A1 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 38 | A2 | 2.5 | B4 | 0.5 | C1 | 1.8 | PGMEA | 39 | D1 | 5.5 | M2 | 4.8 | F1 | 1 |
| | | | | | | | | | | | M4 | 1.6 | | |
| Example 39 | A3 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |
| Example 40 | A4 | 2.5 | B1 | 0.5 | C1 | 1.8 | PGMEA | 39 | D1 | 5.5 | M2 | 4.8 | F1 | 1 |
| | | | | | | | | | | | M4 | 1.6 | | |

| Name | Ultraviolet Absorber | | Surfactant | | Polymerization Inhibitor | | Antioxidant | | Epoxy Compound | | Solvent | |
|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 21 | UV1 | 1.6 | W1 | 0.025 | H1 | 0.003 | I1 | 0.2 | | | PGMEA | 41.472 |
| Example 22 | UV1 | 1.6 | W1 | 0.025 | H1 | 0.003 | I1 | 0.2 | | | PGMEA | 41.472 |
| Example 23 | UV1 | 1.6 | W1 | 0.025 | H1 | 0.003 | I1 | 0.2 | | | PGMEA | 41.472 |
| Example 24 | UV1 | 1.6 | W1 | 0.025 | H1 | 0.003 | I1 | 0.2 | | | PGMEA | 41.472 |
| Example 25 | UV1 | 1.6 | W1 | 0.025 | H1 | 0.003 | I1 | 0.2 | | | PGMEA | 41.472 |
| Example 26 | UV1 | 1.6 | W1 | 0.025 | H1 | 0.003 | I1 | 0.2 | | | PGMEA | 41.472 |
| Example 27 | UV1 | 1.6 | W1 | 0.025 | H1 | 0.003 | I1 | 0.2 | | | PGMEA | 41.472 |
| Example 28 | UV1 | 1.6 | W1 | 0.025 | H1 | 0.003 | I1 | 0.2 | | | PGMEA | 41.472 |
| Example 29 | UV1 | 1.6 | W1 | 0.025 | H1 | 0.003 | I1 | 0.2 | | | PGMEA | 41.472 |
| Example 30 | UV1 | 1.6 | W1 | 0.025 | H1 | 0.003 | I1 | 0.2 | | | PGMEA | 41.472 |
| Example 31 | UV1 | 1.6 | W1 | 0.025 | H1 | 0.003 | I1 | 0.2 | | | PGMEA | 41.472 |
| Example 32 | UV1 | 1.6 | W1 | 0.025 | H1 | 0.003 | I1 | 0.2 | | | PGMEA | 41.472 |
| Example 33 | UV2 | 1.6 | W1 | 0.025 | H1 | 0.003 | I1 | 0.2 | | | PGMEA | 41.472 |
| Example 34 | UV3 | 1.6 | W1 | 0.025 | H1 | 0.003 | I1 | 0.2 | | | PGMEA | 41.472 |
| Example 35 | UV2 | 0.8 | W1 | 0.025 | H1 | 0.003 | I1 | 0.2 | | | PGMEA | 41.472 |
| | UV3 | 0.8 | | | | | | | | | | |
| Example 36 | UV2 | 1.6 | W1 | 0.025 | H1 | 0.003 | I1 | 0.2 | EP1 | 0.2 | PGMEA | 41.472 |
| Example 37 | UV2 | 1.6 | W1 | 0.025 | H1 | 0.003 | I1 | 0.2 | EP1 | 0.2 | PGMEA | 41.472 |
| Example 38 | UV2 | 1.6 | W1 | 0.025 | H1 | 0.003 | I1 | 0.2 | | | PGMEA | 41.472 |
| Example 39 | UV2 | 1.6 | W1 | 0.025 | H1 | 0.003 | I1 | 0.2 | | | PGMEA | 41.472 |
| Example 40 | UV2 | 1.6 | W1 | 0.025 | H1 | 0.003 | I1 | 0.2 | | | PGMEA | 41.472 |

TABLE 3

| | Dispersion 1 | | | | | | | | Near Infrared Absorbing Colorant | | Dispersion 2 Coloring Material | |
|---|---|---|---|---|---|---|---|---|---|---|---|---|
| | Near Infrared Absorbing Colorant | | Pigment Derivative | | Dispersant | | Solvent | | | | | |
| Name | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 41 | | | | | | | | | A5 | 3 | | |
| Example 42 | | | | | | | | | A6 | 3 | | |
| Example 43 | | | | | | | | | A7 | 3 | | |
| Example 44 | | | | | | | | | A8 | 3 | | |
| Example 45 | | | | | | | | | A9 | 3 | | |
| Example 46 | | | | | | | | | A10 | 3 | | |

TABLE 3-continued

| Name | | | | | | | | | | | |
|---|---|---|---|---|---|---|---|---|---|---|---|
| Example 47 | | | | | | | | | A11 | 3 | |
| Example 48 | | | | | | | | | A12 | 3 | |
| Example 49 | | | | | | | | | A13 | 3 | |
| Example 50 | A1<br>A4 | 1.25<br>1.25 | B1 | 0.5 | C1 | 1.8 | PGMEA | 39 | — | | |
| Example 51 | | | | | | | | | A8<br>A9 | 1.5<br>1.5 | |
| Example 52 | | | | | | | | | A10<br>A11<br>A12 | 1<br>1<br>1 | |
| Example 53 | A3 | 1.25 | B1 | 0.25 | C1 | 0.9 | PGMEA | 19.5 | A5 | 1.5 | |
| Example 54 | A1 | 2.5 | B2 | 0.5 | C1 | 1.8 | PGMEA | 39 | | | |
| Example 55 | A1 | 2.5 | B3 | 0.5 | C2 | 1.8 | PGMEA | 39 | | | |

| | Dispersion 2 | | | | | | Polymerization | | Photo-polymerization Initiator | | Ultraviolet Absorber | |
|---|---|---|---|---|---|---|---|---|---|---|---|---|
| | Dispersant | | Solvent | | Resin | | Monomer | | | | | |
| Name | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 41 | | | | | D1 | 7.3 | M2<br>M4 | 4.8<br>1.6 | F1 | 1 | UV2 | 1.6 |
| Example 42 | | | | | D1 | 7.3 | M2<br>M4 | 4.8<br>1.6 | F1 | 1 | UV2 | 1.6 |
| Example 43 | | | | | D1 | 7.3 | M2<br>M4 | 4.8<br>1.6 | F1 | 1 | UV2 | 1.6 |
| Example 44 | | | | | D1 | 7.3 | M2<br>M4 | 4.8<br>1.6 | F1 | 1 | UV2 | 1.6 |
| Example 45 | | | | | D1 | 7.3 | M2<br>M4 | 4.8<br>1.6 | F1 | 1 | UV2 | 1.6 |
| Example 46 | | | | | D1 | 7.3 | M2<br>M4 | 4.8<br>1.6 | F1 | 1 | UV2 | 1.6 |
| Example 47 | | | | | D1 | 7.3 | M2<br>M4 | 4.8<br>1.6 | F1 | 1 | UV2 | 1.6 |
| Example 48 | | | | | D1 | 7.3 | M2<br>M4 | 4.8<br>1.6 | F1 | 1 | UV2 | 1.6 |
| Example 49 | | | | | D1 | 7.3 | M2<br>M4 | 4.8<br>1.6 | F1 | 1 | UV2 | 1.6 |
| Example 50 | | | | | D1 | 5.5 | M2<br>M4 | 4.8<br>1.6 | F1 | 1 | UV2 | 1.6 |
| Example 51 | | | | | D1 | 7.3 | M2<br>M4 | 4.8<br>1.6 | F1 | 1 | UV2 | 1.6 |
| Example 52 | | | | | D1 | 7.3 | M2<br>M4 | 4.8<br>1.6 | F1 | 1 | UV2 | 1.6 |
| Example 53 | | | | | D1 | 6.4 | M2<br>M4 | 4.8<br>1.6 | F1 | 1 | UV2 | 1.6 |
| Example 54 | | | | | D1 | 5.5 | M2<br>M4 | 4.8<br>1.6 | F1 | 1 | UV2 | 1.6 |
| Example 55 | | | | | D1 | 5.5 | M2<br>M4 | 4.8<br>1.6 | F1 | 1 | UV2 | 1.6 |

| Name | Surfactant | | Polymerization Inhibitor | | Antioxidant | | Solvent | |
|---|---|---|---|---|---|---|---|---|
| | Kind | Part(s) by Mass | Kind | Part(s) by Mass | Kind | Part(s) by Mass | Kind | Part(s) by Mass |
| Example 41 | W1 | 0.025 | H1 | 0.003 | I1 | 0.2 | PGMEA | 80.472 |
| Example 42 | W1 | 0.025 | H1 | 0.003 | I1 | 0.2 | PGMEA | 80.472 |
| Example 43 | W1 | 0.025 | H1 | 0.003 | I1 | 0.2 | PGMEA | 80.472 |
| Example 44 | W1 | 0.025 | H1 | 0.003 | I1 | 0.2 | PGMEA | 80.472 |
| Example 45 | W1 | 0.025 | H1 | 0.003 | I1 | 0.2 | PGMEA | 80.472 |
| Example 46 | W1 | 0.025 | H1 | 0.003 | I1 | 0.2 | PGMEA | 80.472 |
| Example 47 | W1 | 0.025 | H1 | 0.003 | I1 | 0.2 | PGMEA | 80.472 |

TABLE 3-continued

|  | Example 48 | W1 | 0.025 | H1 | 0.003 | I1 | 0.2 | PGMEA | 80.472 |
|---|---|---|---|---|---|---|---|---|---|
|  | Example 49 | W1 | 0.025 | H1 | 0.003 | I1 | 0.2 | PGMEA | 80.472 |
|  | Example 50 | W1 | 0.025 | H1 | 0.003 | I1 | 0.2 | PGMEA | 41.472 |
|  | Example 51 | W1 | 0.025 | H1 | 0.003 | I1 | 0.2 | PGMEA | 80.472 |
|  | Example 52 | W1 | 0.025 | H1 | 0.003 | I1 | 0.2 | PGMEA | 80.472 |
|  | Example 53 | W1 | 0.025 | H1 | 0.003 | I1 | 0.2 | PGMEA | 60.972 |
|  | Example 54 | W1 | 0.025 | H1 | 0.003 | I1 | 0.2 | PGMEA | 41.472 |
|  | Example 55 | W1 | 0.025 | H1 | 0.003 | I1 | 0.2 | PGMEA | 41.472 |

TABLE 4

| | Dispersion 1 | | | | | | | | Dispersion 2 | |
| | Near Infrared Absorbing Colorant | | Pigment Derivative | | Dispersant | | Solvent | | Near Infrared Absorbing Colorant | | Coloring Material | |
| Name | Kind | Part(s) by Mass | Kind | Part(s) by Mass | Kind | Part(s) by Mass | Kind | Part(s) by Mass | Kind | Part(s) by Mass | Kind | Part(s) by Mass |
|---|---|---|---|---|---|---|---|---|---|---|---|---|
| Example 56 | A1 | 2.5 | B1 | 0.25 | C2 | 1.8 | PGMEA | 39 | | | | |
|  |  |  | B2 | 0.25 |  |  |  |  |  |  |  |  |
| Example 57 | A1 | 2.5 | B1 | 0.5 | C1 | 1.8 | PGMEA | 39 | | | | |
| Example 58 | A1 | 2.5 | B1 | 0.5 | C1 | 1.8 | PGMEA | 39 | | | | |
| Example 58-2 | A1 | 2.5 | B1 | 0.5 | C1 | 1.8 | PGMEA | 39 | | | | |
| Example 59 | A1 | 1.75 | B1 | 0.35 | C1 | 1.26 | PGMEA | 27.3 | | | PR254 | 3.84 |
|  |  |  |  |  |  |  |  |  |  |  | P Blue15:6 | 3.84 |
|  |  |  |  |  |  |  |  |  |  |  | PY 139 | 1.92 |
| Example 60 | | | | | | | | | A12 | 3 | P Black32 | 3 |
|  | | | | | | | | | | | P Blue15:6 | 1 |
|  | | | | | | | | | | | PY 139 | 1 |
| Example 61 | | | | | | | | | A13 | 3 | P Black32 | 3 |
|  | | | | | | | | | | | P Blue15:6 | 1 |
|  | | | | | | | | | | | PY 139 | 1 |
| Example 62 | | | | | | | | | A8 | 3 | P Black32 | 3 |
|  | | | | | | | | | | | P Blue15:6 | 1 |
|  | | | | | | | | | | | PY 139 | 1 |
| Comparative Example 1 | | | | | | | | | A6 | 3 | | |
| Comparative Example 2 | | | | | | | | | A6 | 3 | | |
| Comparative Example 3 | | | | | | | | | A6 | 3 | | |
| Comparative Example 4 | | | | | | | | | A7 | 3 | | |
| Comparative Example 5 | | | | | | | | | A7 | 3 | | |
| Comparative Example 6 | | | | | | | | | A7 | 3 | | |
| Comparative Example 7 | | | | | | | | | A12 | 3 | P Black32 | 3 |
|  | | | | | | | | | | | P Blue15:6 | 1 |
|  | | | | | | | | | | | PY 139 | 1 |
| Comparative Example 8 | | | | | | | | | A12 | 3 | P Black32 | 3 |
|  | | | | | | | | | | | P Blue15:6 | 1 |
|  | | | | | | | | | | | PY 139 | 1 |
| Comparative Example 9 | | | | | | | | | A12 | 3 | P Black32 | 3 |
|  | | | | | | | | | | | P Blue15:6 | 1 |
|  | | | | | | | | | | | PY 139 | 1 |

TABLE 4-continued

| Name | Dispersion 2 | | | | Resin | | Polymerization Monomer | | Photo-polymerization Initiator | | Ultraviolet Absorber | |
|---|---|---|---|---|---|---|---|---|---|---|---|---|
| | Dispersant | | Solvent | | | | | | | | | |
| | Kind | Part(s) by Mass | Kind | Part(s) by Mass | Kind | Part(s) by Mass | Kind | Part(s) by Mass | Kind | Part(s) by Mass | Kind | Part(s) by Mass |
| Example 56 | | | | | D1 | 5.5 | M2 | 4.8 | F1 | 1 | UV2 | 1.6 |
| | | | | | | | M4 | 1.6 | | | | |
| Example 57 | | | | | D1 | 5.5 | M2 | 4.8 | F1 | 1 | UV1 | 1.6 |
| | | | | | | | M4 | 1.6 | | | | |
| Example 58 | | | | | D1 | 5.5 | M2 | 4.8 | F1 | 1 | UV1 | 1.6 |
| | | | | | | | M4 | 1.6 | | | | |
| Example 58-2 | | | | | D1 | 5.5 | M2 | 4.8 | F1 | 1 | UV1 | 1.6 |
| | | | | | | | M4 | 1.6 | | | | |
| Example 59 | C1 | 4.1 | PGMEA | 40 | | | M2 | 6.8 | F3 | 1.5 | | |
| | | | | | | | M4 | 2.2 | | | | |
| Example 60 | C3 | 4 | PGMEA | 40 | | | M2 | 6.8 | F3 | 1 | | |
| | | | | | | | M4 | 2.2 | | | | |
| Example 61 | C3 | 4 | PGMEA | 40 | | | M2 | 6.8 | F3 | 1 | | |
| | | | | | | | M4 | 2.2 | | | | |
| Example 62 | C3 | 4 | PGMEA | 40 | | | M2 | 6.8 | F3 | 1 | | |
| | | | | | | | M4 | 2.2 | | | | |
| Comparative Example 1 | | | | | D1 | 7.3 | M3 | 6.4 | F1 | 1 | UV2 | 1.6 |
| Comparative Example 2 | | | | | D1 | 7.3 | M1 | 1.3 | F1 | 1 | UV2 | 1.6 |
| | | | | | | | M3 | 5.1 | | | | |
| Comparative Example 3 | | | | | D1 | 7.3 | M1 | 2.6 | F1 | 1 | UV2 | 1.6 |
| | | | | | | | M3 | 3.8 | | | | |
| Comparative Example 4 | | | | | D1 | 7.3 | M3 | 6.4 | F1 | 1 | UV2 | 1.6 |
| Comparative Example 5 | | | | | D1 | 7.3 | M1 | 1.3 | F1 | 1 | UV2 | 1.6 |
| | | | | | | | M3 | 5.1 | | | | |
| Comparative Example 6 | | | | | D1 | 7.3 | M1 | 2.6 | F1 | 1 | UV2 | 1.6 |
| | | | | | | | M3 | 3.8 | | | | |
| Comparative Example 7 | C3 | 4 | PGMEA | 40 | | | M3 | 6.4 | F3 | 1 | | |
| Comparative Example 8 | C3 | 4 | PGMEA | 40 | | | M1 | 1.3 | F3 | 1 | | |
| | | | | | | | M3 | 5.1 | | | | |
| Comparative Example 9 | C3 | 4 | PGMEA | 40 | | | M1 | 2.6 | F3 | 1 | | |
| | | | | | | | M3 | 3.8 | | | | |

| Name | Surfactant | | Polymerization Inhibitor | | Antioxidant | | Solvent | |
|---|---|---|---|---|---|---|---|---|
| | Kind | Part(s) by Mass | Kind | Part(s) by Mass | Kind | Part(s) by Mass | Kind | Part(s) by Mass |
| Example 56 | W1 | 0.025 | H1 | 0.003 | I1 | 0.2 | PGMEA | 41.472 |
| Example 57 | W1 | 0.025 | H1 | 0.003 | I1 | 0.2 | Cyclohexyl Acetate | 41.472 |
| Example 58 | W1 | 0.025 | H1 | 0.003 | I1 | 0.2 | Cyclopentanone | 41.472 |
| Example 58-2 | W1 | 0.025 | H1 | 0.003 | I1 | 0.2 | PGMEA Cyclohexyl Acetate | 20.736 20.736 |
| Example 59 | W1 | 0.025 | H1 | 0.003 | | | PGMEA | 5.166 |
| Example 60 | W1 | 0.025 | H1 | 0.003 | | | PGMEA | 40.472 |
| Example 61 | W1 | 0.025 | H1 | 0.003 | | | PGMEA | 40.472 |
| Example 62 | W1 | 0.025 | H1 | 0.003 | | | PGMEA | 40.472 |
| Comparative Example 1 | W1 | 0.025 | H1 | 0.003 | I1 | 0.2 | PGMEA | 80.472 |
| Comparative Example 2 | W1 | 0.025 | H1 | 0.003 | I1 | 0.2 | PGMEA | 80.472 |
| Comparative Example 3 | W1 | 0.025 | H1 | 0.003 | I1 | 0.2 | PGMEA | 80.472 |
| Comparative Example 4 | W1 | 0.025 | H1 | 0.003 | I1 | 0.2 | PGMEA | 80.472 |
| Comparative Example 5 | W1 | 0.025 | H1 | 0.003 | I1 | 0.2 | PGMEA | 80.472 |
| Comparative Example 6 | W1 | 0.025 | H1 | 0.003 | I1 | 0.2 | PGMEA | 80.472 |
| Comparative Example 7 | W1 | 0.025 | H1 | 0.003 | | | PGMEA | 40.472 |
| Comparative Example 8 | W1 | 0.025 | H1 | 0.003 | | | PGMEA | 40.472 |
| Comparative Example 9 | W1 | 0.025 | H1 | 0.003 | | | PGMEA | 40.472 |

The raw materials shown above in the table are as follows.
(Near Infrared Absorbing Colorant)
A1 to A7: compounds having the following structures. In the following formulae, Me represents a methyl group, Ph represents a phenyl group, and EH represents an ethylhexyl group.
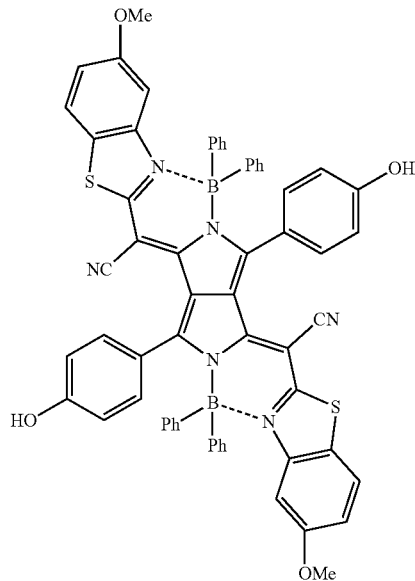
(A1)
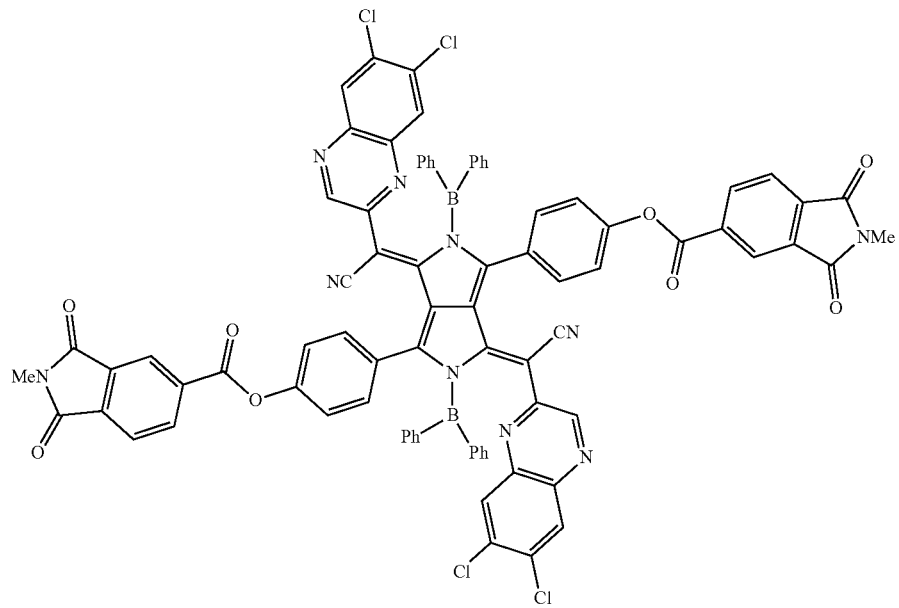
(A2)

-continued
(A3)
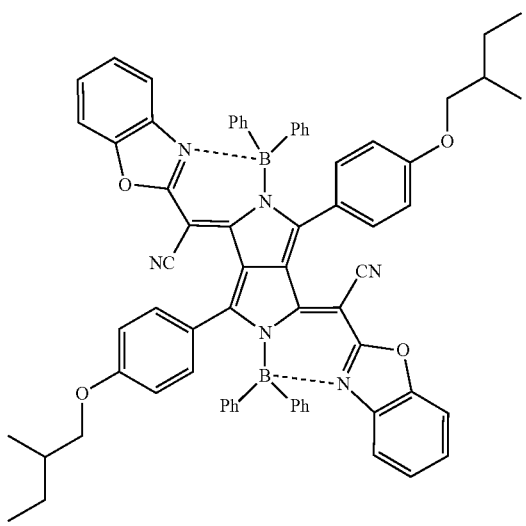
(A4)
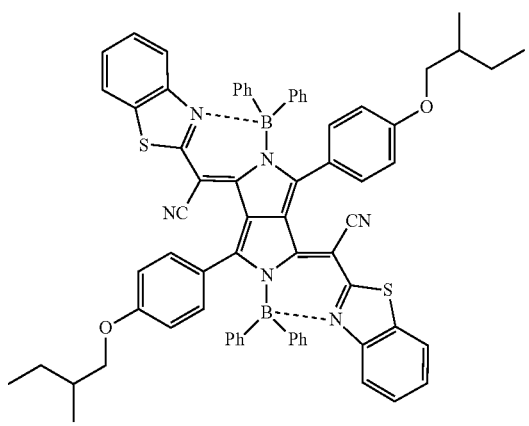
(A5)
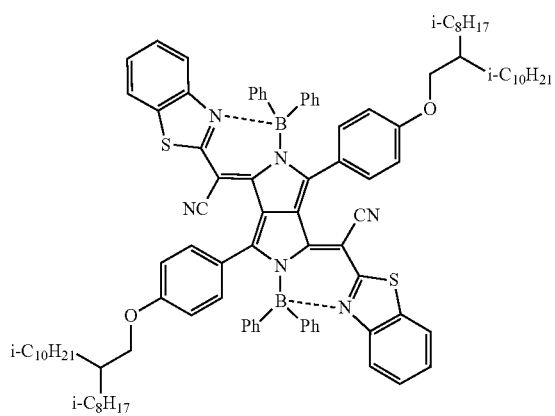
(A6)
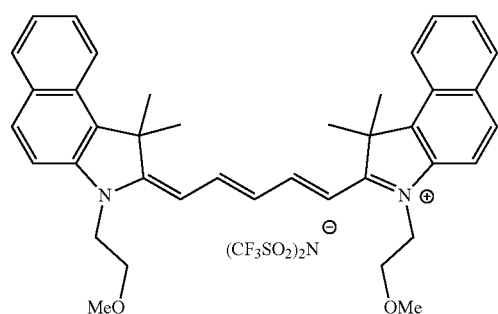
(A7)
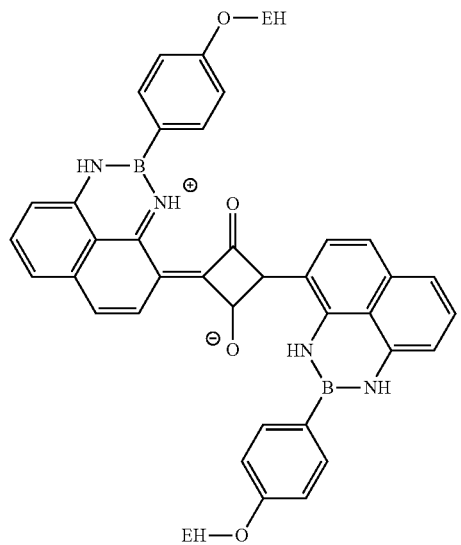

A8: a compound 31 described in paragraph "0051" of JP2008-088426A

A9: a compound 16 described in paragraph "0049" of JP2008-088426A

A10: a compound a-1 described in paragraph "0173" of JP2016-146619A

A11: a compound a-2 described in paragraph "0173" of JP2016-146619A

A12: a compound a-3 described in paragraph "0173" of JP2016-146619A

A13: NK-5060 (manufactured by Hayashibara Co., Ltd., Cyanine Compound)

(Coloring Material)
PR254: C.I. Pigment Red 254
P Blue 15:6: C.I. Pigment Blue 15:6
PY139: C.I. Pigment Yellow 139
P Black 32: C.I. Pigment Black 32

(Pigment Derivative)
B1 to B4: compounds having the following structures. In the following structural formulae, Me represents a methyl group, and Ph represents a phenyl group.

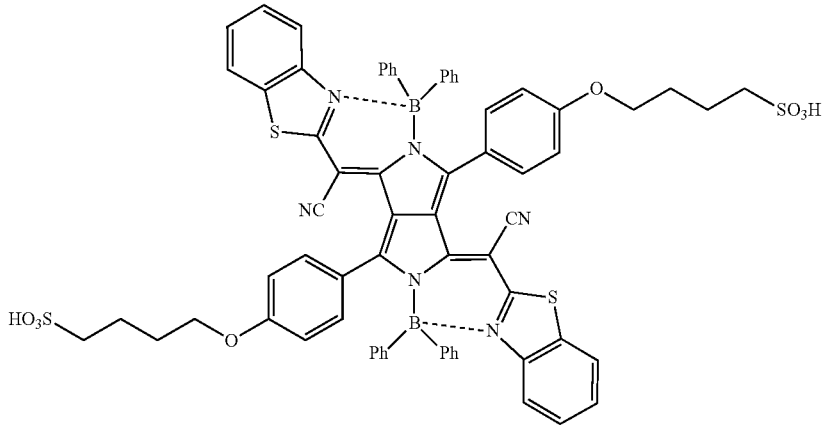

(B1)

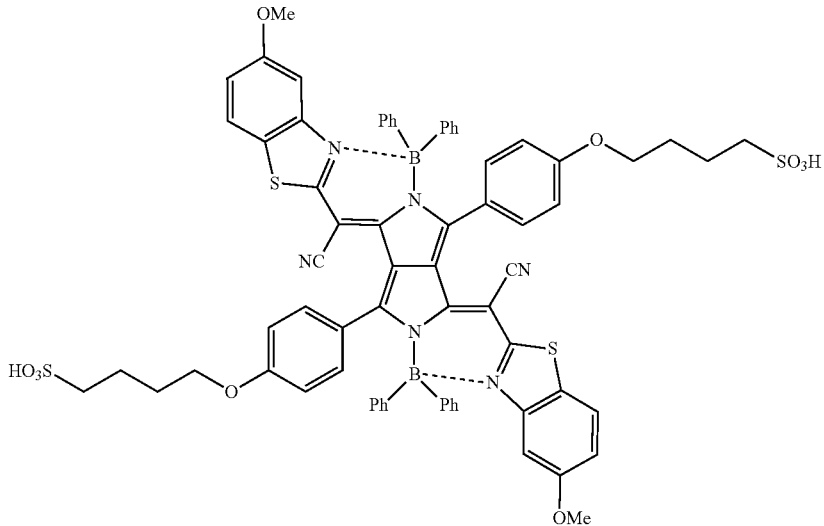

(B2)

(B3)

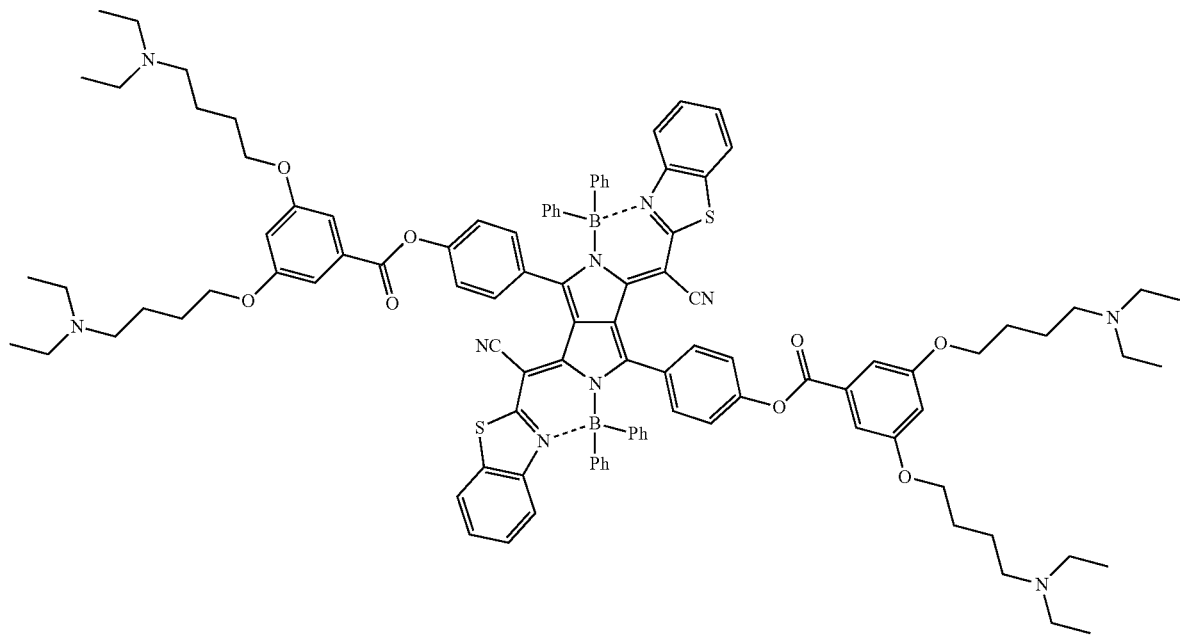

(B4)

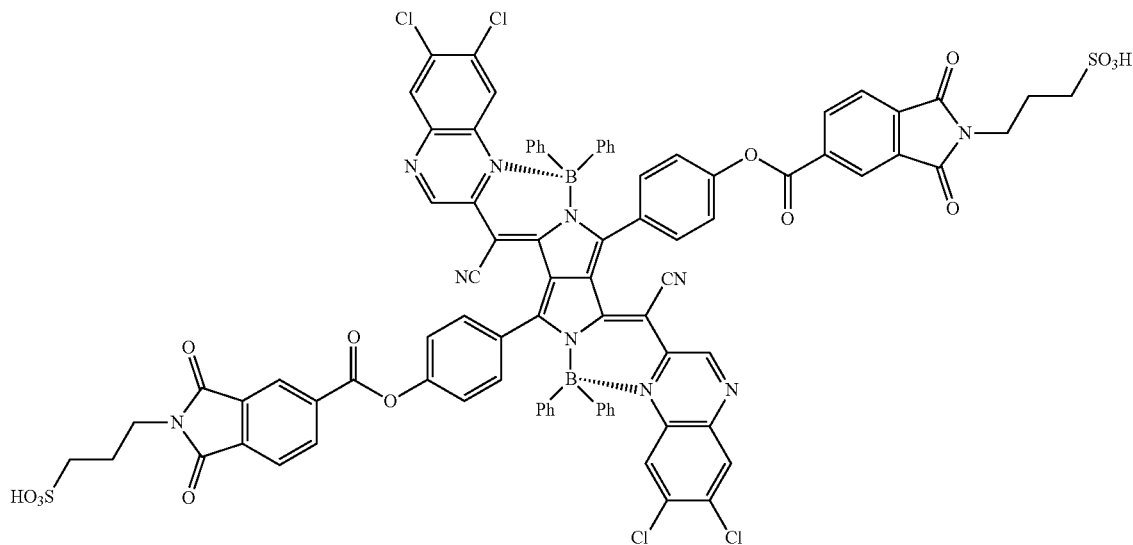

(Dispersant)

C1: a resin having the following structure (a numerical value added to a main chain represents a molar ratio, and a numerical value added to a side chain represents the number of repeating units; Mw=20000, acid value=105 mgKOH/g)

C2: a resin having the following structure (a numerical value added to a main chain represents a molar ratio, and a numerical value added to a side chain represents the number of repeating units; Mw=20000, acid value=30 mgKOH/g)

C3: SOLSPERSE 76500 (manufactured by Lubrication Technology Inc.)

(C1)

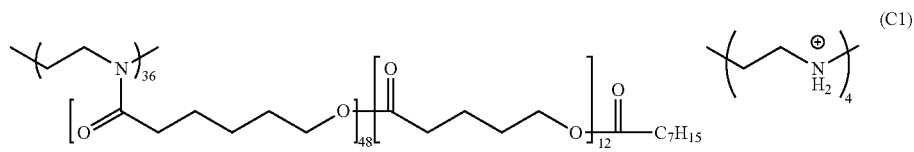

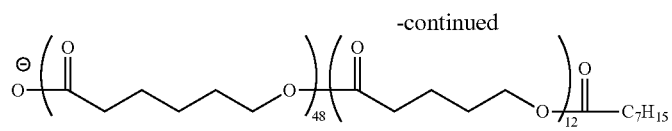

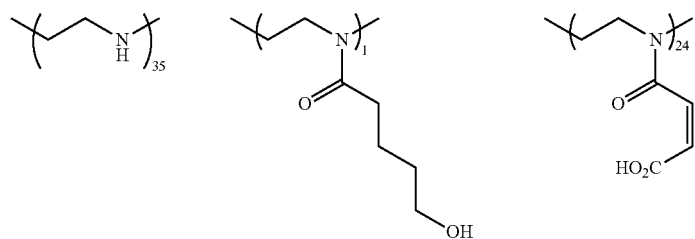

(C2)

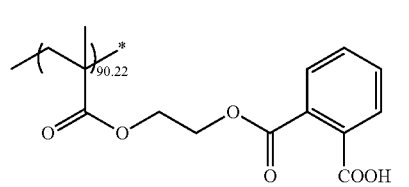

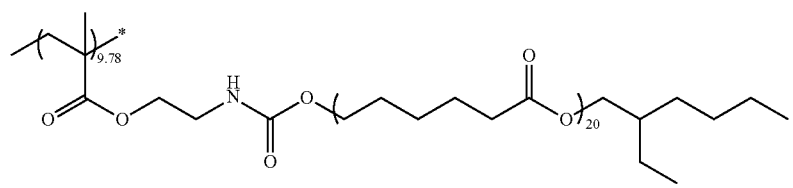

(Resin)

D1: a resin having the following structure (a numerical value added to a main chain represents a molar ratio; Mw=40000, acid value=100 mgKOH/g)

D2: a resin having the following structure (a numerical value added to a main chain represents a molar ratio; Mw=10000, acid value=70 mgKOH/g)

D3: a resin having the following structure (a numerical value added to a main chain represents a molar ratio; Mw=10000, acid value=70 mgKOH/g)

(D1)

(D2)

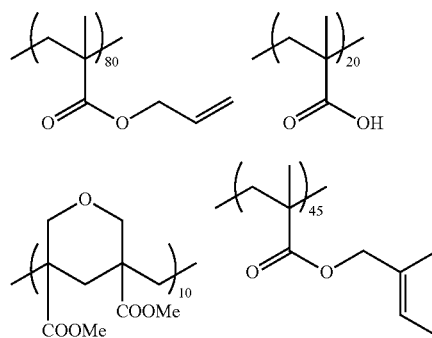

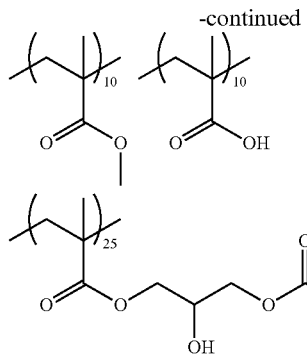

(D3)

(Polymerizable Monomer)

M1 to M6: compounds having the following structures.

(M1)
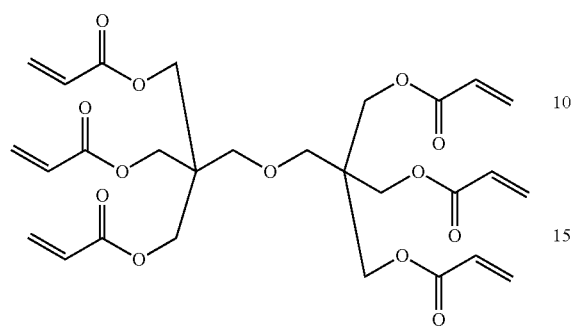

(M2)
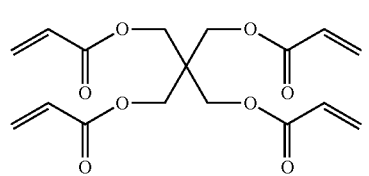

(M3)
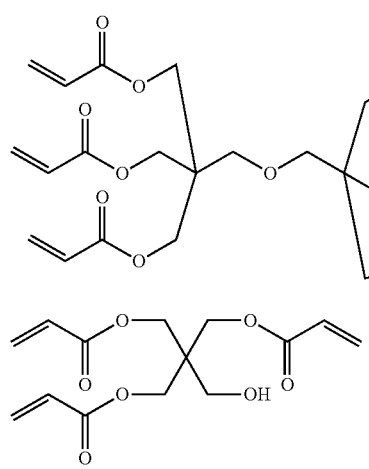

(M4)
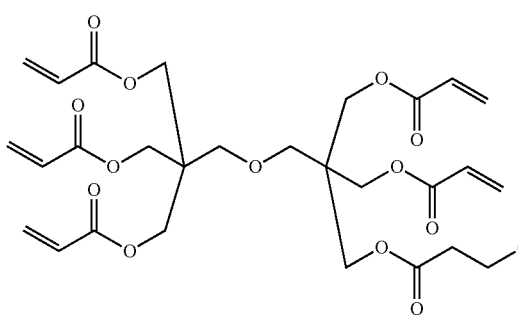

(M5)
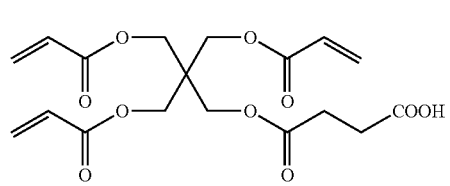

(M6)

(Epoxy Compound)

EP1: EPICLON N-695 (manufactured by DIC Corporation)

EP2: EHPE 3150 (manufactured by Daicel Corporation)

(Photopolymerization Initiator)

F1: IRGACURE OXE01 (manufactured by BASF SE)

F2: IRGACURE 369 (manufactured by BASF SE)

F3: IRGACURE OXE03 (manufactured by BASF SE)

(Ultraviolet Absorber)

UV1 to UV3: compounds having the following structures (UV1)
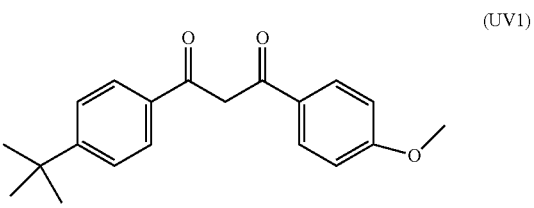

(UV2)
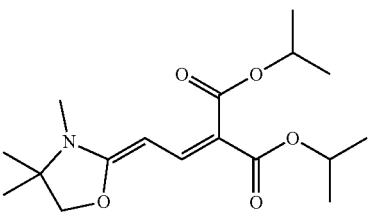

(UV3)
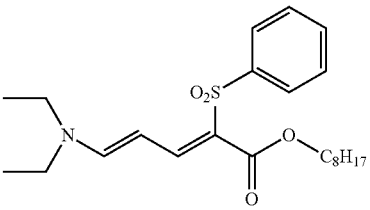

(Surfactant)

W1: the following mixture (Mw=14000, a fluorine surfactant; in the following formula, "%" representing the proportion of a repeating unit is mol %)

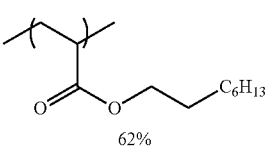
62%

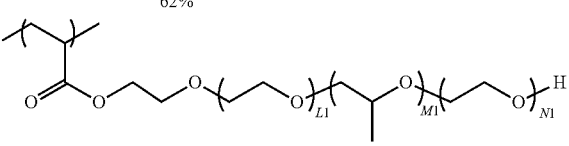
38%

L1 + N1 = L2 + N2 = 14
M1 = M2 = 17

(Polymerization Inhibitor)
H1: p-methoxyphenol
(Antioxidant)
I1: ADEKA STAB AO-80 (manufactured by Adeka Corporation)
(Solvent)
PGMEA: propylene glycol monomethyl ether acetate
cyclohexyl acetate
cyclopentanone
<Evaluation>
[Foreign Matter]
Each of the curable compositions was applied to a glass substrate using a spin coater (manufactured by Mikasa Co., Ltd.) such that the thickness after pre-baking was 0.8 µm. As a result, a coating film was formed. Next, the coating film was heated (pre-baked) using a hot plate at 100° C. for 120 seconds. Next, the entire surface of the coating film was exposed using an i-ray stepper exposure device FPA-3000 i5+ (manufactured by Canon Corporation) at an exposure dose of 1000 mJ/cm$^2$ and then was heated (post-baked) again using a hot plate at 200° C. for 300 seconds. As a result, a film was obtained. The obtained film was observed (measurement magnification=10000 times) using a scanning electron microscope, and the number of foreign matter particles present in a range of 10 µm×15 µm was measured.

5: no foreign matter was present in a range of 10 µm×15 µm

4: the number of foreign matter particles present in a range of 10 µm×15 µm was more than 0 and 5 or less 3: the number of foreign matter particles present in a range of 10 µm×15 µm was more than 5 and 10 or less 2: the number of foreign matter particles present in a range of 10 µm×15 µm was more than 10 and 100 or less 1: the number of foreign matter particles present in a range of 10 µm×15 µm was more than 100

[Moisture Resistance]
Each of the curable compositions was applied to a glass substrate using a spin coater (manufactured by Mikasa Co., Ltd.) such that the thickness after pre-baking was 0.8 µm. As a result, a coating film was formed. Next, the coating film was heated (pre-baked) using a hot plate at 100° C. for 120 seconds. Next, the entire surface of the coating film was exposed using an i-ray stepper exposure device FPA-3000 i5+ (manufactured by Canon Corporation) at an exposure dose of 1000 mJ/cm$^2$ and then was heated (post-baked) again using a hot plate at 200° C. for 300 seconds. As a result, a film was obtained. Regarding the obtained film, the transmittance of light in a wavelength range of 700 to 1000 nm was measured. Next, this film was put into a constant-temperature tank at 85° C. and a humidity of 95% and was stored therein for 6 months to perform a moisture-resistance test. Regarding the film after the moisture-resistance test, the transmittance of light at each wavelength in a wavelength range of 700 to 1000 nm was measured. The transmittance of the film was measured using a spectrophotometer (manufactured by Hitachi High-Technologies Corporation, U-4100).

A maximum value ($\Delta$T) of a change in transmittance at each wavelength in a wavelength range of 700 to 1000 nm before and after the moisture-resistance test was measured and was set as an index indicating moisture resistance.

Change ($\Delta$T) in Transmittance=|Transmittance (%) of Film before Moisture-Resistance Test-Transmittance (%) of Film after Moisture-Resistance Test|

5: $\Delta$T %<2%
4: 2%≤$\Delta$T<4%
3: 4%≤$\Delta$T %<6%
2: 6%≤$\Delta$T %<10%
1: 10%≤$\Delta$T %

[Developability]
Each of the curable compositions was applied to a silicon wafer using a spin coater (manufactured by Mikasa Co., Ltd.) such that the thickness after post-baking was 1.0 µm. As a result, a coating film was formed. Next, the coating film was heated using a hot plate at 100° C. for 2 minutes. Next, using an i-ray stepper exposure device FPA-3000 i5+(manufactured by Canon Corporation), the coating film was exposed through a mask having a 1 µm×1 µm Bayer pattern at an exposure dose of 1000 mJ/cm$^2$. Next, puddle development was performed at 23° C. for 60 seconds using a tetramethylammonium hydroxide (TMAH) 0.3 mass % aqueous solution. Next, the coating film was rinsed by spin showering and was cleaned with pure water. Next, the coating film was heated (post-baked) using a hot plate at 200° C. for 5 minutes. As a result, a pattern was formed.

A portion (non-exposed portion) between patterns was observed using a scanning electron microscope, and a residue was evaluated based on the following standards.

5: no residues were present

4: in 10 non-exposed portions, no residues having a diameter of more than 200 nm were present, but the average number of residues having a diameter of 200 nm or less was more than 0 and 1 or less 3: in 10 non-exposed portions, no residues having a diameter of more than 200 nm were present, but the average number of residues having a diameter of 200 nm or less was more than 1 and 5 or less 2: in 10 non-exposed portions, no residues having a diameter of more than 200 nm were present, but the average number of residues having a diameter of 200 nm or less was more than 5

1: residues having a diameter of more than 200 nm were present or substantially no non-exposed portions were dissolved

TABLE 5

| Name | Content (mass %) of Polymerizable Monomer that has At Least One Group selected from Acid Group or Hydroxyl Group and Group having Unsaturated Double Bond with respect to Total Mass of All Polymerizable Monomers | Foreign Matter | Moisture Resistance | Developability |
|---|---|---|---|---|
| Example 1 | 50 | 3 | 3 | 4 |
| Example 2 | 37.5 | 4 | 3 | 4 |
| Example 3 | 25 | 4 | 4 | 4 |
| Example 4 | 12.5 | 5 | 4 | 3 |
| Example 5 | 0 | 5 | 5 | 3 |
| Example 6 | 50 | 3 | 3 | 5 |
| Example 7 | 37.5 | 3 | 3 | 5 |

TABLE 5-continued

| Name | Content (mass %) of Polymerizable Monomer that has At Least One Group selected from Acid Group or Hydroxyl Group and Group having Unsaturated Double Bond with respect to Total Mass of All Polymerizable Monomers | Evaluation | | |
|---|---|---|---|---|
| | | Foreign Matter | Moisture Resistance | Developability |
| Example 8 | 25 | 4 | 4 | 4 |
| Example 9 | 12.5 | 4 | 4 | 4 |
| Example 10 | 50 | 3 | 3 | 4 |
| Example 11 | 37.5 | 4 | 3 | 4 |
| Example 12 | 25 | 4 | 4 | 4 |
| Example 13 | 12.5 | 5 | 5 | 3 |
| Example 14 | 50 | 3 | 3 | 4 |
| Example 15 | 37.5 | 4 | 3 | 4 |
| Example 16 | 25 | 4 | 4 | 4 |
| Example 17 | 12.5 | 5 | 5 | 3 |
| Example 18 | 50 | 3 | 3 | 5 |
| Example 19 | 37.5 | 3 | 3 | 4 |
| Example 20 | 25 | 4 | 4 | 4 |

TABLE 6

| Name | Content (mass %) of Polymerizable Monomer that has At Least One Group selected from Acid Group or Hydroxyl Group and Group having Unsaturated Double Bond with respect to Total Mass of All Polymerizable Monomers | Evaluation | | |
|---|---|---|---|---|
| | | Foreign Matter | Moisture Resistance | Developability |
| Example 21 | 12.5 | 5 | 4 | 4 |
| Example 22 | 50 | 3 | 3 | 5 |
| Example 23 | 37.5 | 4 | 4 | 4 |
| Example 24 | 25 | 5 | 5 | 4 |
| Example 25 | 12.5 | 5 | 5 | 4 |
| Example 26 | 0 | 5 | 5 | 3 |
| Example 27 | 25 | 4 | 5 | 4 |
| Example 28 | 25 | 4 | 3 | 5 |
| Example 29 | 25 | 4 | 4 | 4 |
| Example 30 | 25 | 4 | 4 | 4 |
| Example 31 | 25 | 3 | 4 | 3 |
| Example 32 | 25 | 4 | 4 | 4 |
| Example 33 | 25 | 4 | 4 | 4 |
| Example 34 | 25 | 4 | 4 | 4 |
| Example 35 | 25 | 4 | 4 | 4 |
| Example 36 | 25 | 5 | 5 | 3 |
| Example 37 | 25 | 4 | 4 | 3 |
| Example 38 | 25 | 4 | 4 | 4 |
| Example 39 | 25 | 4 | 3 | 4 |
| Example 40 | 25 | 4 | 3 | 3 |

TABLE 7

| Name | Content (mass %) of Polymerizable Monomer that has At Least One Group selected from Acid Group or Hydroxyl Group and Group having Unsaturated Double Bond with respect to Total Mass of All Polymerizable Monomers | Evaluation | | |
|---|---|---|---|---|
| | | Foreign Matter | Moisture Resistance | Developability |
| Example 41 | 25 | 4 | 4 | 5 |
| Example 42 | 25 | 3 | 3 | 5 |
| Example 43 | 25 | 3 | 3 | 5 |
| Example 44 | 25 | 3 | 3 | 5 |
| Example 45 | 25 | 3 | 3 | 5 |
| Example 46 | 25 | 3 | 3 | 5 |
| Example 47 | 25 | 4 | 5 | 5 |
| Example 48 | 25 | 3 | 3 | 5 |
| Example 49 | 25 | 3 | 3 | 5 |
| Example 50 | 25 | 4 | 4 | 4 |
| Example 51 | 25 | 3 | 3 | 5 |

TABLE 7-continued

| Name | Content (mass %) of Polymerizable Monomer that has At Least One Group selected from Acid Group or Hydroxyl Group and Group having Unsaturated Double Bond with respect to Total Mass of All Polymerizable Monomers | Foreign Matter | Moisture Resistance | Developability |
|---|---|---|---|---|
| Example 52 | 25 | 3 | 4 | 5 |
| Example 53 | 25 | 4 | 4 | 3 |
| Example 54 | 25 | 4 | 4 | 4 |
| Example 55 | 25 | 4 | 4 | 5 |
| Example 56 | 25 | 5 | 4 | 4 |
| Example 57 | 25 | 4 | 4 | 4 |
| Example 58 | 25 | 4 | 4 | 4 |
| Example 58-2 | 25 | 4 | 4 | 4 |
| Example 59 | 25 | 4 | 4 | 3 |
| Example 60 | 25 | 3 | 3 | 3 |
| Example 61 | 25 | 3 | 3 | 3 |
| Example 62 | 25 | 3 | 3 | 3 |
| Comparative Example 1 | 100 | 1 | 1 | 5 |
| Comparative Example 2 | 80 | 1 | 2 | 5 |
| Comparative Example 3 | 60 | 2 | 2 | 5 |
| Comparative Example 4 | 100 | 1 | 1 | 5 |
| Comparative Example 5 | 80 | 1 | 2 | 5 |
| Comparative Example 6 | 60 | 2 | 2 | 5 |
| Comparative Example 7 | 100 | 1 | 1 | 4 |
| Comparative Example 8 | 80 | 1 | 2 | 4 |
| Comparative Example 9 | 60 | 2 | 2 | 4 |

As shown in the tables, in the films formed using the curable compositions according to Examples, the number of foreign matter particles was small. Further, moisture resistance was also excellent. On the other hand, in the films formed using the curable compositions according to Comparative Examples, the number of foreign matter particles was large.

In each of Examples, even in a case where two or more solvents described in this specification were mixed and used as the solvent within a range where the solubility of the curable composition did not deteriorate, the same effects as those of each of Examples were obtained.

Test Example 2

The curable composition according to Example 5 was applied to a silicon wafer using a spin coating method such that the thickness of the formed film was 1.0 μm. Next, the coating film was heated using a hot plate at 100° C. for 2 minutes. Next, using an i-ray stepper exposure device FPA-3000 i5+ (manufactured by Canon Corporation), the coating film was exposed through a mask having a 2 μm×2 μm Bayer pattern at an exposure dose of 1000 mJ/cm$^2$.

Next, puddle development was performed at 23° C. for 60 seconds using a tetramethylammonium hydroxide (TMAH) 0.3 mass % aqueous solution. Next, the coating film was rinsed by spin showering and was cleaned with pure water. Next, the coating film was heated using a hot plate at 200° C. for 5 minutes. As a result, a 2 μm×2 μm Bayer pattern (near infrared cut filter) was formed.

Next, a Red composition was applied to the Bayer pattern of the near infrared cut filter using a spin coating method such that the thickness of the formed film was 1.0 μm. Next, the coating film was heated using a hot plate at 100° C. for 2 minutes. Next, using an i-ray stepper exposure device FPA-3000 i5+ (manufactured by Canon Corporation), the coating film was exposed through a mask having a 2 μm×2 μm Bayer pattern at an exposure dose of 1000 mJ/cm$^2$. Next, puddle development was performed at 23° C. for 60 seconds using a tetramethylammonium hydroxide (TMAH) 0.3 mass % aqueous solution. Next, the coating film was rinsed by spin showering and was cleaned with pure water. Next, the coating film was heated using a hot plate at 200° C. for 5 minutes. As a result, the Red composition was patterned on the Bayer pattern of the near infrared cut filter. Likewise, a Green composition and a Blue composition were sequentially patterned to form red, green, and blue color patterns.

Next, the composition for forming an infrared transmitting filter was applied to the pattern-formed film using a spin coating method such that the thickness of the formed film was 2.0 μm. Next, the coating film was heated using a hot plate at 100° C. for 2 minutes. Next, using an i-ray stepper exposure device FPA-3000 i5+ (manufactured by Canon Corporation), the coating film was exposed through a mask having a 2 μm×2 μm Bayer pattern at an exposure dose of 1000 mJ/cm$^2$. Next, puddle development was performed at 23° C. for 60 seconds using a tetramethylammonium hydroxide (TMAH) 0.3 mass % aqueous solution. Next, the coating film was rinsed by spin showering and was cleaned with pure water. Next, the coating film was heated using a hot plate at 200° C. for 5 minutes. As a result, the infrared transmitting filter was patterned on a portion where the Bayer pattern of the near infrared cut filter was not formed. This filter was incorporated into a solid image pickup element using a well-known method.

The obtained solid image pickup element was irradiated with light emitted from an infrared light emitting diode (infrared LED) as a light source in a low-illuminance environment (0.001 Lux) to acquire images. Next, the imaging performance of the solid image pickup element was evaluated. The subject was able to be clearly recognized on the image. In addition, incidence angle dependence was good.

The Red composition, the Green composition, the Blue composition, and the composition for forming an infrared transmitting filter used in Test Example 2 are as follows.

(Red Composition)

The following components were mixed and stirred, and the obtained mixture was filtered through a nylon filter (manufactured by Pall Corporation) having a pore size of 0.45 μm to prepare a Red composition.

| | |
|---|---|
| Red Pigment Dispersion | 51.7 parts by mass |
| Resin 4 | 0.6 parts by mass |
| Polymerizable Compound 4 | 0.6 parts by mass |
| Photopolymerization Initiator 1 | 0.4 parts by mass |
| Surfactant 1 | 4.2 parts by mass |
| Ultraviolet absorber (UV-503, manufactured by Daito Chemical Co., Ltd.) | 0.3 parts by mass |
| Propylene glycol monomethyl ether acetate (PGMEA) | 42.6 parts by mass |

(Green Composition)

The following components were mixed and stirred, and the obtained mixture was filtered through a nylon filter (manufactured by Pall Corporation) having a pore size of 0.45 μm to prepare a Green composition.

| | |
|---|---|
| Green Pigment Dispersion | 73.7 parts by mass |
| Resin 4 | 0.3 parts by mass |
| Polymerizable Compound 1 | 1.2 parts by mass |
| Photopolymerization Initiator 1 | 0.6 parts by mass |
| Surfactant 1 | 4.2 parts by mass |
| Ultraviolet absorber (UV-503, manufactured by Daito Chemical Co., Ltd.) | 0.5 parts by mass |
| PGMEA | 19.5 parts by mass |

(Blue Composition)

The following components were mixed and stirred, and the obtained mixture was filtered through a nylon filter (manufactured by Pall Corporation) having a pore size of 0.45 μm to prepare a Blue composition.

| | |
|---|---|
| Blue Pigment Dispersion | 44.9 parts by mass |
| Resin 4 | 2.1 parts by mass |
| Polymerizable Compound 1 | 1.5 parts by mass |
| Polymerizable Compound 4 | 0.7 parts by mass |
| Photopolymerization Initiator 1 | 0.8 parts by mass |
| Surfactant 1 | 4.2 parts by mass |
| Ultraviolet absorber (UV-503, manufactured by Diato Chemical Co., Ltd.) | 0.3 parts by mass |
| PGMEA | 45.8 parts by mass |

(Composition for Forming Infrared Transmitting Filter)

The following components were mixed and stirred, and the obtained mixture was filtered through a nylon filter (manufactured by Pall Corporation) having a pore size of 0.45 μm to prepare a composition for forming an infrared transmitting filter.

| | |
|---|---|
| Pigment Dispersion 1-1 | 46.5 parts by mass |
| Pigment Dispersion 1-2 | 37.1 parts by mass |
| Polymerizable Compound 5 | 1.8 parts by mass |
| Resin 4 | 1.1 parts by mass |
| Photopolymerization Initiator 2 | 0.9 parts by mass |
| Surfactant 1 | 4.2 parts by mass |
| Polymerization inhibitor (p-methoxyphenol) | 0.001 parts by mass |
| Silane coupling agent | 0.6 parts by mass |
| PGMEA | 7.8 parts by mass |

Raw materials used in the Red composition, the Green composition, the Blue composition, and the composition for forming an infrared transmitting filter are as follows.

Red Pigment Dispersion 9.6 parts by mass of C.I. Pigment Red 254, 4.3 parts by mass of C.I. Pigment Yellow 139, 6.8 parts by mass of a dispersant (Disperbyk-161, manufactured by BYK Chemie), and 79.3 parts by mass of PGMEA were mixed with each other to obtain a mixed solution, and the mixed solution was mixed and dispersed using a beads mill (zirconia beads; diameter: 0.3 mm) for 3 hours. As a result, a pigment dispersion was prepared. Next, using a high-pressure disperser NANO-3000-10 (manufactured by Nippon BEE Chemical Co., Ltd.) equipped with a pressure reducing mechanism, the pigment dispersion was further dispersed under a pressure of 2000 kg/cm$^3$ at a flow rate of 500 g/min. This dispersing treatment was repeated 10 times. As a result, a Red pigment dispersion was obtained.

Green Pigment Dispersion 6.4 parts by mass of C.I. Pigment Green 36, 5.3 parts by mass of C.I. Pigment Yellow 150, 5.2 parts by mass of a dispersant (Disperbyk-161, manufactured by BYK Chemie), and 83.1 parts by mass of PGMEA were mixed with each other to obtain a mixed solution, and the mixed solution was mixed and dispersed using a beads mill (zirconia beads; diameter: 0.3 mm) for 3 hours. As a result, a pigment dispersion was prepared. Next, using a high-pressure disperser NANO-3000-10 (manufactured by Nippon BEE Chemical Co., Ltd.) equipped with a pressure reducing mechanism, the pigment dispersion was further dispersed under a pressure of 2000 kg/cm$^3$ at a flow rate of 500 g/min. This dispersing treatment was repeated 10 times. As a result, a Green pigment dispersion was obtained.

Blue Pigment Dispersion 9.7 parts by mass of C.I. Pigment Blue 15:6, 2.4 parts by mass of C.I. Pigment Violet 23, 5.5 parts by mass of a dispersant (Disperbyk-161, manufactured by BYK Chemie), 82.4 parts by mass of PGMEA were mixed with each other to obtain a mixed solution, and the mixed solution was mixed and dispersed using a beads mill (zirconia beads; diameter: 0.3 mm) for 3 hours. As a result, a pigment dispersion was prepared. Next, using a high-pressure disperser NANO-3000-10 (manufactured by Nippon BEE Chemical Co., Ltd.) equipped with a pressure reducing mechanism, the pigment dispersion was further dispersed under a pressure of 2000 kg/cm$^3$ at a flow rate of 500 g/min. This dispersing treatment was repeated 10 times. As a result, a Blue pigment dispersion was obtained.

Pigment Dispersion 1-1

A mixed solution having a composition shown below was mixed and dispersed for 3 hours using a beads mill (a high-pressure disperser with a pressure reducing mechanism, NANO-3000-10 (manufactured by Nippon BEE Chemical Co., Ltd.)) in which zirconia beads having a diameter of 0.3 mm were used. As a result, Pigment Dispersion 1-1 was prepared.

| | |
|---|---|
| Mixed pigment including a red pigment (C.I. Pigment Red 254) and a yellow pigment (C.I. Pigment Yellow 139) | 11.8 parts by mass |
| Resin (Disperbyk-111, manufactured by BYK Chemie) | 9.1 parts by mass |
| PGMEA | 79.1 parts by mass |

Pigment Dispersion 1-2

A mixed solution having a composition shown below was mixed and dispersed for 3 hours using a beads mill (a high-pressure disperser with a pressure reducing mechanism, NANO-3000-10 (manufactured by Nippon BEE Chemical Co., Ltd.)) in which zirconia beads having a diameter of 0.3 mm were used. As a result, Pigment Dispersion 1-2 was prepared.

| | |
|---|---|
| Mixed pigment including a blue pigment (C.I. Pigment Blue 15:6) and a violet pigment (C.I. Pigment Violet 23) | 12.6 parts by mass |
| Resin (Disperbyk-111, manufactured by BYK Chemie) | 2.0 parts by mass |
| Resin A | 3.3 parts by mass |
| Cyclohexanone | 31.2 parts by mass |
| PGMEA | 50.9 parts by mass |

Resin A: a resin having the following structure (Mw=14000, a ratio in a structural unit is a molar ratio)

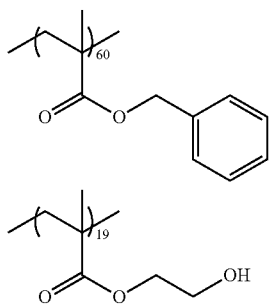

Polymerizable compound 1: KAYARAD DPHA (manufactured by Nippon Kayaku Co., Ltd.)

Polymerizable compound 4: a compound having the following structure

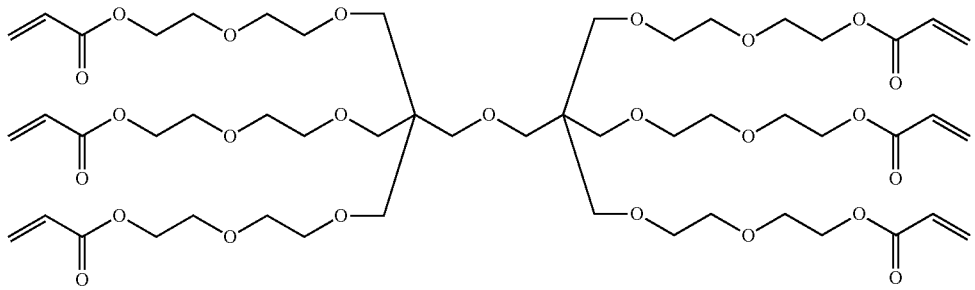 [SMILES: C=CC(=O)OCCOCCOCC(COCCOCCOC(=O)C=C)(COCCOCCOC(=O)C=C)COCC(COCCOCCOC(=O)C=C)(COCCOCCOC(=O)C=C)COCCOCCOC(=O)C=C]

Polymerizable compound 5: a compound having the following structures (a mixture in which a molar ratio between a left compound and a right compound is 7:3)

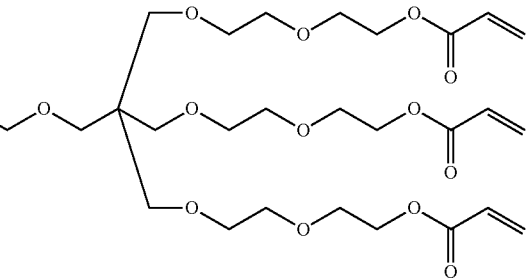

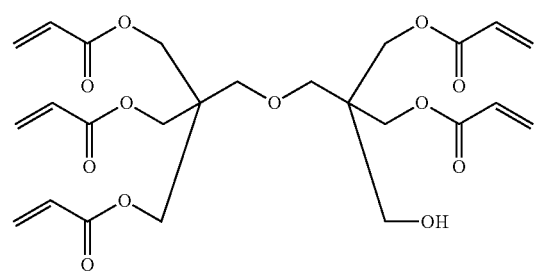

Resin 4: a resin having the following structure (acid value: 70 mgKOH/g, Mw=11000; a ratio in a structural unit is a molar ratio)

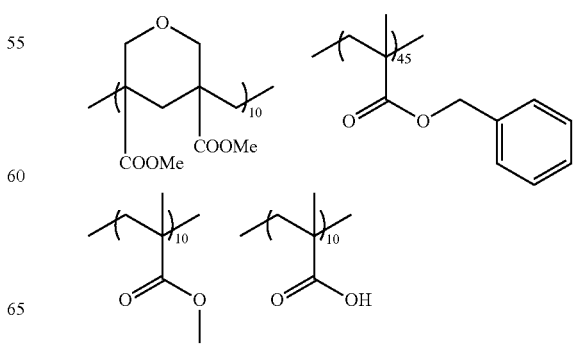

-continued

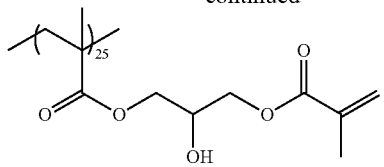

Photopolymerization Initiator 1: IRGACURE-OXE 01 (manufactured by BASF SE)

Photopolymerization Initiator 2: a compound having the following structure

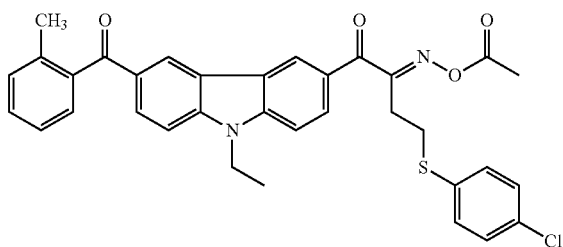 [SMILES: CCn1c2ccc(C(=O)/C(CCSc3ccc(Cl)cc3)=N/OC(C)=O)cc2c2cc(C(=O)c3ccccc3C)ccc21]

Surfactant 1: a 1 mass % PGMEA solution of the following mixture (Mw=14000; in the following formula, "%" representing the proportion of a repeating unit is mol %)

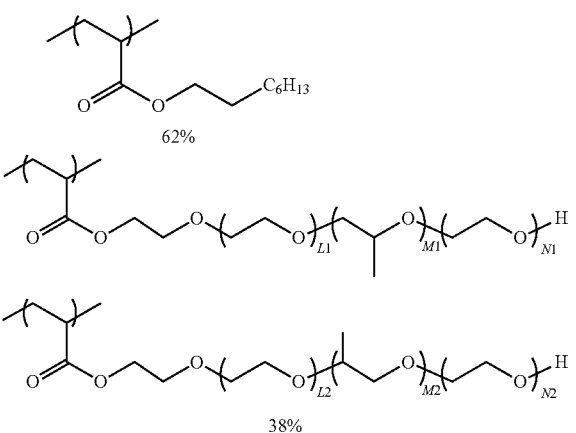

L1 + N1 = L2 + N2 = 14
M1 = M2 = 17

Silane coupling agent: a compound having the following structure. In the following structural formulae, Et represents an ethyl group.

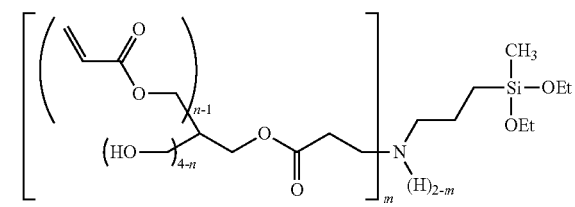

n = 4, 3, 2
(n = 4 main reactant)
m = 2 or 1
(m = 2 main product)

EXPLANATION OF REFERENCES

110: solid image pickup element
111: near infrared cut filter
112: color filter
114: infrared transmitting filter
115: microlens
116: planarizing layer

What is claimed is:

1. A curable composition comprising:
a near infrared absorbing colorant;
a polymerizable monomer that has a group having an unsaturated double bond; and
a resin having an acid group,
wherein the near infrared absorbing colorant is a compound that includes a π-conjugated plane having a monocyclic or fused aromatic ring,
a content of the near infrared absorbing colorant is 10 mass % or higher with respect to a total solid content of the curable composition,
a content of a polymerizable monomer that has at least one group selected from an acid group or a hydroxyl group and a group having an unsaturated double bond is 12.5 mass % or higher and 50 mass % or lower with respect to a total mass of all the polymerizable monomers, and
a content of the resin having an acid group is 70 to 250 parts by mass with respect to 100 parts by mass of a total content of all the polymerizable monomers.

2. The curable composition according to claim 1, wherein the content of the polymerizable monomer that has at least one group selected from an acid group or a hydroxyl group and a group having an unsaturated double bond is 12.5 mass % or higher and 30 mass % or lower with respect to the total mass of all the polymerizable monomers.

3. The curable composition according to claim 1, wherein the polymerizable monomer that has a group having an unsaturated double bond is a compound that has two or more groups having an unsaturated double bond.

4. The curable composition according to claim 1, wherein the near infrared absorbing colorant is a compound having a hydrophilic group.

5. The curable composition according to claim 2, wherein the near infrared absorbing colorant is a compound having a hydrophilic group.

6. The curable composition according to claim 3, wherein the near infrared absorbing colorant is a compound having a hydrophilic group.

7. The curable composition according to claim 1, further comprising:
a chromatic colorant.

8. The curable composition according to claim 1, further comprising:
a coloring material that allows transmission of infrared light and shields visible light.

9. A film which is formed using the curable composition according to claim 1.

10. An optical filter comprising:
the film according to claim 9.

11. The optical filter according to claim 10, wherein the optical filter is a near infrared cut filter or an infrared transmitting filter.

12. A solid image pickup element comprising:
the film according to claim 9.

13. An image display device comprising:
the film according to claim 9.
14. An infrared sensor comprising:
the film according to claim 9.
15. The curable composition according to claim 1, wherein the near infrared absorbing colorant is at least one compound selected from the group consisting of a cyanine compound and a squarylium compound.
16. The curable composition according to claim 1, wherein the near infrared absorbing colorant is a squarylium compound represented by the following Formula (SQ),

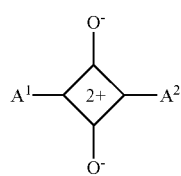

(SQ)

in Formula (SQ), $A^1$ and $A^2$ each independently represent an aryl group, a heteroaryl group, or a group represented by Formula (A-1), and

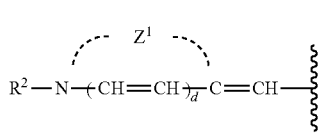

(A-1)

in Formula (A-1), $Z^1$ represents a non-metal atomic group for forming a nitrogen-containing heterocycle, $R^2$ represents an alkyl group, an alkenyl group, or an aralkyl group, d represents 0 or 1, and a wave line represents a direct bond.
17. The curable composition according to claim 1, further comprising
an ultraviolet absorber represented by any one of Formulae (UV-1) to (UV-3),

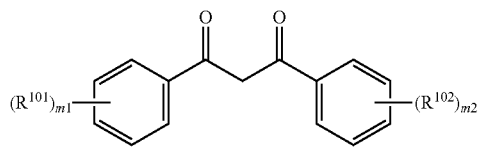

(UV-1)

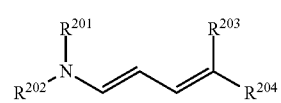

(UV-2)

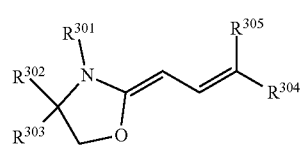

(UV-3)

wherein in Formula (UV-1), $R^{101}$ and $R^{102}$ each independently represent a substituent, and m1 and m2 each independently represent 0 to 4, in Formula (UV-2), $R^{201}$ and $R^{202}$ each independently represent a hydrogen atom or an alkyl group, and $R^{203}$ and $R^{204}$ each independently represent a substituent, and
in Formula (UV-3), $R^{301}$ to $R^{303}$ each independently represent a hydrogen atom or an alkyl group, and $R^{304}$ and $R^{305}$ each independently represent a substituent.
18. The curable composition according to claim 1, wherein the content of the resin having an acid group is 0.1 to 40 mass % with respect to the total solid content of the curable composition.
19. The curable composition according to claim 1, further comprising:
a dispersant,
wherein a content of the dispersant is 0.1 to 40 mass % with respect to the total solid content of the curable composition.
20. The curable composition according to claim 1, further comprising:
a dispersant,
wherein the near infrared absorbing colorant includes a pigment, and
the content of the dispersant is 1 to 100 parts by mass with respect to 100 parts by mass of the pigment.
21. The curable composition according to claim 16, wherein, in Formula (SQ), $A^1$ and $A^2$ each independently represent a heteroaryl group or a group represented by Formula (A-1).
22. The curable composition according to claim 1, wherein the near infrared absorbing colorant includes a cyanine compound represented by Formula (C), Formula (C)

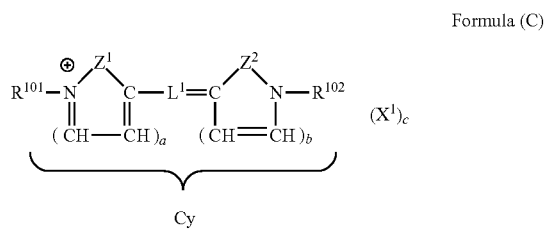

in Formula (C), $Z^1$ and $Z^2$ each independently represent a non-metal atomic group for forming a 5- or 6-membered nitrogen-containing heterocycle which may be fused,
$R^{101}$ and $R^{102}$ each independently represent an alkyl group, an alkenyl group, an alkynyl group, an aralkyl group, or an aryl group,
$L^1$ represents a methine chain including an odd number of methine groups,
a and b each independently represent 0 or 1,
in a case where a represents 0, a carbon atom and a nitrogen atom are bonded through a double bond, in a case where b represents 0, a carbon atom and a nitrogen atom are bonded through a single bond,
a site represented by Cy in the formula is a cation site, $X^1$ represents an anion, and c represents the number of $X^1$'s for balancing charge.
23. The curable composition according to claim 17, wherein the ultraviolet absorber is represented by Formula (UV-3), and
in Formula (UV-3), $R^{304}$ and $R^{305}$ represent a carboxyl group.

* * * * *